US012776885B2

(12) United States Patent
Lim et al.

(10) Patent No.: US 12,776,885 B2
(45) Date of Patent: Oct. 27, 2026

(54) UPLINK CONTROL INFORMATION RATE MATCHING METHOD AND APPARATUS IN WIRELESS COMMUNICATION SYSTEM

(71) Applicant: Samsung Electronics Co., Ltd., Suwon-si (KR)

(72) Inventors: Seongmok Lim, Suwon-si (KR); Ameha Tsegaye Abebe, Suwon-si (KR); Junyung Yi, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 18/291,178

(22) PCT Filed: Jul. 13, 2022

(86) PCT No.: PCT/KR2022/010173
§ 371 (c)(1),
(2) Date: Jan. 22, 2024

(87) PCT Pub. No.: WO2023/003252
PCT Pub. Date: Jan. 26, 2023

(65) Prior Publication Data

US 2024/0313931 A1 Sep. 19, 2024

(30) Foreign Application Priority Data

Jul. 21, 2021 (KR) ........................ 10-2021-0095946

(51) Int. Cl.
*H04L 5/00* (2006.01)
*H04W 72/0446* (2023.01)
*H04W 72/21* (2023.01)

(52) U.S. Cl.
CPC ....... *H04L 5/0064* (2013.01); *H04W 72/0446* (2013.01); *H04W 72/21* (2023.01)

(58) Field of Classification Search
None
See application file for complete search history.

(56) References Cited

U.S. PATENT DOCUMENTS

2013/0235853 A1 9/2013 Papasakellariou et al.
2019/0007182 A1 1/2019 Li et al.
(Continued)

FOREIGN PATENT DOCUMENTS

KR 10-2023-0012294 A 1/2023
WO 2012074273 A2 6/2012
WO 2021133974 A1 7/2021
WO 2023168184 A1 9/2023

OTHER PUBLICATIONS

Supplementary European Search Report dated Jun. 30, 2025, in connection with European Patent Application No. 22846122.4, 14 pages.
(Continued)

*Primary Examiner* — San Htun

(57) ABSTRACT

The present disclosure relates to: a communication technique for merging IoT technology with a 5G communication system for supporting a data transmission rate higher than that of a 4G system; and a system therefor. The present disclosure can be applied to intelligent services (for example, smart homes, smart buildings, smart cities, smart cars or connected cars, healthcare, digital education, retail businesses, security-and-safety-related services, and the like) on the basis of 5G communication technology and IoT-related technology. The present disclosure relates to a method and apparatus for performing rate matching for uplink control information in a wireless communication system.

16 Claims, 24 Drawing Sheets

(56) References Cited

U.S. PATENT DOCUMENTS

| | | | | |
|---|---|---|---|---|
| 2020/0281011 | A1* | 9/2020 | Xiong | H04W 72/20 |
| 2020/0344747 | A1* | 10/2020 | Park | H04W 72/21 |
| 2021/0068083 | A1 | 3/2021 | Yang et al. | |
| 2021/0068140 | A1* | 3/2021 | Yang | H04W 72/23 |
| 2022/0174666 | A1* | 6/2022 | Kou | H04W 72/0453 |
| 2022/0361206 | A1* | 11/2022 | Jiang | H04W 72/1268 |
| 2023/0043456 | A1* | 2/2023 | Li | H04L 5/0035 |
| 2023/0180220 | A1* | 6/2023 | Takeda | H04W 72/1268 370/329 |

OTHER PUBLICATIONS

ETSI TS 136 212 V16.5.0 (Apr. 2021), Technical Specification, LTE; Evolved Universal Terrestrial Radio Access (E-UTRA); Multiplexing and channel coding (3GPP TS 36.212 version 16.5.0 Release 16), 259 pages.

Huawei et al., "Corrections on PUSCH enhancement," 3GPP TSG RAN WG1 Meeting #100bis-e, E-meeting, Apr. 2020, R1-2001549, 10 pages, Best Available Date: Apr. 20-30, 2020.

CATT, "Remaining issues on PUSCH enhancements," 3GPP TSG RAN WG1 #100, e-Meeting, Mar. 6, 2020, R1-2000529, 12 pages, Best Available Date: Feb. 24-Mar. 6, 2020.

International Search Report and Written Opinion of the International Searching Authority dated Oct. 26, 2022, in connection with International Application No. PCT/KR2022/010173, 9 pages.

Samsung Research, "XDD (Cross Division Duplex) Extending Coverage of 5G TDD Carriers," Technical White Paper, May 2021, Standards Research Team, 14 pages.

Office Action dated May 27, 2026, in connection with Korean Patent Application No. 10-2021-0095946, 10 pages.

* cited by examiner

UPLINK CONTROL INFORMATION RATE MATCHING METHOD AND APPARATUS IN WIRELESS COMMUNICATION SYSTEM

TECHNICAL FIELD

The disclosure relates to a method and an apparatus for performing rate matching for uplink control information in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

As various services can be provided according to the above description and the development of a wireless communication system, methods of smoothly providing the services are needed. Particularly, in order to effectively allocate frequency resources to various services in the wireless communication system, research on a method of applying rate matching to uplink control information during communication is required.

DISCLOSURE OF INVENTION

Technical Problem

An aspect of the disclosure is to effectively allocate frequency resources in order to provide various services in a wireless communication system.

Embodiments disclosed therefor provide a method and an apparatus for performing rate matching of uplink control information in the wireless communication system.

Solution to Problem

In accordance with an aspect of the disclosure to solve the problem, a method of performing rate matching by a user equipment (UE) in a wireless communication system is provided. The method includes determining, in a slot including both an uplink channel and a downlink channel, a number of coded modulation symbols of uplink control information (UCI) to be multiplexed to a physical uplink shared channel (PUSCH), based on at least one of frequency resources of the downlink channels in a slot including both uplink channels and downlink channels or a time from a start point of the slot to an end point of the a physical uplink shared channel (PUSCH) in in the uplink channels, a number of coded modulation symbols of uplink control information (UCI) to be multiplexed to the PUSCH, and transmitting the PUSCH to which the UCI is multiplexed according to the determined number of coded modulation symbols.

In accordance with another aspect of the disclosure to solve the problem, a method of performing rate matching by a base station (BS) in a wireless communication system is provided. The method includes configuring, in an arbitrary slot, an uplink channels including a physical uplink shared channel (PUSCH) and a downlink channels including a physical uplink shared channel (PUSCH) in a predetermined slot, and receiving, from a user equipment (UE), the PUSCH to which uplink control information (UCI) is multiplexed in the slot from a user equipment (UE), wherein a number of coded modulation symbols of the PUSCH is determined based on at least one of frequency resources of the downlink channels or a time from a start point of the slot to an end point of the PUSCH.

In accordance with another aspect of the disclosure to solve the problem, a user equipment (UE) in a wireless communication system is provided. The UE includes a transceiver configured to transmit and receive a signal and a processor coupled with the transceiver, wherein the processor is configured to determine, in a slot including both an uplink channel and a downlink channel, based on at least one of frequency resources of the downlink channel or a time from a start point of the slot to an end point of a physical uplink shared channel (PUSCH) in the uplink channel, a number of coded modulation symbols of uplink control information (UCI) to be multiplexed to the PUSCH, and transmit the PUSCH to which the UCI is multiplexed according to the determined number of coded modulation symbols.

In accordance with another aspect of the disclosure to solve the problem, a base station (BS) in a wireless communication system is provided. The BS includes a transceiver configured to transmit and receive a signal and a processor coupled with the transceiver, wherein the processor is configured to configure, in an arbitrary slot, an uplink channel including a physical uplink shared channel (PUSCH) and a downlink channel, and receive, from a user equipment (UE), the PUSCH to which uplink control information (UCI) is multiplexed in the slot, wherein a number of coded modulation symbols of the PUSCH is determined based on at least one of frequency resources of the downlink channel or a time from a start point of the slot to an end point of the PUSCH.

Advantageous Effects of Invention

According to the disclosed embodiments, a rate matching method and apparatus for uplink control information are provided to effectively perform frequency resource allocation during communication in a wireless communication system when communication is performed.

MODE FOR THE INVENTION

Figure 1:
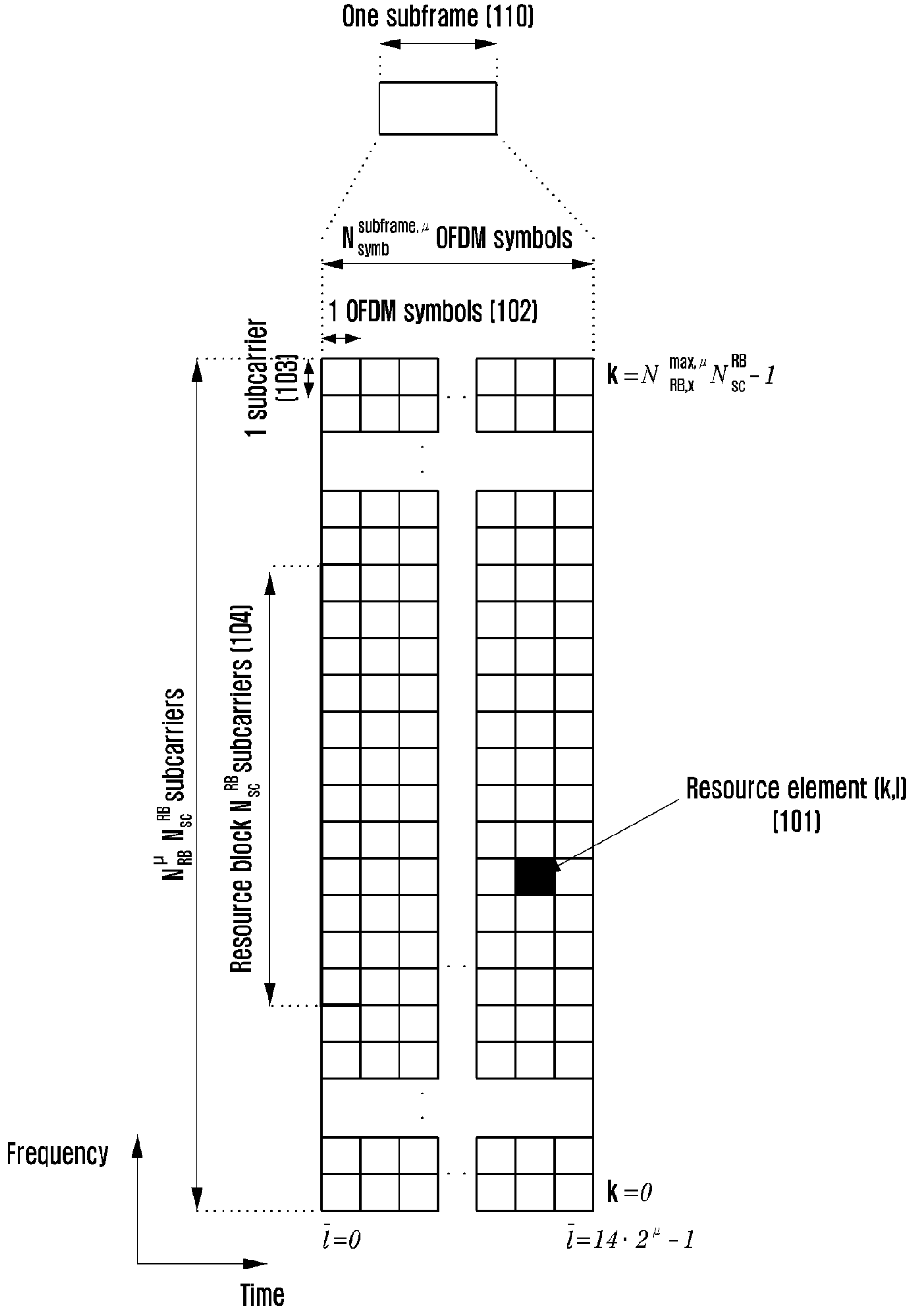
FIG. 1 illustrates the basic structure of time-frequency domains corresponding to radio resource regions in which data or control channels are transmitted in a 5G wireless communication system.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like. eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

Hereinafter, a frame structure of the 5G system is described in more detail with reference to the drawings.

FIG. 1 illustrates a basic structure of a time-frequency domain corresponding to radio resource region in which data or a control channel is transmitted in a 5G wireless communication system. Referring to FIG. 1, the horizontal axis indicates the time domain and the vertical axis indicates the frequency domain. A basic unit of resources in the time and frequency domains is a resource element (RE) 101 and may be defined as 1 orthogonal frequency division multiplexing (OFDM) symbol 102 in the time axis and 1 subcarrier 103 in the frequency axis. In the frequency domain, $$N_{sc}^{RB}$$

(for example, 12) successive REs may correspond to one resource block (RB) 104.

Figure 2:
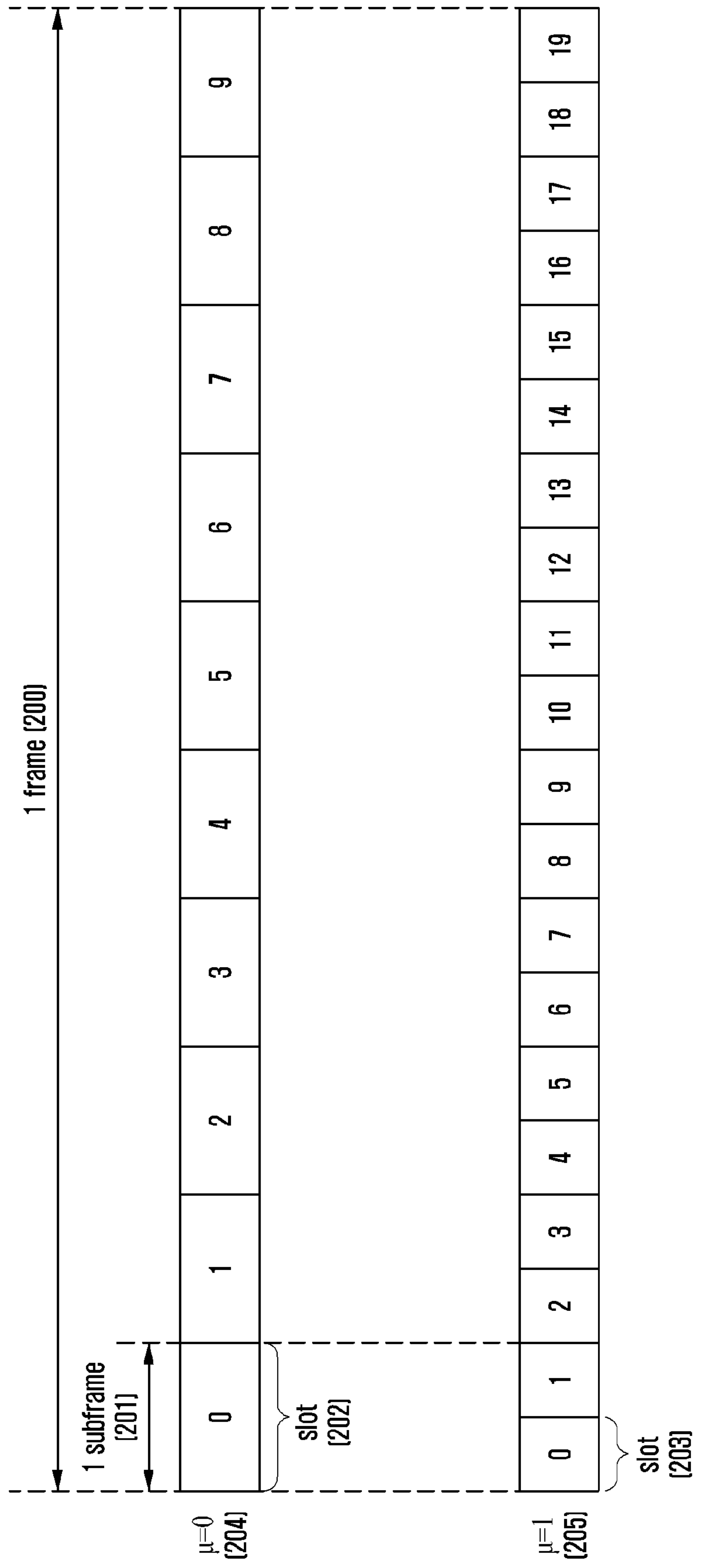
FIG. 2 illustrates an example of a slot structure used in the 5G wireless communication system.

FIG. 2 illustrates an example of a slot structure used in the 5G wireless communication system. Referring to FIG. 2, an example of the structure of a frame 200, a subframe 201, and a slot 202 is illustrated. One frame 200 may be defined as 10 ms. One subframe 201 may be defined as 1 ms and, accordingly, one frame 200 may include a total of 10 subframes 201. One slot 202 or 203 may be defined as 14 OFDM symbols (that is, the number symbols $$(N_{symb}^{slot})$$

per slot=14). One subframe 201 may include one or a plurality of slots 202 or 203, and the number of slots 202 or 203 per subframe 201 may vary depending on a configuration value μ 204 or 205 for subcarrier spacing. In the example of FIG. 2, the case in which the subcarrier spacing configuration values μ=0 204 and μ=1 205 is illustrated. In the case of μ=0 204, one subframe 201 may include one slot 202. In the case of μ=1 205, one subframe 201 may include two slots 203. That is, the number of slots $$(N_{slot}^{subframe,\mu})$$

per subframe may vary depending on the configuration value μ for subcarrier spacing, and accordingly, the number of slots $$(N_{slot}^{frame,\mu})$$

per frame may be different.

$$N_{slot}^{subframe,\mu} \text{ and } N_{slot}^{frame,\mu}$$

according to each subcarrier spacing configuration μ may be defined as shown in [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a configuration of a bandwidth part (BWP) in the 5G communication system will be described in detail with reference to the drawings.

Figure 3:
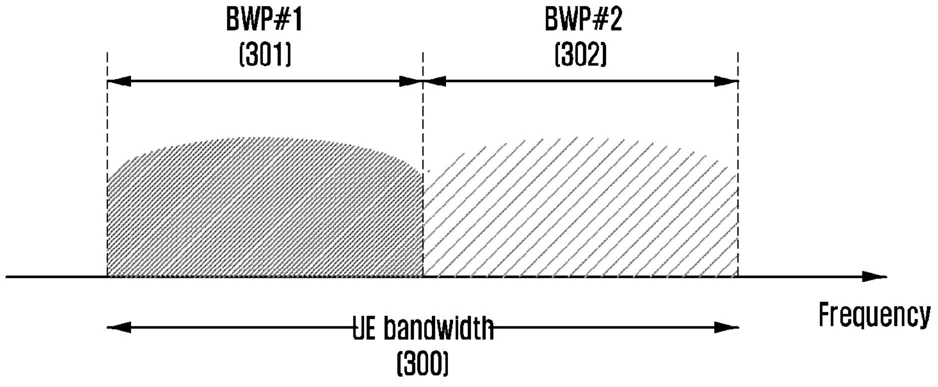
FIG. 3 illustrates an example of a configuration for a bandwidth part (BWP) of the 5G wireless communication system.

FIG. 3 illustrates an example of a configuration of the BWP in the 5G wireless communication system.

Referring to FIG. 3, an example in which a UE bandwidth 300 is configured as two bandwidth parts, that is, BWP #1 301 and BWP #2 302 is illustrated. The BS may configure one or a plurality of BWPs in the UE, and may configure the following information for each BWP.

TABLE 2

| | |
|---|---|
| BWP ::= | SEQUENCE { |
| bwp-Id<br>(BWP identifier) | BWP-Id, |
| locationAndBandwidth<br>(BWP location) | INTEGER (1..65536), |
| subcarrierSpacing<br>(subcarrier spacing) | ENUMERATED {n0, n1, n2, n3, n4, n5}, |
| cyclicPrefix<br>(cyclic prefix) | ENUMERATED { extended } |
| } | |

Of course, the configuration for the BWP is not limited to the above example, and various parameters related to the BWP as well as the configuration information may be configured in the UE. The configuration information may be transmitted to the UE by the BS through higher-layer signaling, for example, radio resource control (RRC) signaling. Among one or a plurality of configured BWPs, at least one BWP may be activated. Information indicating whether to activate the configured BWPs may be semi-statically transmitted from the BS to the UE through RRC signaling or may be dynamically transmitted through downlink control information (DCI).

According to an embodiment, the UE before the radio resource control (RRC) connection may receive a configuration of an initial BWP for initial access from the BS through a master information block (MIB). More specifically, the UE may receive configuration information for a control resource set (CORESET) and a search space in which a PDCCH for receiving system information (remaining system information (RMSI) or system information block 1 (SIB1)) required for initial access through the MIB can be transmitted in an initial access step. Each of the CORESET and the search space configured through the MIB may be considered as an identity (ID) 0. The BS may inform the UE of configuration information such as frequency allocation information for control resource set #0, time allocation information, and numerology through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0.

Configurations for BWPs supported by the 5G wireless communication system may be used for various purposes.

According to an embodiment, when a bandwidth supported by the UE is smaller than a system bandwidth, the configuration for the BWP may be used. For example, the BS may configure a frequency location of the BWP (configuration information 2) in the UE and thus the UE may transmit and receive data at a specific frequency location within the system bandwidth.

Further, according to an embodiment, the BS may configure a plurality of BWPs in the UE to support different numerologies. For example, in order to support all of the data transmission and reception using subcarrier spacing of 15 kHz and subcarrier spacing of 30 kHz in any UE, the BS may configure two BWPs as the subcarrier spacings of 15 kHz and 30 kHz. Different BWPs may be frequency-division-multiplexed, and when the BS desires to transmit and receive data at particular subcarrier spacing, the BWP configured at the corresponding subcarrier spacing may be activated.

Further, according to an embodiment, the BS may configure BWPs having different sizes of bandwidths in the UE to reduce power consumption of the UE. For example, when the UE supports a very large bandwidth, for example, 100 MHz and always transmits and receives data through the corresponding bandwidth, very high power consumption may be generated. Particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively small bandwidth, for example, a BWP of 20 MHz in the UE. The UE may perform a monitoring operation in the BWP of 20 MHz in the state in which there is no traffic, and if data is generated, may transmit and receive data through the BWP of 100 MHz according to an instruction from the BS.

In a method of configuring the BWP, UEs before the RRC connection may receive configuration information for an initial BWP through a master information block (MIB) in an initial access operation. More specifically, the UE may receive a configuration of a control resource set (CORESET) for a downlink control channel in which downlink control information (DCI) for scheduling a system information block (SIB) can be transmitted from an MIB of a physical broadcast channel (PBCH). A bandwidth of the CORESET configured by the MIB may be considered as an initial downlink BWP, and the UE may receive a physical downlink shared channel (PDSCH), in which the SIB is transmitted, through the configured initial BWP. The initial bandwidth part may be used not only for receiving the SIB but also other system information (OSI), paging, or random access.

When one or more BWPs are configured in the UE, the BS may instruct the terminal to change the BWPs through a BWP indicator field within the DCI. For example, when a currently activated BWP of the terminal is BWP #1 301 in FIG. 3, the BS may indicate BWP #2 302 to the terminal through a BWP indicator within DCI, and the terminal may change the BWP into BWP #2 302 indicated by the received BWP indicator within the DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, the standard has prescribed requirements for a delay time ($T_{BWP}$) required for the BWP change, which may be defined as shown in, for example, [Table 2] below.

TABLE 3

| | NR Slot length | BWP switch delay $T_{BWP}$ (slots) | |
|---|---|---|---|
| μ | ms | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change delay time may support type 1 or type 2 according to a UE capability. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot n+$T_{BWP}$ and transmit and receive a data channel scheduled by the corresponding DCI in the changed new BWP. When the BS desires to schedule a data channel in the new BWP, the BS may determine allocation of time domain resources for the data channel in consideration of the BWP change delay time $T_{BWP}$ of the UE. That is, when scheduling the data channel in the new BWP, the BS may schedule the corresponding data channel after the BWP change delay time through a method of determining allocation of time domain resources for the data channel.

Accordingly, the UE may not expect that the DCI indicating the BWP change indicates a slot offset (K0 or K2) smaller than the BWP change delay time ($T_{BWP}$).

If the UE receives DCI (for example, DCI format 1_1 or 0_1) indicating the BWP change, the UE may perform no transmission or reception during a time interval corresponding to symbols from a third symbol of a slot for receiving the PDCCH including the corresponding DCI to a start point of the slot indicated by the slot offset (K0 or K2) indicated by a time domain resource allocation field within the corresponding DCI. For example, when the UE receives DCI indicating the BWP change in slot n and a slot offset value indicated by the corresponding DCI is K, the terminal may perform no transmission or reception from the third symbol of slot n to a symbol before slot n+K (that is, the last symbol of slot n+K−1).

Subsequently, a synchronization signal (SS)/PBCH block in 5G wireless communication system is described.

The SS/PBCH block may be a physical layer channel block including a primary SS (PSS), a secondary SS (SSS), and a PBCH. It may be described below in more detail.

- PSS: is a signal which is a reference of downlink time/frequency synchronization and provides some pieces of information of a cell ID.
- SSS: is a reference of downlink time/frequency synchronization and provides the remaining cell ID information which the PSS does not provide. In addition, the SSS serves as a reference signal for demodulation of a PBCH.
- PBCH: provides necessary system information required for transmitting and receiving a data channel and a control channel by the UE. The necessary system information may include control information related to a search space indicating radio resource mapping information of a control channel, scheduling control information for a separate data channel for transmitting system information, and the like.
- SS/PBCH block: includes a combination of PSS, SSS, and PBCH. One or a plurality of SS/PBCH blocks may be transmitted within a time of 5 ms, and each of the transmitted SS/PBCH blocks may be separated by an index.

The UE may detect the PSS and the SSS in an initial access operation and decode the PBCH. The UE may acquire an MIB from the PBCH and receive a configuration of control resource set (CORESET) #0 (corresponding to a control resource set having control resource set index 0) therefrom. The UE may monitor CORESET #0 on the basis of the assumption that the selected SS/PBCH block and a demodulation reference signal (DMRS) transmitted in CORESET #0 are Quasi Co-Located (QCL). The UE may receive system information through downlink control information transmitted in CORESET #0. The UE may acquire configuration information related to a random access channel (RACH) required for initial access from the received system information. The UE may transmit a physical RACH (PRACH) to the BS in consideration of the selected SS/PBCH index, and the BS receiving the PRACH may acquire information on the SS/PBCH block index selected by the UE. The BS may know which block is selected by the UE from among the SS/PBCH blocks and that CORESET #0 related thereto is monitored.

Subsequently, downlink control information (DCI) in the 5G wireless communication system will be described in detail.

In the 5G system, scheduling information for uplink data (or a physical uplink data channel (physical uplink shared channel (PUSCH)) or downlink data (or physical downlink data channel (physical downlink shared channel (PDSCH)) may be transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a physical downlink control channel (PDCCH) after passing through a channel coding and modulation process. A cyclic redundancy check (CRC) is added to a DCI message payload and is scrambled by a radio network temporary identifier (RNTI) corresponding to the identity of the UE. Depending on the purpose of the DCI message, for example, UE-specific data transmission, a power control command, a random access response, or the like, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI scheduling a PDSCH for a random access response (RAR) message may be scrambled by an RA-RNTI. DCI scheduling a PDSCH for a paging message may be scrambled by a P-RNTI. DCI notifying of a slot format indicator (SFI) may be scrambled by an SFI-RNTI. DCI notifying of transmit power control (TPC) may be scrambled by a TPC-RNTI. DCI for scheduling a UE-specific PDSCH or PSCH may be scrambled by a cell RNTI (C-RNTI), a modulation coding scheme (MCS)-C-RNTI, or a configured scheduling (CS)-RNTI.

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information.

TABLE 4

| |
|---|
| Identifier for DCI formats - 1 bit<br>The value of this bit field is always set to 0, indicating an UL DCI format |
| Frequency domain resource assignment - $\left\lceil \log_2\left(N_{RB}^{UL,BWP}\left(N_{RB}^{UL,BWP}+1\right)/2\right)\right\rceil$ bits where $N_{RB}^{UL,BWP}$ |
| is defined in clause 7.3.1.0<br>For PUSCH hopping with resource allocation type 1:<br>$N_{UL\_hop}$ MSB bits are used to indicate the frequency offset according to Clause 6.3 of [6, TS 38.214], where $N_{UL\_hop}$ =1 if the higher layer parameter frequencyHoppingOffsetLists contains two offset values and $N_{UL\_hop}$ = 2 if the higher layer parameter frequencyHoppingOffsetLists contains four offset values |

TABLE 4-continued

| |
|---|
| $\lceil \log_2(N_{RB}^{UL,BWP}(N_{RB}^{UL,BWP}+1)/2) \rceil$ - $N_{UL\_hop}$ bits provides the frequency domain resource allocation according to Clause 6.1.2.2.2 of [6, TS 38.214] |
| For non-PUSCH hopping with resource allocation type 1: |
| $\lceil \log_2(N_{RB}^{UL,BWP}(N_{RB}^{UL,BWP}+1)/2) \rceil$ bits provides the frequency domain resource allocation according to Clause 6.1.2.2.2 of [6, TS 38.214] |
| Time domain resource assignment - 4 bits as defined in Clause 6.1.2.1 of [6, TS 38.214] |
| Frequency hopping flag - 1 bit according to Table 7.3.1.1.1-3, as defined in Clause 6.3 of [6, TS 38.214] |
| Modulation and coding scheme - 5 bits as defined in Clause 6.1.4.1 of [6, TS 38.214] |
| New data indicator - 1 bit |
| Redundancy version - 2 bits as defined in Table 7.3.1.1.1-2 |
| HARQ process number - 4 bits |
| TPC command for scheduled PUSCH - 2 bits as defined in Clause 7.1.1 of [5, TS 38.213] |
| Padding bits, if required. |
| UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s). |
| If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured; |
| If the UL/SUL indicator is not present in DCI format 0_0 and pucch-Config is configured, the corresponding PUSCH scheduled by the DCI format 0_0 is for the UL or SUL for which high layer parameter pucch-Config is configured. |
| If the UL/SUL indicator is not present in DCI format 0_0 and pucch-Config is not configured, the corresponding PUSCH scheduled by the DCI format 0_0 is for the uplink on which the latest PRACH is transmitted. |

DCI format 0_1 may be used for non-fallback DCI for scheduling a PUSCH in which case the CRC may be scrambled with a C-RNTI. DCI format 0_1 in which the CRC is scrambled by the C-RNTI may include, for example, the following information.

TABLE 5

| |
|---|
| Identifier for DCI formats - 1 bit |
| The value of this bit field is always set to 0, indicating an UL DCI format |
| Carrier indicator - 0 or 3 bits, as defined in Clause 10.1 of [5, TS38.213]. |
| UL/SUL indicator - 0 bit for UEs not configured with supplementaryUplink in ServingCellConfig in the cell or UEs configured with supplementaryUplink in ServingCellConfig in the cell but only one carrier in the cell is configured for PUSCH transmission; otherwise, 1 bit as defined in Table 7.3.1.1.1-1. |
| Bandwidth part indicator - 0, 1 or 2 bits as determined by the number of UL BWPS $n_{BWP,RRC}$ configured by higher layers, excluding the initial UL bandwidth part. The bitwidth for this field is determined as $\lceil \log_2(n_{BWP}) \rceil$ bits, where |
| $n_{BWP} = n_{BWP,RRC} + 1$ if $n_{BWP,RRC} \leq 3$, in which case the bandwidth part indicator is equivalent to the ascending order of the higher layer parameter BWP-Id; |
| otherwise $n_{BWP} = n_{BWP,RRC}$, in which case the bandwidth part indicator is defined in Table 7.3.1.1.2-1; |
| If a UE does not support active BWP change via DCI, the UE ignores this bit field. |
| Frequency domain resource assignment - number of bits determined by the following, where $N_{RB}^{UL,BWP}$ is the size of the active UL bandwidth part: |
| $N_{RBG}$ bits if only resource allocation type 0 is configured, where $N_{RBG}$ is defined in Clause 6.1.2.2.1 of [6, TS 38.214], |
| $\lceil \log_2(N_{RB}^{UL,BWP}(N_{RB}^{UL,BWP}+1)/2) \rceil$ bits if only resource allocation type 1 is configured, or |
| $\max(\lceil \log_2(N_{RB}^{UL,BWP}(N_{RB}^{UL,BWP}+1)/2) \rceil, N_{RG}) + 1$ bits if both resource allocation type 0 and 1 are configured. |
| If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1. |
| For resource allocation type 0, the $N_{RBG}$ LSBs provide the resource allocation as defined in Clause 6.1.2.2.1 of [6, TS 38.214]. |
| For resource allocation type 1, the $\lceil \log_2(N_{RB}^{UL,BWP}(N_{RB}^{UL,BWP}+1)/2) \rceil$ |

TABLE 5-continued

LSBs provide the resource allocation as follows:
For PUSCH hopping with resource allocation type 1:
$N_{UL\_hop}$ MSB bits are used to indicate the frequency offset according to Clause 6.3 of [6, TS 38.214],
where $N_{UL\_hop} = 1$ if the higher layer parameter frequencyHoppingOffsetLists contains two offset values and
$N_{UL\_hop} = 2$ if the higher layer parameter frequencyHoppingOffsetLists contains four offset values $\lceil \log_2(N_{RB}^{UL,BWP}(N_{RB}^{UL,BWP}+1)/2) \rceil - N_{UL\_hop}$ bits provides the frequency domain resource allocation according to Clause 6.1.2.2.2 of [6, TS 38.214]
For non-PUSCH hopping with resource allocation type 1:

$\lceil \log_2(N_{RB}^{UL,BWP}(N_{RB}^{UL,BWP}+1)/2) \rceil$ bits provides the frequency domain resource allocation according to Clause 6.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment - 0, 1, 2, 3, or 4 bits as defined in Clause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.
Frequency hopping flag - 0 or 1 bit:
0 bit if only resource allocation type 0 is configured or if the higher layer parameter frequencyHopping is not configured;
1 bit according to Table 7.3.1.1.1-3 otherwise, only applicable to resource allocation type 1, as defined in Clause 6.3 of [6, TS 38.214].
Modulation and coding scheme - 5 bits as defined in Clause 6.1.4.1 of [6, TS 38.214]
New data indicator - 1 bit
Redundancy version - 2 bits as defined in Table 7.3.1.1.1-2
HARQ process number - 4 bits
1st downlink assignment index - 1 or 2 bits:
1 bit for semi-static HARQ-ACK codebook;
2 bits for dynamic HARQ-ACK codebook.
2nd downlink assignment index - 0 or 2 bits:
2 bits for dynamic HARQ-ACK codebook with two HARQ-ACK sub-codebooks;
0 bit otherwise.
TPC command for scheduled PUSCH - 2 bits as defined in Clause 7.1.1 of [5, TS38.213]

SRS resource indicator - $\left\lceil \log_2\left(\sum_{k=1}^{\min\{L_{max},N_{SRS}\}} \binom{N_{SRS}}{k}\right)\right\rceil$ or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook', $\left\lceil \log_2\left(\sum_{k=1}^{\min\{L_{max},N_{SRS}\}} \binom{N_{SRS}}{k}\right)\right\rceil$ bits according to Tables 7.3.1.1.2 – 28/29/30/31 if the higher layer parameter txConfig = nonCodebook, where NSRS is the number of configured SRS resources in the SRS resource set associated with the higher layer parameter usage of value 'nonCodeBook' and
if UE supports operation with maxMIMO-Layers and the higher layer parameter maxMIMO-Layers of PUSCH-ServingCellConfig of the serving cell is configured, $L_{max}$ is given by that parameter
otherwise, $L_{max}$ is given by the maximum number of layers for PUSCH supported by the UE for the serving cell for non-codebook based operation.
[$\lceil \log_2(N_{SRS}) \rceil$] bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.
Precoding information and number of layers - number of bits determined by the following:
0 bits if the higher layer parameter txConfig = nonCodeBook;
0 bits for 1 antenna port and if the higher layer parameter txConfig = codebook,
4, 5, or 6 bits according to Table 7.3.1.1.2-2 for 4 antenna ports, if txConfig = codebook, and according to whether transform precoder is enabled or disabled, and the values of higher layer parameters maxRank, and codebookSubset;
2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset,
2 or 4 bits according to Table7.3.1.1.2-4 for 2 antenna ports, if txConfig = codebook, and according to whether transform precoder is enabled or disabled, and the values of higher layer parameters maxRank and codebookSubset;
1 or 3 bits according to Table7.3.1.1.2-5 for 2 antenna ports, if txConfig = codebook, and according to whether transform precoder is enabled or disabled, and the values of higher layer parameters maxRank and codebookSubset.
Antenna ports - number of bits determined by the following
2 bits as defined by Tables 7.3.1.1.2-6, if transform precoder is enabled, dmrs-Type = 1, and maxLength = 1;
4 bits as defined by Tables 7.3.1.1.2-7, if transform precoder is enabled, dmrs-Type = 1, and maxLength = 2;
3 bits as defined by Tables 7.3.1.1.2-8/9/10/11, if transform precoder is disabled, dmrs-Type = 1, and maxLength = 1, TABLE 5-continued

| |
|---|
| and the value of rank is determined according to the SRS resource indicator field if the higher layer parameter txConfig = nonCodebook and according to the Precoding information and number of layers field if the higher layer parameter txConfig = codebook; |
| 4 bits as defined by Tables 7.3.1.1.2-12/13/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook; |
| 4 bits as defined by Tables 7.3.1.1.2-16/17/18/19, if transform precoder is disabled, dmrs-Type = 2, and maxLength = 1, and the value of rank is determined according to the SRS resource indicator field if the higher layer parameter txConfig = nonCodebook and according to the Precoding information and number of layers field if the higher layer parameter txConfig = codebook; |
| 5 bits as defined by Tables 7.3.1.1.2-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook. |
| where the number of CDM groups without data of values 1, 2, and 3 in Tables 7.3.1.1.2-6 to 7.3.1.1.2-23 refers to CDM groups {0}, {0,1}, and {0, 1,2} respectively. |
| If a UE is configured with both dmrs-UplinkForPUSCH-MappingTypeA and dmrs-UplinkForPUSCH-MappingTypeB, the bitwidth of this field equals max $\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $\lvert x_A - x_B \rvert$ zeros are padded in the MSB of this field, if the mapping type of the PUSCH corresponds to the smaller value of $x_A$ and $x_B$. |
| SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Clause 6.1.1.2 of [6, TS 38.214]. |
| CSI request - 0, 1, 2, 3, 4, 5, or 6 bits determined by higher layer parameter reportTriggerSize. |
| CBG transmission information (CBGTI) - 0 bit if higher layer parameter codeBlockGroupTransmission for PUSCH is not configured, otherwise, 2, 4, 6, or 8 bits determined by higher layer parameter maxCodeBlockGroupsPerTransportBlock for PUSCH. |
| PTRS-DMRS association - number of bits determined as follows |
| 0 bit if PTRS-UplinkConfig is not configured and transform precoder is disabled, or if transform precoder is enabled, or if maxRank = 1; |
| 2 bits otherwise, where Table 7.3.1.1.2-25 and 7.3.1.1.2-26 are used to indicate the association between PTRS port(s) and DMRS port(s) when one PT-RS port and two PT-RS ports are configured by maxNrofPorts in PTRS-UplinkConfig respectively, and the DMRS ports are indicated by the Antenna ports field. |
| If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part. |
| beta offset indicator - 0 if the higher layer parameter betaOffsets = semiStatic; otherwise 2 bits as defined by Table 9.3-3 in [5, TS 38.213]. |
| DMRS sequence initialization - 0 bit if transform precoder is enabled; 1 bit if transform precoder is disabled. |
| UL-SCH indicator - 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s). |

DCI format 1_0 may be used for fallback DCI for scheduling a PDSCH in which case the CRC may be scrambled with a C-RNTI. DCI format 1_0 in which the CRC is scrambled by the C-RNTI may include, for example, the following information.

TABLE 6

| |
|---|
| Identifier for DCI formats - 1 bits |
| The value of this bit field is always set to 1, indicating a DL DCI format |
| Frequency domain resource assignment - $\lceil \log_2(N_{RB}^{DL,BWP}(N_{RB}^{DL,BWP}+1)/2) \rceil$ bits where $N_{RB}^{DL,BWP}$ is given by clause 7.3.1.0 |
| If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows: |
| Random Access Preamble index - 6 bits according to ra-PreambleIndex in Clause 5.1.2 of [8, TS38.321] |
| UL/SUL indicator - 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved |
| SS/PBCH index - 6 bits. If the value of the "Random Access Preamble index" is not all zeros, this field indicates the SS/PBCH that shall be used to determine the RACH occasion for the PRACH transmission; otherwise, this field is reserved. |

TABLE 6-continued

| |
|---|
| PRACH Mask index - 4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved |
| Reserved bits - 10 bits |
| Otherwise, all remaining fields are set as follows: |
| Time domain resource assignment - 4 bits as defined in Clause 5.1.2.1 of [6, TS 38.214] |
| VRB-to-PRB mapping - 1 bit according to Table 7.3.1.2.2-5 |
| Modulation and coding scheme - 5 bits as defined in Clause 5.1.3 of [6, TS 38.214] |
| New data indicator - 1 bit |
| Redundancy version - 2 bits as defined in Table 7.3.1.1.1-2 |
| HARQ process number - 4 bits |
| Downlink assignment index - 2 bits as defined in Clause 9.1.3 of [5, TS 38.213], as counter DAI |
| TPC command for scheduled PUCCH - 2 bits as defined in Clause 7.2.1 of [5, TS 38.213] |
| PUCCH resource indicator - 3 bits as defined in Clause 9.2.3 of [5, TS 38.213] |
| PDSCH-to-HARQ feedback timing indicator - 3 bits as defined in Clause 9.2.3 of [5, TS38.213] |

DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information.

TABLE 7

Identifier for DCI formats - 1 bits
The value of this bit field is always set to 1, indicating a DL DCI format
Carrier indicator - 0 or 3 bits as defined in Clause 10.1 of [5, TS 38.213].
Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
$n_{BWP} = n_{BWP,RRC} + 1$ if $n_{BWP,RRC} \leq 3$, in which case the bandwidth part indicator is equivalent to the ascending order of the higher layer parameter BWP-Id;
otherwise $n_{BWP} = n_{BWP,RRC}$, in which case the bandwidth part indicator is defined in Table 7.3.1.1.2-1;
If a UE does not support active BWP change via DCI, the UE ignores this bit field.

Frequency domain resource assignment - number of bits determined by the following, where $N_{RB}^{DL,BWP}$ is the size of the active DL bandwidth part:
$N_{RBG}$ bits if only resource allocation type 0 is configured, where $N_{RBG}$ is defined in Clause 5.1.2.2.1 of [6, TS38.214], $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil N_{RBG}) + 1$ bits if only resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Clause 5.1.2.2.1 of [6, TS 38.214].

For resource allocation type 1, the $\lceil \log_2(N_{RB}^{DL,BWP}(N_{RB}^{DL,BWP}+1)/2) \rceil$ LSBs provide the resource allocation as defined in Clause 5.1.2.2.2 of [6, TS 38.214]
If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment - 0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
VRB-to-PRB mapping - 0 or 1 bit:
0 bit if only resource allocation type 0 is configured or if interleaved VRB-to-PRB mapping is not configured by high layers;
1 bit according to Table 7.3.1.2.2-5 otherwise, only applicable to resource allocation type 1, as defined in Clause 7.3.1.6 of [4, TS 38.211].
PRB bundling size indicator - 0 bit if the higher layer parameter prb-BundlingType is not configured or is set to 'staticBundling', or 1 bit if the higher layer parameter prb-BundlingType is set to 'dynamicBundling' according to Clause 5.1.2.3 of [6, TS 38.214].

TABLE 7-continued

| |
|---|
| Rate matching indicator - 0, 1, or 2 bits according to higher layer parameters rateMatchPatternGroupl and rateMatchPatternGroup2, where the MSB is used to indicate rateMatchPatternGroupl and the LSB is used to indicate rateMatchPatternGroup2 when there are two groups. |
| ZP CSI-RS trigger - 0, 1, or 2 bits as defined in Clause 5.1.4.2 of [6, TS 38.214]. The bitwidth for this field is determined as $\lceil \log_2(n_{ZP}+1) \rceil$ bits, where $n_{ZP}$ is the number of aperiodic ZP CSI-RS resource sets configured by higher layer. |
| For transport block 1: |
| Modulation and coding scheme - 5 bits as defined in Clause 5.1.3.1 of [6, TS 38.214] |
| New data indicator - 1 bit |
| Redundancy version - 2 bits as defined in Table 7.3.1.1.1-2 |
| For transport block 2 (only present if maxNrofCodeWordsScheduledByDCI equals 2): |
| Modulation and coding scheme - 5 bits as defined in Clause 5.1.3.1 of [6, TS 38.214] |
| New data indicator - 1 bit |
| Redundancy version - 2 bits as defined in Table 7.3.1.1.1-2 |
| If “Bandwidth part indicator” field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the “Modulation and coding scheme”, “New data indicator”, and “Redundancy version” fields of transport block 2 according to Clause 12 of [5, TS38.213], and the UE ignores the “Modulation and coding scheme”, “New data indicator”, and “Redundancy version” fields of transport block 2 for the indicated bandwidth part. |
| HARQ process number - 4 bits |
| Downlink assignment index - number of bits as defined in the following |
| 4 bits if more than one serving cell are configured in the DL and the higher layer parameter pdsch-HARQ-ACK-Codebook = dynamic, where the 2 MSB bits are the counter DAI and the 2 LSB bits are the total DAI; |
| 2 bits if only one serving cell is configured in the DL and the higher layer parameter pdsch-HARQ-ACK-Codebook = dynamic, where the 2 bits are the counter DAI; |
| 0 bits otherwise. |
| If the UE is configured with a PUCCH-SCell, the number of serving cells is determined within a PUCCH group. |
| TPC command for scheduled PUCCH - 2 bits as defined in Clause 7.2.1 of [5, TS 38.213] |
| PUCCH resource indicator - 3 bits as defined in Clause 9.2.3 of [5, TS 38.213] |
| PDSCH-to-HARQ_feedback timing indicator - 0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataToUL-ACK. |
| Antenna port(s) - 4, 5, or 6 bits as defined by Tables 7.3.1.2.2-1/2/3/4, where the number of CDM groups without data of values 1, 2, and 3 refers to CDM groups {0}, {0, 1}, and {0, 1, 2} respectively. The antenna ports $\{P_0, \ldots, P_{v-1}\}$ shall be determined according to the ordering of DMRS port(s) given by Tables 7.3.1.2.2-1/2/3/4. |
| If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the “Antenna ports” bitwidth derived according to dmrs-DownlinkForPDSCH-MappingTypeA and $x_B$ is the “Antenna ports” bitwidth derived according to dmrs-DownlinkForP DSCH-MappingTypeB. A number of $\lvert x_A - x_B \rvert$ zeros are padded in the MSB of this field, if the mapping type of the PDSCH corresponds to the smaller value of $x_A$ and $x_B$. |
| Transmission configuration indication - 0 bit if higher layer parameter tci-PresentInDCI is not enabled; otherwise 3 bits as defined in Clause 5.1.5 of [6, TS38.214]. |
| If “Bandwidth part indicator” field indicates a bandwidth part other than the active bandwidth part, |
| if the higher layer parameter tci-PresentInDCI is not enabled for the CORESET used for the PDCCH carrying the DCI format 1_1, |
| the UE assumes tci-PresentInDCI is not enabled for all CORESETs in the indicated bandwidth part; |
| otherwise, |
| the UE assumes tci-PresentInDCI is enabled for all CORESETs in the indicated bandwidth part. |
| SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Clause 6.1.1.2 of [6, TS 38.214]. |
| CBG transmission information (CBGTI) - 0 bit if higher layer parameter codeBlockGroupTransmission for PDSCH is not configured, otherwise, 2, 4, 6, or 8 bits as defined in Clause 5.1.7 of [6, TS38.214], determined by the higher layer parameters maxCodeBlockGroupsPerTransportBlock and maxNrofCodeWordsScheduledByDCI for the PDSCH. |
| CBG flushing out information (CBGFI) - 1 bit if higher layer parameter codeBlockGroupFlushIndicator is configured as “TRUE”, 0 bit otherwise. |
| DMRS sequence initialization - 1 bit. |

Hereinafter, a method of allocating time domain resources for data channels in the 5G wireless communication system will be described.

The BS may configure a table for time domain resource allocation information for a downlink data channel (physical downlink shared channel (PDSCH)) and an uplink data channel (physical uplink shared channel (PUSCH)) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include, for example, PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), information on a location and a length of a start symbol in which a PDSCH or a PUSCH is scheduled within the slot, a mapping type of a PDSCH or a PUSCH, and the like. For example, information shown in [Table 8] and [Table 9] below may be notified to the UE by the BS.

TABLE 8

| PDSCH-TimeDomainResourceAllocationList information element |
|---|
| PDSCH-TimeDomainResourceAllocationList ::= SEQUENCE (SIZE(1..maxNrofDL-Allocations)) OF PDSCH-TimeDomainResourceAllocation<br>PDSCH-TimeDomainResourceAllocation ::= SEQUENCE {<br>k0 INTEGER(0..32)<br>OPTIONAL, -- Need S<br>(PDCCH-to-PDSCH timing, slot unit)<br>mappingType ENUMERATED {typeA, typeB},<br>(PDSCH mapping type)<br>startSymbolAndLength INTEGER (0..127)<br>(start symbol and length of PDSCH)<br>} |

TABLE 9

| PUSCH-TimeDomainResourceAllocation information element |
|---|
| PUSCH-TimeDomainResourceAllocationList ::= SEQUENCE (SIZE(1..maxNrofUL-Allocations)) OF PUSCH-TimeDomainResourceAllocation<br>PUSCH-TimeDomainResourceAllocation ::= SEQUENCE {<br>k2 INTEGER(0..32) OPTIONAL,<br>-- Need S<br>(PDCCH-to-PUSCH timing, slot unit)<br>mappingType ENUMERATED {typeA, typeB },<br>(PUSCH mapping type)<br>startSymbolAndLength INTEGER (0..127)<br>(start symbol and length of PUSCH)<br>} |

The BS may inform the UE of one of the entries in the table for the time domain resource allocation information through L1 signaling (for example, DCI) (for example, indicated through a 'time domain resource allocation field within DCI). The UE may acquire time domain resource allocation information for a PDSCH or a PUSCH on the basis of the DCI received from the BS.

Hereinafter, a method of allocating frequency domain resources for data channels in the 5G wireless communication system will be described.

In the 5G wireless communication system, two types, such as resource allocation type 0 and resource allocation type 1, are supported as a method of indicating frequency domain resource allocation information for a downlink data channel (physical downlink shared channel (PDSCH) and an uplink data channel (physical uplink shared channel (PUSCH)).

Resource Allocation Type 0

The BS may inform the UE of RB allocation information in the form of a bitmap for a resource block group (RBG). At this time, the RBG may include a set of successive virtual RBs (VRBs), and the size P of the RBG may be determined on the basis of a value configured as a higher-layer parameter (rbg-Size) and a value of the size of a BWP defined in the following table.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number $N_{RBG}$ of RBGs of a BWP i having the size of $$N_{BWP,i}^{size}$$

may be defined as below.

$$N_{RBG} = \lceil (N_{BWP,i}^{size} + (N_{BWP,i}^{start} \bmod P))/P \rceil,$$

where f the size of the first RBG is $$RBG_0^{size} = P - N_{BWP,i}^{start} \bmod P,$$

the size of last RBG is $$RBG_{last}^{size} = (N_{BWP,i}^{start} + N_{BWP,i}^{size}) \bmod P \text{ if } (N_{BWP,i}^{start} + N_{BWP,i}^{size}) \bmod P > 0$$

and P otherwise, the size of all other RBGs is P.

Bits in a bitmap having the bit size of $N_{RBG}$ may correspond to respective RBGs. Indexes may be assigned to the RBGs in the order of increasing frequencies starting from the lowest frequency. For $N_{RBG}$ RBGs within the BWP, RBGs from RBG #0 to RBG #($N_{RBG}$−1) may be mapped to bits from the MSB to the LSB in the RBG bitmap. When a specific bit value within the bitmap is 1, the UE may determine that an RBG corresponding to the corresponding bit value is allocated. When a specific bit value within the bitmap is 0, the UE may determine that an RBG corresponding to the corresponding bit value is not allocated.

Resource Allocation Type 1

The BS may inform the UE of information on a start location and a length of VRBs to which RB allocation information is successively allocated. At this time, interleaving or non-interleaving may be additionally applied to the successively allocated VRBs. A resource allocation field of resource allocation type 1 may include a resource indication value (RIV), and the RIV may include a start point ($RB_{start}$) of the VRB and a length ($L_{RBs}$) of successively allocated RBs. More specifically, the RIV within the BWP having the size of $$N_{BWP}^{size}$$

may be defined as below.

if $$(L_{RBs}-1)\leq\lfloor N_{BWP}^{size}/2\rfloor$$

then $$RIV=N_{BWP}^{size}(L_{RBs}-1)+RB_{start}$$

else $$RIV=N_{BWP}^{size}(N_{BWP}^{size}-L_{RBs}+1)+(N_{BWP}^{size}-1-RB_{start})$$

where $L_{RBs}\geq 1$ and shall not exceed $$N_{BWP}^{size}-RB_{start}.$$

The BS may configure a resource allocation type in the UE through higher-layer signaling (for example, a higher-layer parameter resourceAllocation may be configured as one value among resourceAllocationType0, resourceAllocationType1, or dynamicSwitch). If the UE receives a configuration of both types 0 and 1 (or if the higher-layer parameter resourceAllocation is equally configured as dynamicSwitch), the BS may show whether a bit corresponding to the most significant bit (MSB) of the field indicating resource allocation within the DCI format indicating scheduling is resource allocation type 0 or resource allocation type 1. Further, resource allocation information may be indicated through the remaining bits except for the bit corresponding to the MSB, based on the indicated resource allocation type, and the UE may analyze resource allocation field information of the DCI field, based thereon. If the UE receives a configuration of one of resource allocation type 0 or resource allocation type 1 (or if the higher-layer parameter resourceAllocation is configured as one value among resourceAllocationType0 or resourceAllocationType1), resource allocation information may be indicated based on a field indicating resource allocation within the DCI format indicating scheduling and the UE may analyze resource allocation field information of the DCI field, based thereon.

Hereinafter, a modulation and coding scheme (MCS) used in the 5G wireless communication system will be described in detail.

In 5G, a plurality of MCS index tables are defined for PDSCH and PUSCH scheduling. An MCS table assumed by the UE among the plurality of MCS tables may be configured or indicated to the UE through higher-layer signaling or L1 signaling or through an RNTI value assumed by the UE during PDCCH decoding.

MCS index table 1 for a PDSCH and a CP-OFDM-based PUSCH (or PUSCH without transform precoding) may be as shown in [Table 11] below.

TABLE 11

MCS index table 1 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

MCS index table 2 for a PDSCH and a CP-OFDM-based PUSCH (or PUSCH without transform precoding) may be as shown in [Table 12] below.

TABLE 12

MCS index table 2 for PDSCH

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |

TABLE 12-continued

MCS index table 2 for PDSCH

| MCS Index $I_{MCS}$ | Modulation Order $Q_m$ | Target code Rate R × [1024] | Spectral efficiency |
|---|---|---|---|
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

MCS index table 3 for a PDSCH and a CP-OFDM-based PUSCH (or PUSCH without transform precoding) may be as shown in [Table 13] below.

TABLE 13

MCS index table 3 for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

MCS index table 1 for a DFT-s-OFDM-based PUSCH (or PUSCH with transform precoding) may be as shown in [Table 14] below.

TABLE 14

MCS index table for PUSCH with transform precoding and 64 QAM

| MCS Index $I_{MCS}$ | Modulation Order $Q_m$ | Target code Rate R × [1024] | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

MCS index table 2 for a DFT-s-OFDM-based PUSCH (or PUSCH with transform precoding) may be as shown in [Table 15] below.

TABLE 15

MCS index table 2 for PUSCH with transform precoding and 64 QAM

| MCS Index $I_{MCS}$ | Modulation Order $Q_m$ | Target code Rate R × [1024] | Spectral efficiency |
|---|---|---|---|
| 0 | q | 60/g | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |

TABLE 15-continued

| MCS index table 2 for PUSCH with transform precoding and 64 QAM | | | |
|---|---|---|---|
| MCS Index $I_{MCS}$ | Modulation Order $Q_m$ | Target code Rate R × [1024] | Spectral efficiency |
| 27 | 6 | 772 | 4.5234 |
| 28 | q | reserved | |
| 29 | 2 | reserved | |
| 30 | 4 | reserved | |
| 31 | 6 | reserved | |

An MCS index table for a PUSCH to which transform precoding (or discrete Fourier transform (DFT) precoding) and 64 QAM are applied may be as shown in [Table 16] below.

TABLE 16

| MCS Index $I_{MCS}$ | Modulation Order $Q_m$ | Target code Rate R × [1024] | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

An MCS index table for a PUSCH to which transform precoding (or discrete Fourier transform (DFT) precoding) and 64 QAM are applied may be as shown in [Table 17] below.

TABLE 17

| MCS Index $I_{MCS}$ | Modulation Order $Q_m$ | Target code Rate R × [1024] | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

Hereinafter, a downlink control channel in the 5G wireless communication system will be described in more detail with reference to the drawings.

Figure 4:
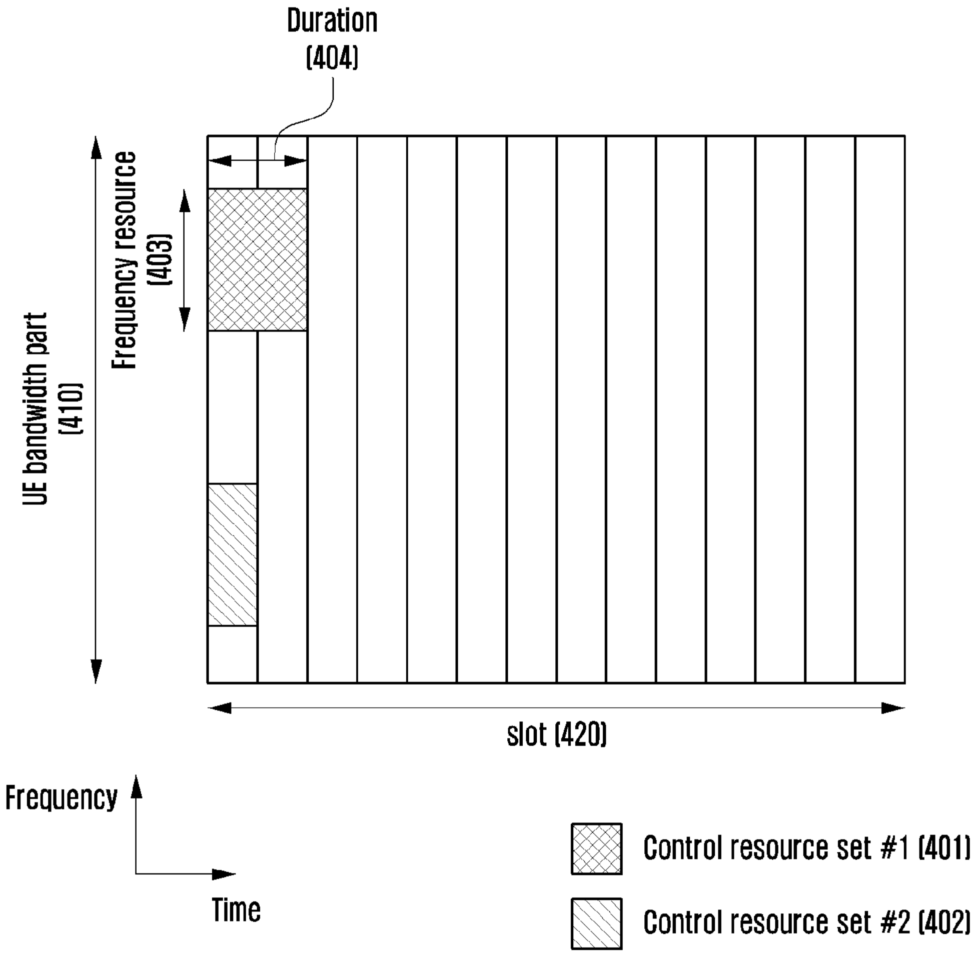
FIG. 4 illustrates an example for a control resource set in which a downlink control channel is transmitted in the 5G wireless communication system.

FIG. 4 illustrates an example of a control resource set (CORESET) in which a downlink control channel is transmitted in the 5G wireless communication system.

Referring to FIG. 4, a UE bandwidth part 410 may be configured in a frequency axis and two CORESETs (CORESET #1 401 and CORESET #2 402) may be configured within one slot 420 in a time axis. The CORESETs 401 and 402 may be configured in specific frequency resources 403 within the entire UE BWP 410 in the frequency axis. Further, the CORESETs 401 and 402 may be configured as one or a plurality of OFDM symbols in the time axis, which may be defined as control resource set duration 404. Referring to the example illustrated in FIG. 4, CORESET #1 401 may be configured as CORESET duration of two symbols, and CORESET #2 402 may be configured as CORESET duration of one symbol. The CORESET in the 5G wireless communication system may be configured in the UE by the BS through higher-layer signaling (for example, system information, a master information block (MIB), or radio resource control (RRC) signaling). Configuring the CORESET in the UE may mean providing information such as an identity of the CORESET, a frequency location of the CORESET, a symbol length of the CORESET, and the like. For example, the following information may be included.

TABLE 18

| | |
|---|---|
| ControlResourceSet ::= | SEQUENCE { |
| Corresponds to L1 parameter 'CORESET-ID' | |
| controlResourceSetId | ControlResourceSetId, |
| (control resource set identity) | |
| frequencyDomainResources | BIT STRING (SIZE (45)), |
| (frequency axis resource allocation information) | |
| duration | INTEGER (1..maxCoReSetDuration), |
| (time axis resource allocation information) | |
| cce-REG-MappingType | CHOICE { |
| (CCE-to-REG mapping scheme) | |
| interleaved | SEQUENCE { |
| reg-BundleSize | ENUMERATED {n2, n3, n6}, |
| (REG bundle size) | |
| precoderGranularity | ENUMERATED {sameAsREG-bundle, allContiguousRBs}, |
| interleaverSize | ENUMERATED {n2, n3, n6} |
| (interleaver size) | |
| shiftIndex | INTEGER(0..maxNrofPhysicalResourceBlocks-1) OPTIONAL |
| (interleaver shift) | |
| }, | |
| nonInterleaved | NULL |
| }, | |
| tci-StatesPDCCH | SEQUENCE(SIZE (1..maxNrofTCI-StatesPDCCH)) OF TCI-StateId OPTIONAL, |
| (QCL configuration information) | |
| tci-PresentInDCI | ENUMERATED {enabled} OPTIONAL, -- Need S |
| } | |

In [Table 18], tci-StatesPDCCH (simply, referred to as a transmission configuration indication (TCI) state) configuration information may include information on one or a plurality of synchronization signal (SS)/physical broadcast channel (PBCH) block indexes or channel state information reference signal (CSI-RS) indexes having the quasi co-located (QCL) relationship with a demodulation reference signal (DMRS) transmitted in the corresponding CORESET.

Figure 5:
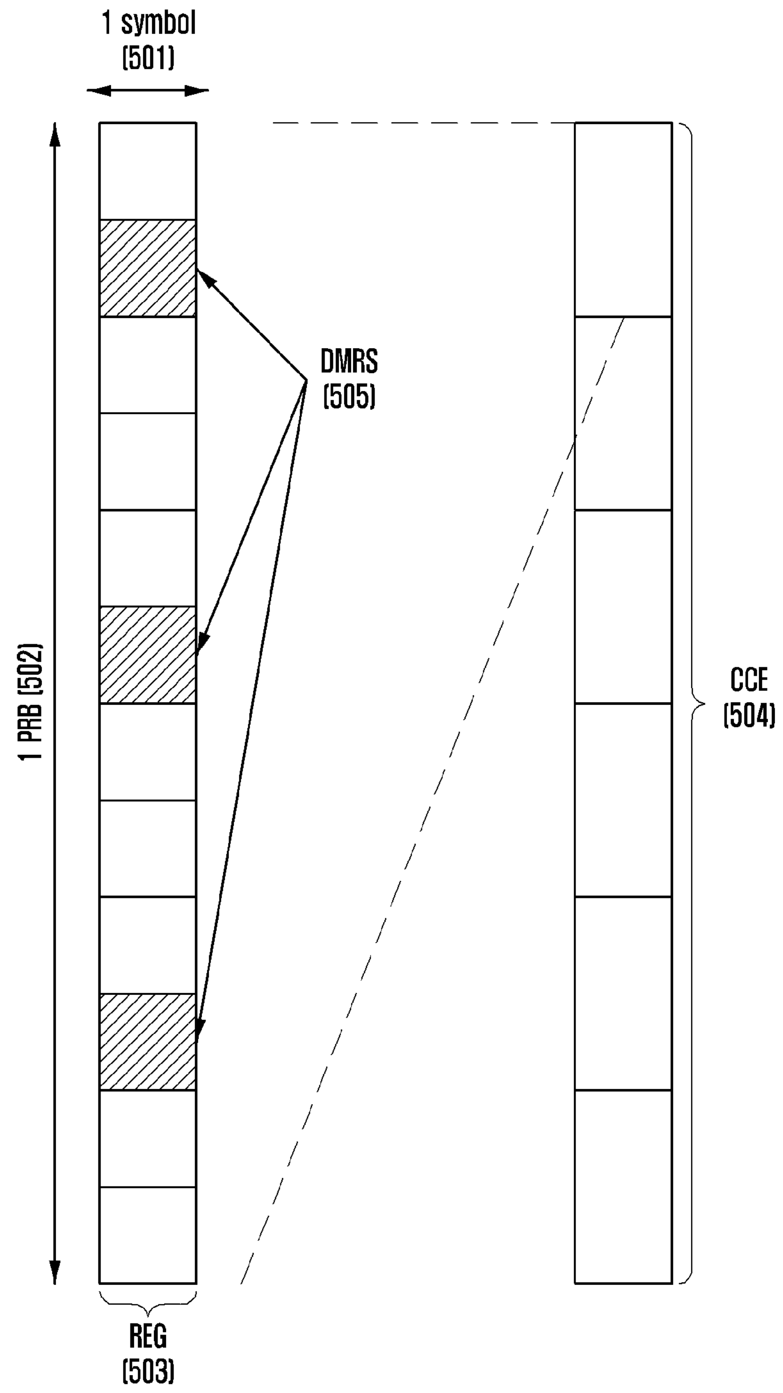
FIG. 5 illustrates the structure of a downlink control channel of the 5G wireless communication system.

FIG. 5 illustrates a structure of a downlink control channel in the 5G wireless communication system.

That is, FIG. 5 illustrates an example of a basic unit of time and frequency resources included in a downlink control channel which can be used in the 5G wireless communication system.

Referring to FIG. 5, the basic unit of time and frequency resources included in the control channel may be a resource element group (REG) 503, and the REG 503 may be defined as one OFDM symbol 501 in the time axis and one physical resource block (PRB) 502, that is, as 12 subcarriers in the frequency axis. The BS may configure a downlink control channel allocation unit by concatenating the REGs 503.

As illustrated in FIG. 5, if the basic unit in which the downlink control channel is allocated in the 5G wireless communication system is a control channel element (CCE) 504, one CCE 504 may consist of a plurality of REGs 503. For example, the REG 503 illustrated in FIG. 5 may include 12 REs and, when 1 CCE 504 includes 6 REGs 503, 1 CCE 504 may include 72 REs.

When a downlink CORESET is configured, the corresponding area may include a plurality of CCEs 504, and a specific downlink control channel may be mapped to one or a plurality of CCEs 504 according to an aggregation level (AL) within the CORESET and then transmitted. The CCEs 504 within the CORESET may be distinguished by numbers, and at this time, the numbers of the CCEs 504 may be assigned according to a logical mapping scheme.

The basic unit of the downlink control channel illustrated in FIG. 5, that is, the REG 503, may include all REs to which the DCI is mapped and the region to which a DMRS 505, which is a reference signal for decoding the REs, is mapped. As illustrated in FIG. 5, 3 DMRSs 505 may be transmitted within 1 REG 503. The number of CCEs required to transmit the PDCCH may be 1, 2, 4, 8, or 16 according to the aggregation level (AL), and the different number of CCEs may be used to implement link adaptation of the downlink control channel. For example, if AL=L, one downlink control channel may be transmitted through L CCEs. The UE is required to detect a signal in the state in which the UE is not aware of information on the downlink control channel, and a search space indicating a set of CCEs is defined for blind decoding. The search space is a set of downlink control channel candidates including CCEs for which the UE should attempt decoding at the given aggregation level, and there are several aggregation levels at which one set of CCEs is configured by 1, 2, 4, 8, and 16 CCEs, so that the UE may have a plurality of search spaces. The search space set may be defined as a set of search spaces at all configured aggregation levels.

The search spaces may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for a common-search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

In the 5G wireless communication system, parameters for the search space of the PDCCH may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a terminal-specific search space, a combination of a DCI format and an RNTI to be monitored in the corresponding search space, and a control resource set index for monitoring the search space. For example, the parameters for the PDCCH search space may include the following information.

TABLE 19

```
SearchSpace ::=                         SEQUENCE {
Identity of the search space. SearchSpaceId = 0 identifies the SearchSpace configured via PBCH
(MIB) or ServingCellConfigCommon.
search SpaceId                          SearchSpaceId,
(search space identifier)
controlResourceSetId                    ControlResourceSetId,
(control resource set identifier)
monitoringSlotPeriodicity AndOffset        CHOICE {
(monitoring slot level period)
sl1                                     NULL,
sl2                                     INTEGER (0..1),
sl4                                     INTEGER (0..3),
sl5                                     INTEGER (0..4),
sl8                                     INTEGER (0..7),
sl10                                    INTEGER (0..9),
sl16                                    INTEGER (0..15),
sl20                                    INTEGER (0..19)
}
              OPTIONAL,
duration (monitoring length)                     INTEGER (2..2559)
monitoringSymbolsWithinSlot                   BIT STRING (SIZE (14))
                                        OPTIONAL,
(monitoring symbol within slot)
nrofCandidates                          SEQUENCE {
(number of PDCCH candidates at each aggregation level)
aggregationLevel1                       ENUMERATED {n0, n1, n2, n3, n4, n5, n6, n8},
aggregationLevel2                       ENUMERATED {n0, n1, n2, n3, n4, n5, n6, n8},
aggregationLevel4                       ENUMERATED {n0, n1, n2, n3, n4, n5, n6, n8},
aggregationLevel8                       ENUMERATED {n0, n1, n2, n3, n4, n5, n6, n8},
aggregationLevel16                      ENUMERATED {n0, n1, n2, n3, n4, n5, n6, n8}
},
searchSpaceType                            CHOICE {
(search space type)
Configures this search space as common search space (CSS) and DCI formats to monitor.
common                                  SEQUENCE {
(common search space)
}
ue-Specific                             SEQUENCE {
(UE-specific search space)
Indicates whether the UE monitors in this USS for DCI formats 0-0 and 1-0 or for formats 0-1
and 1-1.
formats                                 ENUMERATED {formats0-0-And-1-0, formats0-1-And-1-
1},
...
}
```

The BS may configure one or a plurality of search space sets in the UE according to configuration information. According to an embodiment, the BS may configure search space set 1 and search space set 2 in the terminal, and the configuration may be performed such that DCI format A scrambled by an X-RNTI in search space set 1 is monitored in the common-search space and DCI format B scrambled by a Y-RNTI in search space set 2 is monitored in the terminal-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

- DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI
- DCI format 2_0 with CRC scrambled by SFI-RNTI
- DCI format 2_1 with CRC scrambled by INT-RNTI
- DCI format 2_2 with CRC scrambled by TPC-PUSCH-RNTI, TPC-PUCCH-RNTI
- DCI format 2_3 with CRC scrambled by TPC-SRS-RNTI In the UE-specific search space, the following combinations of DCI formats and RNTIs may be monitored. Of course, the disclosure is not limited to the following examples. DCI format 0_0/1_0 with CRC scrambled by C-RNTI, CS-RNTI, TC-RNTI DCI format 1_0/1_1 with CRC scrambled by C-RNTI, CS-RNTI, TC-RNTI The described RNTIs may follow the following definition and use.

C-RNTI(cell RNTI): used for UE-specific PDSCH scheduling

- Modulation coding scheme (MCS)C-RNTI (MCS-C-RNTI): used for UE-specific PDSCH scheduling
- TC-RNTI(temporary cell RNTI): used for UE-specific PDSCH scheduling Configured scheduling (CS)-RNTI: used for semi-statically configured UE-specific PDSCH scheduling Random access (RA)-RNTI: used for scheduling PDSCH at random access stage Paging (P)-RNTI: used for scheduling PDSCH through which paging is transmitted System information (SI)-RNTI: used for scheduling PDSCH through which system information is transmitted Interruption (INT)-RNTI: used for indicating whether puncturing is performed for PDSCH Transmit power control for (TPC)-PUSCH-RNTI: used for indicating PUSCH power control command Transmit power control for (TPC)-PUCCH RNTI: used for indicating PUCCH power control command Transmit power control for (TPC)-SRS RNTI: used for indicating SRS power control command The DCI formats may follow definitions below.

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G wireless communication system, a control resource set p and a search space at an aggregation level L in a search space set s may be expressed as shown in the following equation.

$$L\cdot\left\{\left(Y_{p,n^{\mu}_{s,s}}+\left\lfloor\frac{m_{s,n_{CI}}\cdot N_{CCE,p}}{L\cdot M^{(L)}_{p,s,max}}\right\rfloor+n_{CI}\right)\bmod\lfloor N_{CCE,p}/L\rfloor\right\}+i \quad \text{[Equation 1]}$$

L: aggregation level $n_{CI}$: carrier index $N_{CCE,p}$: total number of CCEs existing within control resource set p $n^{\mu}_{s,f}$: slot index $M^{(L)}_{p,s,max}$: number of PDCCH candidates at aggregation level L $m_{snCI}=0, \ldots, M^{(L)}_{p,s,max}-1$: index of PDCCH candidate at aggregation level L $i=0, \ldots, L-1$ $$Y_{p,n^{\mu}_{s,f}}=\left(A_p\cdot Y_{p,n^{\mu}_{s,f}-1}\right)\bmod D,\ Y_{p,-1}=n_{RNTI}\neq 0,\ A_0=39827,$$

$A_1=39829$, $A_2=39839$, $D=65537$ $n_{RNTI}$: UE identifier

A value of Y_(p,$n^{\mu}_{s,f}$) may correspond to 0 in the case of the common search space.

A value of Y_(p,$n^{\mu}_{s,f}$) may correspond to a value varying depending on a UE identity (a C-RNTI or an ID configured in the UE by the BS) and a time index in the case of the UE-specific search space.

Figure 6:
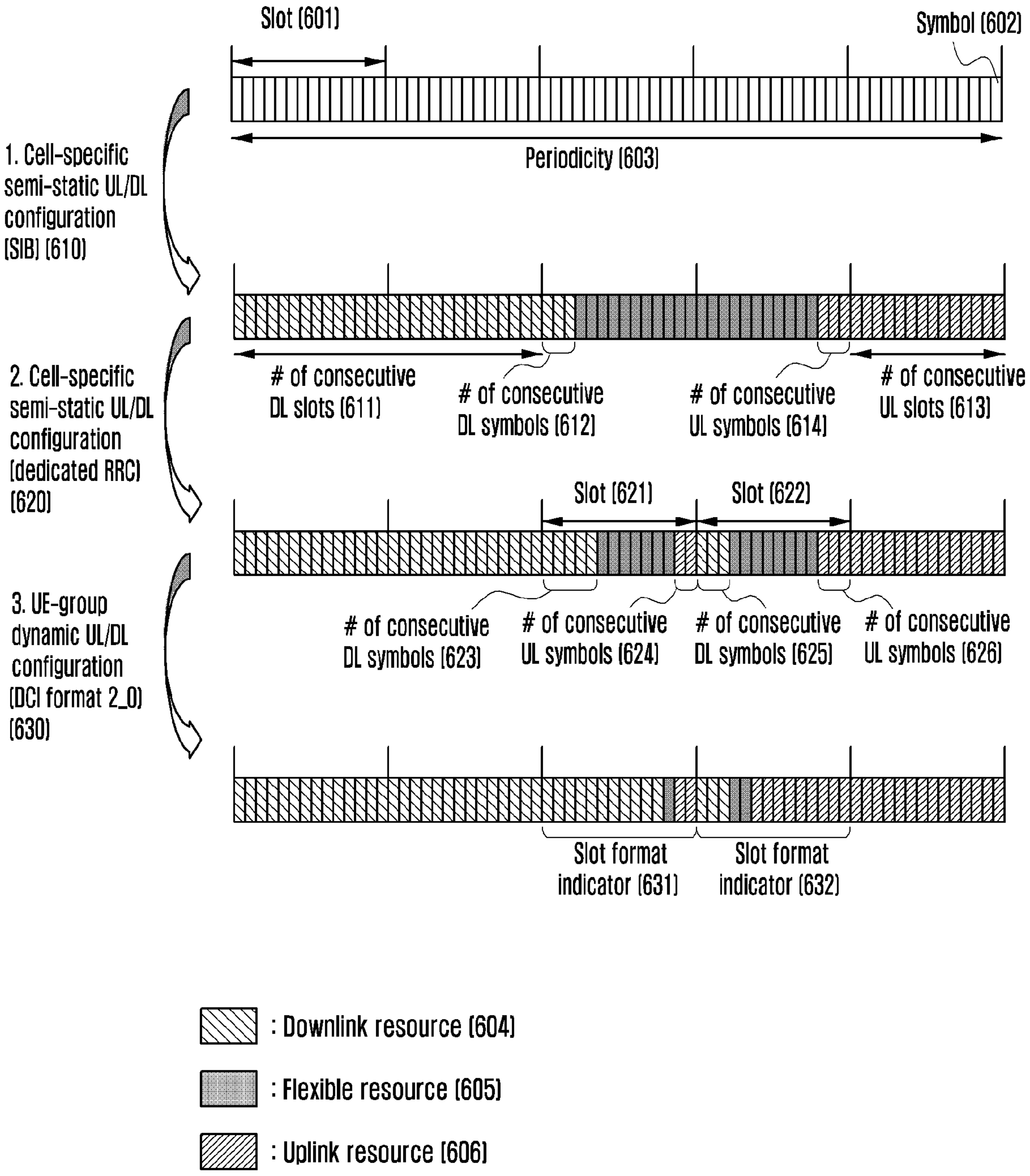
FIG. 6 illustrates an example of an uplink and downlink resource configuration method of the 5G wireless communication system.

FIG. 6 illustrates an example of an uplink-downlink configuration considered in the 5G communication system according to an embodiment of the disclosure.

Referring to FIG. 6, a slot 601 may include 14 symbols 602. In the 5G communication system, an uplink-downlink configuration of the symbol/slot may be configured in three steps. First, through cell-specific configuration information 610 through system information, the uplink-downlink of the symbol/slot may be semi-statically configured in the unit of symbols. Specifically, cell-specific uplink-downlink configuration information through system information may include uplink-downlink pattern information and subcarrier information that is the reference. Through uplink-downlink pattern information, a pattern periodicity 603, the number 611 of consecutive downlink slots from a start point of each pattern, the number 612 of symbols of the next slot, the number 613 of consecutive uplink slots from the end of the pattern, and the number 614 of symbols of the next slot may be indicated. At this time, the UE may determine that the slot and symbol which are not indicated by the uplink and the downlink are flexible slot/symbol.

Second, through user-specific configuration information through dedicated higher-layer signaling, a flexible slot or a slot 621 or 622 including a flexible symbol may be indicated by the number 623 or 625 of consecutive downlink symbols from the start symbol of each slot and the number 624 pr 626 of consecutive uplink symbols from the end of the slot, or may be totally indicated by the downlink or the uplink.

Last, in order to dynamically change a downlink signal transmission section and an uplink signal transmission section, whether each of the symbols indicated as the flexible symbols (that is, symbols which are not indicated by the downlink or the uplink) in each slot is a downlink symbol, an uplink symbol, or a flexible symbol may be indicated through a slot format indicator (SFI) 631 or 632 included in the downlink control channel. The slot format indicator may be selected as one index in a table in which the uplink-downlink configuration of 14 symbols within one slot is preset as shown in [Table 21] below.

TABLE 21

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |

TABLE 21-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

[Related to XDD]

In the 5G mobile communication service, additional coverage expansion technology compared to the LTE communication service has been introduced, but a TDD system suitable for a service having substantially high percentage of downlink traffic may be actually used in the 5G mobile communication service. Further, as the center frequency becomes higher to increase a frequency band, the coverage of the BS and the UE decreases, and thus coverage enhancement is a key requirement of the 5G mobile communication service. Particularly, the coverage enhancement of an uplink channel is a key requirement of the 5G mobile communication service in order to support a service having transmission power of the UE lower than transmission power of the BS and having large downlink traffic and because a ratio of the downlink is higher than that of the uplink in the time domain. Physically, methods of enhancing the coverage of the uplink channels of the BS and the UE may include a method of increasing time resources of the uplink channels, reducing the center frequency, or increasing transmission power of the UE. However, a change in the frequency may have restrictions since a frequency band is determined for each network operator. Further, maximum transmission power of the UE is restrictively determined to reduce interference, and thus there may be restrictions on the increase of maximum transmission power of the UE to enhance the coverage.

Accordingly, in order to enhance the coverage of the BS and the UE, uplink and downlink resources in the time domain may be separated according to percentage of uplink and downlink traffic like in the TDD system, and also uplink and downlink resources may be separated in the frequency domain like in the FDD system. In an embodiment, a system in which uplink resources and downlink resources can be flexible separated in the time domain and the frequency domain may be referred to as an XDD system, a flexible TDD system, a hybrid TDD system, a TDD-FDD system, a hybrid TDD-FDD system, or the like, and may be described as an XDD system in the disclosure for convenience of description. According to an embodiment, in XDD, X may be time or frequency.

Figure 7:
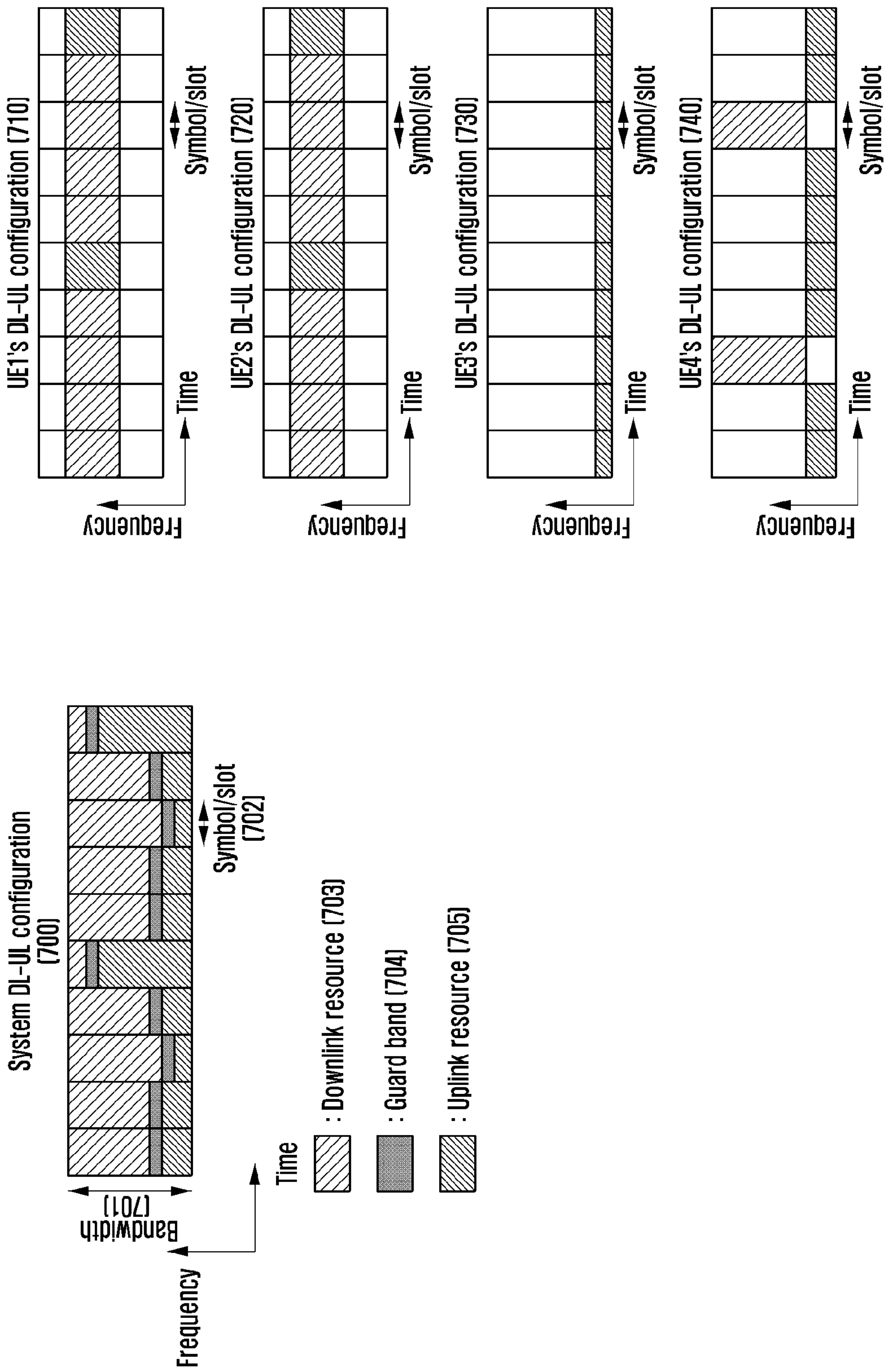
FIG. 7 illustrates the example of an uplink and downlink resource configuration method according to an embodiment of the disclosure.

FIG. 7 illustrates an uplink-downlink resource configuration of an XDD system in which uplink and downlink resources are flexible divided in the time domain and the frequency domain according to an embodiment of the disclosure.

Referring to FIG. 7, in an aspect of the BS, a total XDD system uplink-downlink configuration 700 may flexibly allocate resources to every symbol or slot 702 according to uplink and downlink traffic percentage in the entire frequency band 701. However, this is only an example, the unit of allocating resources is not limited to the symbol or slot 702, and resources may be flexibly allocated according to the unit of a mini slot or the like. At this time, a guard band 704 may be allocated between frequency bands of downlink resources 703 and uplink resources 705. The guard band 704 may be allocated to reduce interference to reception of an uplink channel or signal by out-of-band emission generated when the BS transmits a downlink channel or signal in the downlink resources 703. For example, UE1 710 and UE2 720 overall having downlink traffic larger than uplink traffic may receive allocation of downlink and uplink resource having a ratio of 4:1 in the time domain by the configuration of the BS. Also, UE3 730 operating in a cell edge and lacking the uplink coverage may receive allocation of only uplink resources in a specific time section by the configuration of the BS. In addition, UE4 740 operating in the cell edge and lacking the uplink coverage but having relatively large downlink and uplink traffic may receive allocation of many uplink resources in the time domain and allocation of many downlink resources in the frequency band for the uplink coverage. As described in the above example, there are advantages of allocating more downlink resources in the time domain to UEs relatively operating in the cell center and having large downlink traffic and allocating more uplink resources in the time domain to UEs relatively operating in the cell edge and lacking the uplink coverage.

Figure 8:
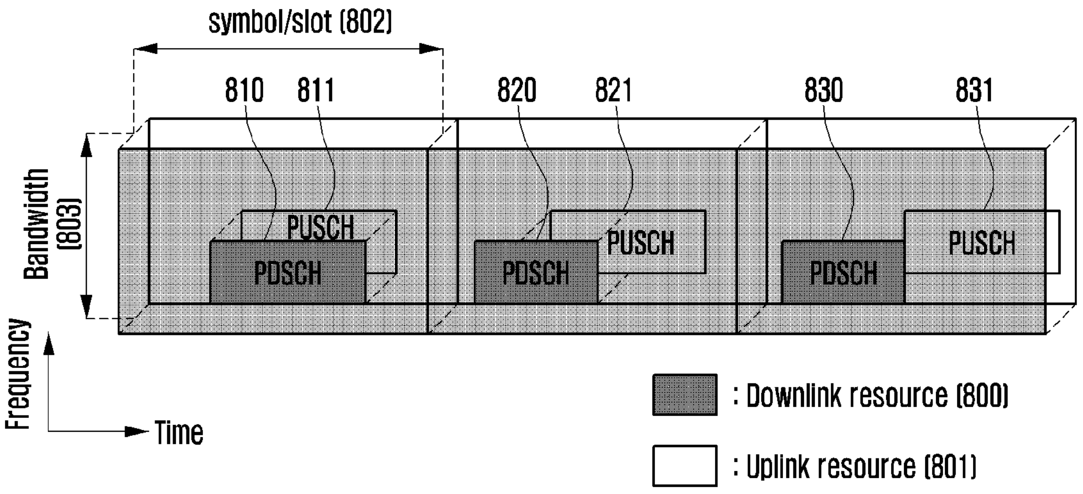
FIG. 8 illustrates an example of an uplink and downlink resource configuration method according to an embodiment of the disclosure.

FIG. 8 illustrates an example of an uplink-downlink resource configuration of a full duplex communication system in which uplink and downlink resources are flexibly separated in the time domain and the frequency domain according to an embodiment of the disclosure.

According to an embodiment illustrated in FIG. 8, all or some of the downlink resources 800 and the uplink resources 801 may be configured to overlap in the time and frequency domains. Downlink transmission from the BS to the UE may be performed in a region configured by the downlink resources 800, and uplink transmission from the UE to the BS may be performed in a region configured by the uplink resources 801.

In the embodiment of FIG. 8, all of the downlink resources 810 and the uplink resources 811 may be configured to overlap each other in time resources corresponding to a symbol or slot 802 and frequency resources corresponding to a bandwidth 803. At this time, since the downlink resources 810 and the uplink resources 811 overlap in the time and the frequency, downlink and uplink transmission and reception of the BS or the UE may be simultaneously generated in the same time and frequency resources.

In another example of FIG. 8, some of the downlink resources 820 and the uplink resources 821 may be configured to overlap each other in the time resources corresponding to the symbol or slot and the frequency resources corresponding to the bandwidth 803. At this time, in some regions in which the downlink resources 820 and the uplink resources 821 overlap, downlink and uplink transmission/reception of the BS or the UE may be simultaneously performed.

In another example of FIG. 8, downlink resources 830 and uplink resources 831 may be configured to not overlap each other in time resources corresponding to the symbol or the slot and frequency resources corresponding to the bandwidth 803.

Figure 9:
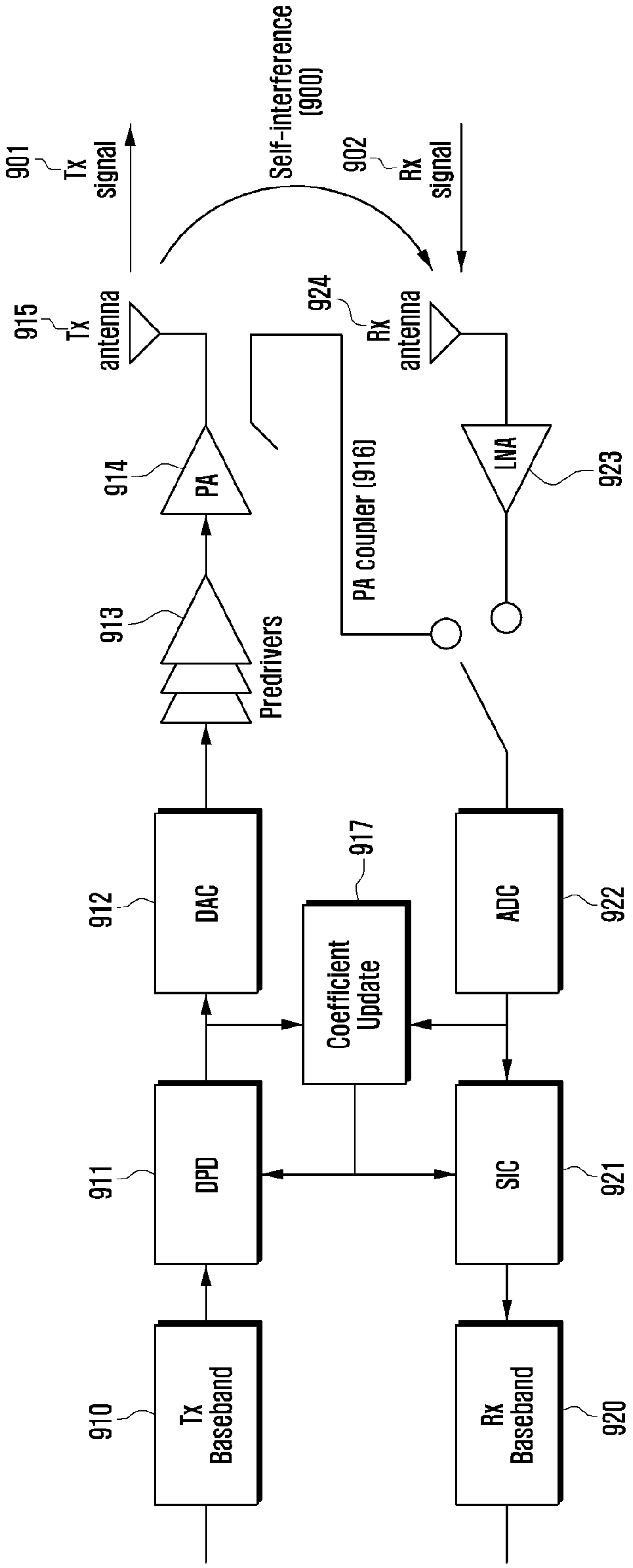
FIG. 9 illustrates the structure of a transmission side and a reception side according to an embodiment of the disclosure.

FIG. 9 illustrates the structure of transmission and reception for a duplex scheme according to an embodiment of the disclosure.

The transmission and reception structure illustrated in FIG. 9 may be used for a BS apparatus or a UE apparatus. According to the transmission and reception structure illustrated in FIG. 9, a transmission side may include blocks such as a transmission baseband block (Tx baseband) 910, a digital pre-distortion block (DPD) 911, a digital-to-analog converter (DAC) 912, a pre-driver 913, a power amplifier (PA) 914, a transmission antenna (Tx antenna) 915, and the like. Each block may play the following role.

- Transmission baseband block 910: a digital processing block for a transmission signal
- Digital pre-distortion block 911: pre-distortion of a digital transmission signal
- Digital-to-analog converter 912: converts a digital signal into an analog signal
- Pre-driver 913: gradually amplify power of an analog transmission signal
- Power amplifier 914: amplify power of an analog transmission signal
- Transmission antenna 915: antenna for signal transmission According to the transmission and reception structure illustrated in FIG. 9, a reception side may include blocks such as a reception antenna (Rx antenna) 924, a low noise amplifier (LNA) 923, an analog-to-digital converter (ADC) 922, a successive interference cancellator 921, a reception baseband block (Rx baseband) 920, and the like. Each block may play the following role.

- Reception antenna 924: antenna for signal reception
- Low noise amplifier 923: minimize amplification of noise while amplifying power of an analog reception signal
- Analog-to-digital converter 922: converts an analog signal into a digital signal
- Successive interference cancellator 921: cancellator of interference for a digital signal
- Reception baseband block 920: a digital processing block for a reception signal According to the transmission and reception structure illustrated in FIG. 9, a power amplifier coupler (PA coupler) 916 and a constant update block (coefficient update) 917 may exist for additional signal processing between the transmission side and the reception side. Each block may play the following role.

- Power amplifier coupler 916: a block to observe a waveform of an analog transmission signal passing through a power amplifier by a reception side.
- Constant update block 917: updates various constants required for digital domain signal processing by a transmission side and a reception side, the calculated constant being used for setting various parameters in a block of DPD 911 of the transmission side and a block of SIC 921 of the reception side The transmission and reception structure illustrated in FIG. 9 may be used for effectively controlling interference between a transmission signal and a reception signal when reception and transmission operations are simultaneously performed by the BS or the UE apparatus. For example, when transmission and reception are simultaneously performed by a random device, a transmission signal 901 transmitted through a transmission antenna 915 of the transmission side may be received through a reception antenna 924 of the reception side, in which case the transmission signal 901 received by the reception side may act as interference 900 to a reception signal 902 which the reception side originally desired to receive. Interference between the transmission signal 901 received by the reception side and the reception signal 902 may be named self interference 900. For example, in a detailed description, if the BS apparatus simultaneously performs downlink transmission and uplink reception, a downlink signal transmitted by the BS may be received by the reception side of the BS, and thus the reception side of the BS may have interference between the downlink signal transmitted by the BS and an uplink signal which the BS originally desired by the reception side. If when the UE apparatus simultaneously performs downlink reception and uplink transmission, an uplink signal transmitted by the UE may be received the reception side of the UE, and thus the reception side of the UE may have interference between the uplink signal transmitted by the UE and a downlink signal which the UE originally desired to receive by the reception side. As described above, links in different directions of the BS and the UE apparatus, that is, interference between a downlink signal and uplink signal may be named cross-link interference.

In an embodiment of the disclosure, self interference between a transmission signal (or a downlink signal) and a reception signal (or an uplink signal) may be generated in a system in which transmission and reception can be simultaneously performed.

For example, in the XDD system, self interference may be generated.

Figure 10:
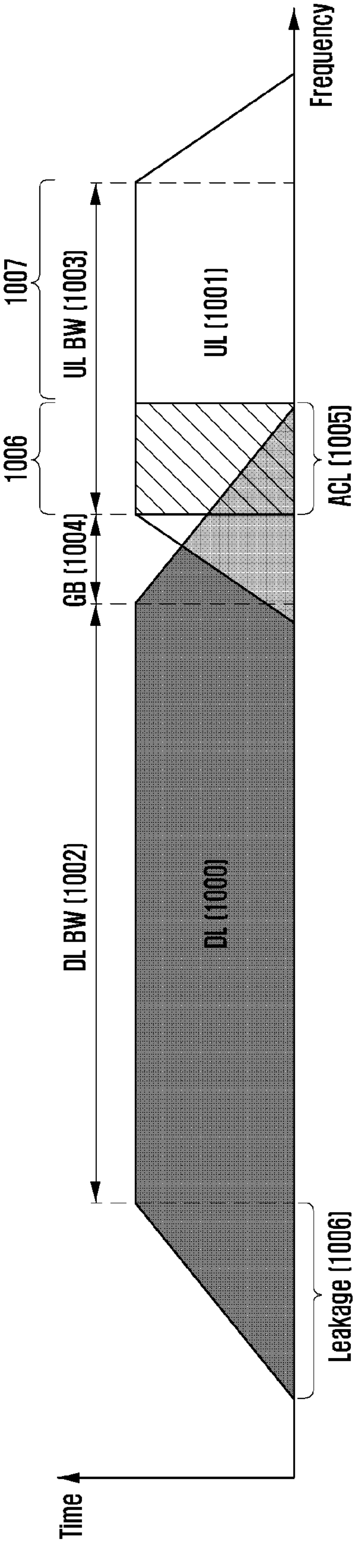
FIG. 10 illustrates an example of an uplink and downlink resource configuration and self-interference according to an embodiment of the disclosure.

FIG. 10 illustrates an example of a downlink and uplink resource configuration in the XDD system.

In the case of XDD, resources of a downlink 1000 and resources of an uplink 1003 may be separated in the frequency domain, in which case a guard band (GB) 1004 may exist between the resources of the downlink 1000 and the resources of the uplink 1001. Downlink transmission may be actually performed within a downlink bandwidth 1002, and uplink transmission may be actually performed within an uplink bandwidth 1003. At this time, leakage 1006 to the outside of the uplink or downlink transmission band may be generated. Interference (named adjacent carrier leakage (ACL)) 1005 due to the leakage may be generated in an area adjacent to the downlink resources 1000 and the uplink resources 1001. FIG. 10 illustrates an example of generating the ACL 1005 from the downlink 1000 to the uplink 1001. As the downlink bandwidth 1002 and the uplink bandwidth 1003 are more adjacent to each other, signal interference by the ACL 1005 may be larger, and accordingly, performance deterioration may occur. For example, as illustrated in FIG. 10, interference influence by the ACL 1005 may be large in some resource regions 1006 within the uplink band 1003 adjacent to the downlink band 1002. Interference influence by the ACL 1005 may be relatively small in some resource regions 1007 within the uplink band 1003 far away from the downlink band 1002. That is, within the uplink band 1003, a resource region 1006 relatively greatly influenced by interference and a resource region 1007 relatively less influenced by interference may exist. In order to reduce performance deterioration by the ACL 1005, the guard band 1004 may be inserted between the downlink bandwidth 1002 and the uplink bandwidth 1003. While there is an advantage in that the interference influence by the ACL 1005 between the downlink bandwidth 1002 and the uplink bandwidth 1003 becomes smaller as the size of the guard band 1004 is larger, there may be a disadvantage of lower efficiency as the size of the guard band 1004 becomes larger since resources which can be used for transmission and reception are reduced. On the other hand, while there is an advantage of increasing resource efficiency because an amount of the resources which can be used for transmission and reception can be increased as the size of the guard band 1004 is smaller, there is a disadvantage of increasing interference influence by the ACL 1005 between the downlink bandwidth 1002 and the uplink bandwidth 1003. Accordingly, it may be important to determine the appropriate size of the guard band 1004 in consideration of trade off.

[XDD Bandwidth Operation Method]

Figure 11:
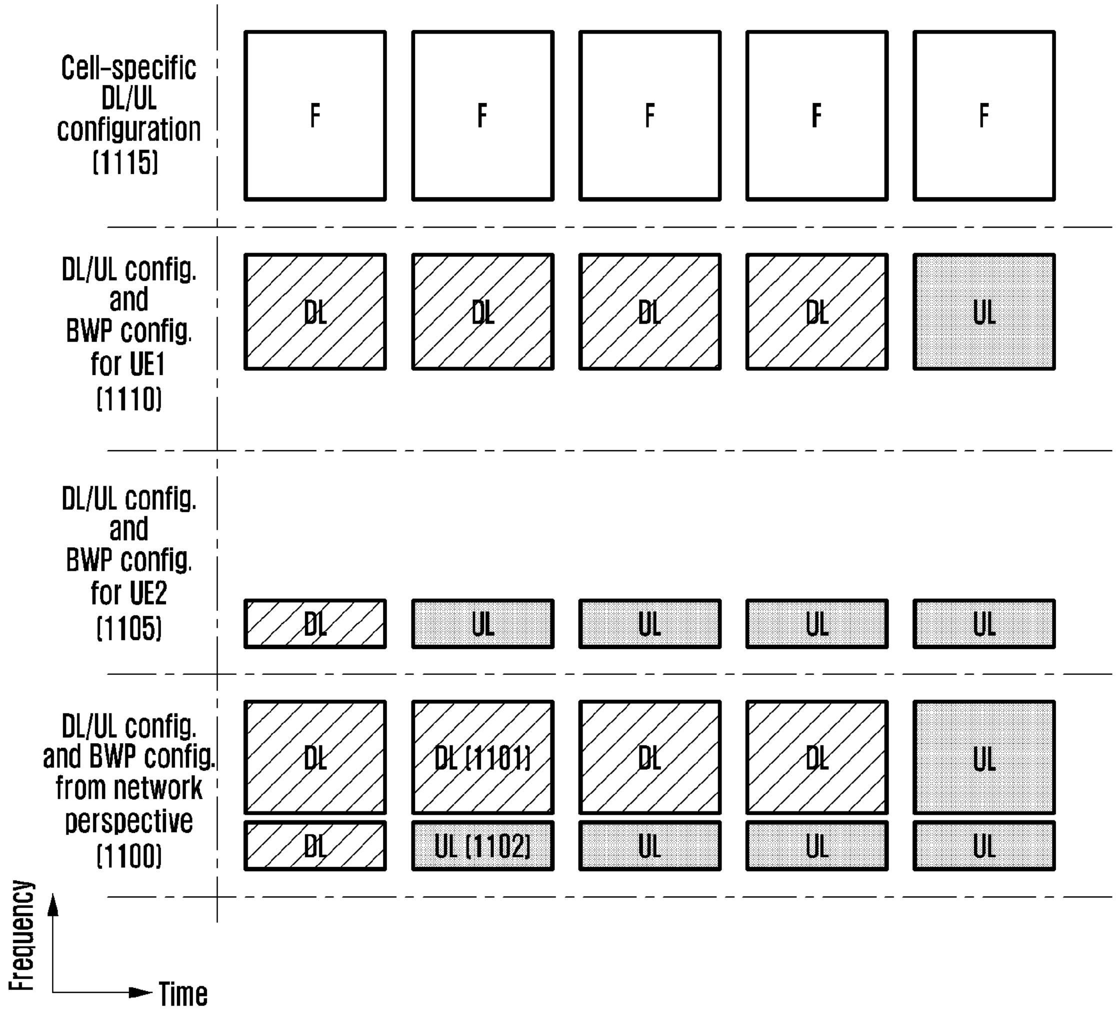
FIG. 11 illustrates an example of an uplink-downlink configuration in the XDD system.

FIG. 11 illustrates an example of an uplink-downlink configuration in the XDD system. In an aspect of the BS, a total XDD system uplink-downlink configuration 1100 may flexibly allocate resources to every symbol or slot according to uplink and downlink traffic percentage in the entire frequency band. At this time, a guard band may be allocated between frequency bands of downlink resources 1101 and uplink resources 1102. The guard band may be allocated to reduce interference to reception of an uplink channel or signal by out-of-band emission generated when the BS transmits a downlink channel or signal in downlink resources. For example, a UE 1110 overall having downlink traffic larger than uplink traffic may receive allocation of downlink resources larger than uplink resources by the configuration of the BS (it is assumed that a ratio of the uplink resources to the downlink resources is 4:1 in the time domain in the example of FIG. 11). Also, a UE 1105 operating in a cell edge and lacking the uplink coverage may receive allocation of downlink resources smaller than uplink resources by the configuration of the BS (it is assumed that a ratio of the uplink resources to the downlink resources is 1:4 in the time domain in the example of FIG. 11). As described in the above example, it is possible to increase downlink transmission efficiency by allocating more downlink resources in the time domain to UEs relatively operating in the cell center and having downlink traffic and to improve the coverage by allocating more uplink resources in the time domain to UEs relatively operating in the cell edge. At this time, when making a cell-specific DL/UL configuration for a flexible DL/UL configuration, the corresponding BS 1100 may configure most time resources as flexible (F) in operation 1115.

In this example, only for UEs which do not support full duplex in which uplink/downlink transmission and reception are simultaneously possible in the same time frequency resources, the BS is required to separate downlink resources and uplink resources of the UE 1110 receiving the downlink and the UE 1105 transmitting the uplink at a specific time (for example, second to fourth time sections of FIG. 11). Separation between the downlink resources and the uplink resources may be performed through one of the following two methods. The first method is a method of not overlapping frequency configuration information of a DL BWP of UE1 1110 and a UL BWP of UE2 1105. The method has an advantage of minimizing an influence on implementation of the UE and the BS but has a disadvantage of decreasing flexibility and taking a long time due to necessity of BWP switching when frequency resource percentage between the downlink and the uplink is changed within an hour. For convenience of description, the first method is named later a BWP-based XDD operation method. The second method is a method of allocating a scheduled PDSCH of UE1 1110 and a scheduled PUSCH of UE2 1105 to not overlap each other in the frequency axis. This method has an advantage of having high flexibility based on BS scheduling and having a fast change speed of frequency resource percentage between the downlink and the uplink, but may have several problems described in the following embodiments since frequency configuration information of the DL BWP of UE1 1110 and the UL BWP of UE2 1105 may partially or overall overlap. For convenience of description, the second method is named a scheduling-based XDD operation method.

Figure 12:
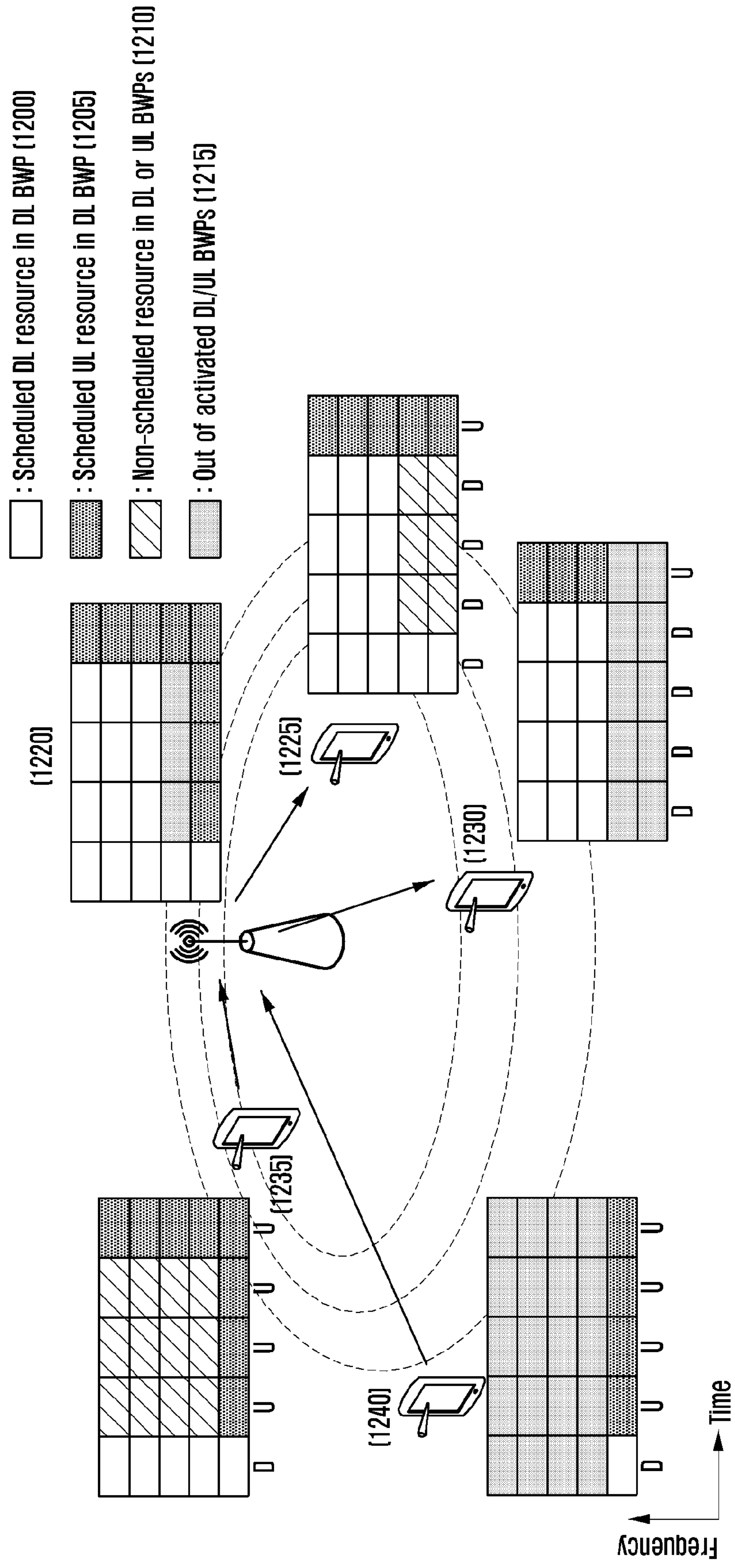
FIG. 12 illustrates another example of the uplink-downlink configuration of the XDD system.

FIG. 12 illustrates another example of the uplink-downlink configuration of the XDD system. Referring to FIG. 12, the BS can appropriately use the two methods of separating the downlink and uplink frequency resources for XDD. For example, in an aspect of the BS, an uplink-downlink configuration 1220 may be assumed. The BS may allocate downlink and uplink resources having a ratio of 4:1 to UEs 1225 and 1230 having downlink traffic larger than uplink traffic. At this time, when the BS applies the BWP-based XDD operation method to the UE 1230, a scheduled PDSCH 1200 and a scheduled PUSCH 1205 cannot be allocated to an area 1215 other than the activated DL BWP and UL BWP, and thus some of the uplink/downlink throughput of the UE is restricted. When the BS applies the scheduling-based XDD operation method to the UE 1225, the BS has a higher scheduling degree of freedom compared to the BWP-based XDD operation and thus may allocate the PDSCH to a wider area (for example, a first time section of 1225) as necessary or may not allocate the PDSCH to a section in which uplink transmission of another UE is needed (for example, second to fourth time sections of 1225). Similarly, the BS may allocate downlink and uplink resources having a ratio of 1:4 in the time domain to UEs 1235 and 1240 having uplink traffic larger than downlink traffic or considering the uplink coverage important. At this time, when the BS applies the BWP-based XDD operation method to the UE 1240, a scheduled PDSCH 1200 and a scheduled PUSCH 1205 cannot be allocated to an area 1215 other than the activated DL BWP and UL BWP, and thus some of the uplink/downlink throughput of the UE is restricted. When the BS applies the scheduling-based XDD operation method to the UE 1235, the BS has a higher scheduling degree of freedom compared to the BWP-based XDD operation and thus may allocate the PUSCH to a wider area (for example, a fifth time section of 1235) as necessary or may not allocate the PUSCH to a section in which downlink transmission of another UE is needed (for example, second to fourth time sections of 1235).

Meanwhile, the BS and UE operations may be ambiguous in resources 1210 which are included in the activated DL BWP or UL BWP in the above example but are not actually allocated for the PDSCH or PUSCH XDD operation. For example, in the case of a CSI-RS for tracking (TRS), a smaller value between 52 RBs and a BWP bandwidth for transmitting the corresponding TRS is used as a transmission bandwidth, and thus there is a risk that the UE 1225 operating in an activated DL BWP including an XDD uplink band of another UE will think TRS is transmitted in the area 1210 to which the downlink resources, such as a PDSCH, are not allocated for the XDD operation. Similarly, there is a risk that the UE 1235 operating in the activated UL BWP including an XDD downlink band of another UE will think a periodic or semi-persistent uplink channel or signal, such as an SRS or a PUCCH, is transmitted in the area 1210 in which the downlink resources, such as the PUSCH, are not allocated for the XDD operation.

[PUSCH: Related to Transmission Scheme]

Subsequently, a scheduling scheme of PUSCH transmission is described. PUSCH transmission may be dynamically scheduled by a UL grant within DCI or may operate by configured grant Type 1 or Type 2. Dynamic scheduling of PUSCH transmission can be indicated by DCI format 0_0 or 0_1.

Configured grant Type 1 PUSCH transmission may be semi-statically configured through reception of configuredGrantConfig including rrc-ConfiguredUplinkGrant in [Table 22] through higher-layer signaling without reception of a UL grant within DCI. Configured grant Type 2 PUSCH transmission may be semi-persistently scheduled by a UL grant within DCI after reception of configuredGrantConfig which does not include rrc-ConfiguredUplinkGrant in [Table 22] through higher-layer signaling. When PUSCH transmission operates by a configured grant, parameters applied to PUSCH transmission may be applied through configuredGrantConfig of [Table 22] which is received through higher-layer signaling except for dataScramblingIdentityPUSCH, txConfig, codebookSubset, maxRank, and scaling of UCI-OnPUSCH provided as pusch-Config of [Table 23] which is higher-layer signaling. When the UE receives transformPrecoder within configuredGrantConfig of [Table 22] which is higher-layer signaling, the UE applies tp-pi2BPSK within pusch-Config of [Table 23] to PUSCH transmission operating by the configured grant.

TABLE 22

```
ConfiguredGrantConfig ::-          SEQUENCE {
frequency Hopping                          ENUMERATED {intraSlot, interSlot}
OPTIONAL, -- Need S,
cg-DMRS-Configuration                DMRS-UplinkConfig,
mcs-Table                                ENUMERATED {qam256, qam64LowSE}
OPTIONAL, -- Need S
mcs-TableTransformPrecoder           ENUMERATED {qam256, qam64LowSE}
OPTIONAL, -- Need S
uci-OnPUSCHSetupRelease            {             CG-UCI-OnPUSCH              }
OPTIONAL, -- Need M
resourceAllocation                 ENUMERATED { resourceAllocationType0,
resourceAllocationType1, dynamicSwitch },
rbg-Size                                         ENUMERATED {config2}
OPTIONAL, -- Need S
powerControlLoopToUse                    ENUMERATED {n0, n1},
p0-PUSCH-Alpha                              P0-PUSCH-AlphaSetId,
transformPrecoder                              ENUMERATED {enabled, disabled}
OPTIONAL, -- Need S
nrofHARQ-Processes                   INTEGER(1..16),
repK                                     ENUMERATED {n1, n2, n4, n8},
repK-RV                                     ENUMERATED {s1-0231, s2-0303, s3-
0000}                                          OPTIONAL, -- Need R
periodicity                        ENUMERATED {
```

TABLE 22-continued

```
sym2, sym7, sym1x14, sym2x14, sym4x14, sym5x14, sym8x14, sym10x14, sym16x14,
sym20x14,
sym32x14, sym40x14, sym64x14, sym80x14, sym128x14, sym160x14, sym256x14,
sym320x14, sym512x14,
sym640x14, sym 1024x14, sym 1280x14, sym2560x14, sym5120x14,
sym6, sym1x12, sym2x12, sym4x12, sym5x12, sym8x12, sym10x12, sym16x12,
sym20x12, sym32x12,
sym40x12, sym64x12, sym80x12, sym128x12, sym160x12, sym256x12, sym320x12,
sym512x12, sym640x12,
sym1280x12, sym2560x12
},
configuredGrantTimer                          INTEGER (1..64)
OPTIONAL, -- Need R
rrc-ConfiguredUplinkGrant             SEQUENCE {
timeDomainOffset                          INTEGER (0..5119),
timeDomainAllocation                    INTEGER (0..15),
frequencyDomainAllocation             BIT STRING (SIZE(18)),
antennaPort                             INTEGER (0..31),
dmrs-SeqInitialization                          INTEGER (0..1)
OPTIONAL, -- Need R
precodingAndNumberOfLayers              INTEGER (0..63),
srs-ResourceIndicator                          INTEGER (0..15)
OPTIONAL, -- Need R
mcsAndTBS                                INTEGER (0..31),
frequency HoppingOffset                          INTEGER (1..
maxNrofPhysicalResourceBlocks-1)             OPTIONAL, -- Need R
pathlossReferenceIndex                    INTEGER (0..maxNrofPUSCH-
PathlossReferenceRSs-1),
...
}
OPTIONAL, -- Need R
...
}
```

Subsequently, a PUSCH transmission method is described. A DMRS antenna port for PUSCH transmission is the same as an antenna port for SRS transmission. PUSCH transmission may follow each of a codebook-based transmission method and a non-codebook-based transmission method according to whether a value of txConfig within pusch-Config of [Table 23] which is higher-layer signaling is 'codebook' or 'nonCodebook'.

As described above, PUSCH transmission may be dynamically scheduled through DCI format 0_0 or 0_1 or semi-statically configured by the configured grant. When the UE receives an indication of scheduling of PUSCH transmission through DCI format 0_0, the UE performs a beam configuration for PUSCH transmission by using pucch-spatialRelationInfoID corresponding to a UE-specific PUCCH resource corresponding to a minimum ID within the activated uplink BWP in the serving cell in which case the PUSCH transmission is based on a single antenna port. The UE does not expect scheduling of PUS CH transmission through DCI format 0_0 within a BWP in which the PUCCH resource including pucch-spatialRelationInfo is not configured. When the UE does not receive a configuration of txConfig within pusch-Config of [Table 23], the UE does not expect reception of scheduling through DCI fornat 0_1.

TABLE 23

```
PUSCH-Config ::=                                   SEQUENCE {
dataScramblingIdentityPUSCH                              INTEGER (0..1023)
OPTIONAL, , -- Need S
txConfig                                             ENUMERATED { codebook,
nonCodebook}                                         OPTIONAL, -- Need S
dmrs-UplinkForPUSCH-MappingTypeASetupRelease         { DMRS-UplinkConfig }
OPTIONAL, -- Need M
dmrs-UplinkForPUSCH-MappingTypeBSetupRelease         { DMRS-UplinkConfig }
OPTIONAL, -- Need M
pusch-PowerControl                                        PUSCH-PowerControl
OPTIONAL, -- Need M
frequency Hopping                              ENUMERATED {intraSlot, interSlot}
OPTIONAL, -- Need S
frequency HoppingOffsetLists                 SEQUENCE (SIZE (1..4)) OF INTEGER
(1.. maxNrofPhysicalResourceBlocks-1)
OPTIONAL, -- Need M
resourceAllocation                                           ENUMERATED
{ resource Allocation Type0, resourceAllocationType1, dynamicSwitch },
pusch-TimeDomainAllocationListSetupRelease                 {            PUSCH-
TimeDomainResourceAllocationList }                 OPTIONAL, -- Need M
pusch-AggregationFactor                            ENUMERATED { n2, n4, n8 }
OPTIONAL, -- Need S
mcs-Table                                                ENUMERATED {qam256,
qam64LowSE}                                               OPTIONAL, -- Need S
mcs-TableTransformPrecoder                               ENUMERATED {qam256,
qam64LowSE}                                               OPTIONAL, -- Need S
```

TABLE 23-continued

| | |
|---|---|
| transformPrecoder | ENUMERATED {enabled, disabled} |
| OPTIONAL, -- Need S | |
| codebookSubset | ENUMERATED |
| {fully AndPartialAndNonCoherent, partial AndNonCoherent, nonCoherent} | |
| OPTIONAL, -- Cond codebookBased | |
| maxRank | INTEGER (1..4) |
| OPTIONAL, -- Cond codebookBased | |
| rbg-Size | ENUMERATED { config2} |
| OPTIONAL, -- Need S | |
| uci-OnPUSCHSetupRelease | { UCI-OnPUSCH} |
| OPTIONAL, -- Need M | |
| tp-pi2BPSK | ENUMERATED { enabled } |
| OPTIONAL, -- Need S | |
| ... | |
| } | |

Subsequently, codebook-based PUSCH transmission is described. Codebook-based PUSCH transmission may be dynamically scheduled through DCI format 0_0 or 0_1 or semi-statically operate by the configured grant. When codebook-based PUSCH is dynamically scheduled by DCI format 0_1 or is semi-statically configured by the configured grant, the UE determines a precoder for PUSCH transmission on the basis of an SRS resource indicator (SRI), a transmission precoding matrix indicator (TPMI), and a transmission rank (the number of PUSCH transmission layers).

At this time, the SRI may be given through an SRS resource indicator field within DCI or may be configured through srs-ResourceIndicator which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field information and number of layers within DCI or may be configured through precodingAndNumberOfLayers which is higher-layer signaling. The TPMI is used to indicate a precoder applied to PUSCH transmission. When the UE receives a configuration of one SRS resource, the TPMI is used to indicate a precoder to be applied to the one configured SRS resource. When the UE received a configuration of a plurality of SRS resources, the TPMI is used to indicate a precoder to be applied to SRS resources indicated through the SRI.

The precoder to be used for PUSCH transmission is selected from an uplink codebook having the number of antenna ports which is the same as a value of nrofSRS-Ports within SRS-Config which is higher-layer signaling. In codebook-based PUSCH transmission, the UE determines a codebook subset on the basis of the TPMI and a codebookSubset within pusch-Config which is higher-layer signaling. The codebookSubset within pusch-Config which is higher-layer signaling may be configured as one of 'fullyAndPartialAndNonCoherent', 'partialAndNonCoherent', or 'nonCoherent' on the basis of the UE capability which the UE reports to the BS. When the UE reports 'partialAndNonCoherent' as the UE capability, the UE does not expect a configuration of the value of the codebookSubset which is higher-layer signaling as 'fullyAndPartialAndNonCoherent'. Further, when the UE reports 'nonCoherent' as the UE capability, the UE does not expect a configuration of the value of the codebookSubset which is higher-layer signaling as 'fullyAndPartialAndNonCoherent' or 'partialAndNonCoherent'. When nrofSRS-Ports within SRS-ResourceSet which is higher-layer signaling indicate two SRS antenna ports, the UE does not expect a configuration of the value of the codebookSubset which is higher-layer signaling as 'partialAndNonCoherent'.

The UE may receive a configuration of one SRS resource set having a value of usage within SRS-ResourceSet which is higher-layer signaling configured as 'codebook', and one SRS resource may be indicated through the SRI within the corresponding SRS resource set. When several SRS resources are configured within the SRS resource set having the value of usage within SRS-ResourceSet which is higher-layer signaling configured as 'codebook', the UE expects a configuration of the same value of nrofSRS-Ports within the SRS-Resource which is higher-layer signaling for all SRS resources.

The UE may transmit one or a plurality of SRS resources included in the SRS resource set having the value of usage configured as 'codebook' to the BS according to higher-layer signaling, and the BS may select one of the SRS resources transmitted by the UE and instruct the UE to perform PUSCH transmission by using transmission beam information of the corresponding SRS resource. At this time, in codebook-based PUSCH transmission, the SRI may be used as information for selecting an index of one SRS resource and may be included in DCI. In addition, the BS may insert information indicating the TPMI and the rank to be used for PUSCH transmission by the UE into DCI. The UE performs PUSCH transmission by applying a precoder indicated by the rank and the TPMI indicated on the basis of the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as 'nonCodebook' within SRS-ResourceSet which is higher-layer signaling, the UE may receive scheduling of non-codebook-based PUSCH transmission through DCI format 0_1.

Through higher-layer signaling, the UE may receive a configuration of one non-zero power CSI-RS (NZP CSI-RS) resource connected to the SRS resource set having the value of usage within SRS-ResourceSet configured as 'nonCodebook'. The UE may calculate a precoder for SRS transmission through measurement for the NZP CSI-RS resource connected to the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for SRS transmission.

When the value of resource Type within SRS-ResourceSet which is higher-layer signaling is configured as 'aperiodic', the connected NZP CSI-RS is indicated by an SRS request which is a field within DCI format 0_1 or 1_1. At this time, when the connected NZP CSI-RS resource is an aperiodic NZP CSI-RS resource and the value of the SRS request field within DCI format 0_1 or 1_1 is not '00', it may indicate the existence of the NZP CSI-RS connected to the SRS resource set. At this time, the corresponding DCI should not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. At this time, TCI states configured in the scheduled subcarrier are not configured as QCL-TypeD.

If the periodic or semi-persistent SRS resource set is configured, the connected NZP CSI-RS may be indicated through an associatedCSI-RS within SRS-ResourceSet which is higher-layer signaling. For non-codebook-based transmission, the UE does not expect configurations of both spatialRelationInfo which is higher layer signaling for the SRS resource and associatedCSI-RS within SRS-ResourceSet which is higher-layer signaling.

When the UE receives a configuration of a plurality of SRS resources, the UE may determine a precoder and a transmission rank to be applied to PUSCH transmission on the basis of an SRI indicated by the BS. At this time, the SRI may be indicated through an SRS resource indicator field within DCI or may be configured through srs-ResourceIndicator which is higher-layer signaling. Like the codebook-based PUSCH transmission, when the UE receives the SRI through DCI, the SRS resource indicated by the corresponding SRI is the SRS resource corresponding to the SRI among SRS resources transmitted earlier than the PDCCH including the corresponding SRI. The UE may use one or a plurality of SRS resources for SRS transmission, and the maximum number of SRS resources which can be simultaneously transmitted in the same symbol within one SRS resource set and the maximum number of SRS resources are determined by the UE capability which the UE reports to the BS. At this time, SRS resources which the UE simultaneously transmits occupy the same RB. The UE configures one SRS port for each SRS resource. The number of SRS resource sets having the value of usage configured as 'nonCodebook' within SRS-ResourceSet which is higher-layer signaling is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set on the basis of the measurement result when the corresponding NZP-CSI-RS is received. When transmitting one or a plurality of SRS resources within the SRS resource set having usage configured as 'nonCodebook' to the BS, the UE applies the calculated precoder and the BS selects one or a plurality of SRS resources from among the one or plurality of received SRS resources. At this time, in non-codebook-based PUSCH transmission, the SRI indicates an index which may express one SRS resource or a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

[PUSCH: Preparation Process Time]

Subsequently, a PUSCH preparation procedure time (PUSCH preparation procedure time) is described. When the BS schedules the UE to transmit a PUSCH by using DCI format 0_0 or DCI format 0_1, the UE may need a PUSCH preparation procedure time for transmitting a PUSCH by applying a transmission method (a transmission precoding method of SRS resources, the number of transmission layers, and a spatial domain transmission filter) indicated through DCI. In NR, a PUSCH preparation procedure time considering the same is defined. The PUSCH preparation procedure time of the UE may follow [Equation 2] below.

$$T_{proc,2} = \max((N_2 + d_{2,1} + d_2)(2048 + 144)\kappa 2^{-\mu} T_c + T_{ext} + T_{switch}, d_{2,2}) \quad \text{[Equation 2]}$$

In $T_{proc,2}$ described above, each parameter may have the following meaning.

$N_2$: the number of symbols determined according to UE processing capability 1 or 2 based on a UE capability and numerology μ. $N_2$ may have a value in [Table 24] when UE processing capability 1 is reported according to a UE capability report and may have a value in [Table 25] when UE processing capability 2 is reported and information indicating that UE processing capability 2 can be used is configured through higher-layer signaling.

TABLE 24

| μ | PUSCH preparation time $N_2$ [symbols] |
|---|---|
| 0 | 10 |
| 1 | 12 |
| 2 | 23 |
| 3 | 36 |

TABLE 25

| μ | PUSCH preparation time $N_2$ [symbols] |
|---|---|
| 0 | 5 |
| 1 | 5.5 |
| 2 | 11 for frequency range 1 |

$d_{2,1}$: the number of symbols determined as 0 when all resource elements of a first OFDM symbol in PUSCH transmission include only DM-RSs and, otherwise, determined as 1.

κ: 64

μ: follows a value making $T_{proc,2}$ larger among $\mu_{DL}$ or $\mu_{UE}$. $\mu_{DL}$ is downlink numerology for transmitting a PDCCH including DCI scheduling a PUSCH and $\mu_{UL}$ is uplink numerology for transmitting a PUSCH.

$T_c$: has $1/(\Delta f_{max} \cdot N_f)$ $\Delta f_{max}=480 \cdot 10^3$ Hz, and $N_f=4096$ $d_{2,2}$: follows a BWP switching time when DCI scheduling a PUSCH indicates BWP switching and, otherwise, has 0.

$d_2$: a value of $d_2$ of a PUSCH having a high priority index is used when OFDM symbols of the PUCCH, the PUSCH having the high priority index, and a PUCCH having a low priority index overlap in the time. Otherwise, $d_2$ is 0.

$T_{ext}$: the UE may calculate Text and apply the same to a PUSCH preparation procedure time when the UE uses a shared spectrum channel access scheme. Otherwise, it is assumed that $T_{ext}$ is 0.

$T_{switch}$: it is assumed that $T_{switch}$ is a switching interval time when an uplink switching interval is triggered. Otherwise, it is assumed that $T_{switch}$ is 0.

In consideration of time axis resource mapping information of the PUSCH scheduled through DCI and an effect of uplink-downlink timing advance (TA), the BS and the UE may determine that the PUSCH preparation procedure time is not sufficient when a first symbol of the PUSCH starts earlier than a first uplink symbol at which the CP starts after $T_{proc,2}$ from a last symbol of the PDCCH including the DCI scheduling the PUSCH. Otherwise, the BS and the UE determine that the PUSCH preparation procedure time is sufficient. The UE may transmit the PUSCH only when the PUSCH preparation procedure time is sufficient, and may ignore the DCI scheduling the PUSCH when the PUSCH preparation procedure time is not sufficient.

Subsequently, PUSCH repetitive transmission is described. When the UE receives scheduling of PUSCH transmission in DCI format 0_1 within the PDCCH including CRC scrambled by a C-RNTI, an MCS-C-RNTI, or a CS-RNTI, if the UE receives a configuration of pusch-AggregationFactor which is higher-layer signaling, the same symbol allocation is applied in successive slots of pusch-AggregationFactor and PUSCH transmission is limited to single rank transmission. For example, the UE should repeat the same TB in successive slots of pusch-AggregationFactor and apply the same symbol allocation for each slot. [Table 26] shows a redundancy version applied to PUSCH repetitive transmission for each slot. When the UE receives scheduling of PUSCH repetitive transmission in a plurality of slots by DCI format 0_1 and at least one symbol in slots for PUSCH repetitive transmission is indicated as downlink symbols according to information on tdd-UL-DL-ConfigurationCommon or tdd-UL-DL-ConfigurationDedicated which is higher-layer signaling, the UE does not perform PUSCH transmission in the slot in which the corresponding symbol is located.

TABLE 26

| ($rv_{id}$ indicated by the | ($rv_{id}$ to be applied to $n^{th}$ transmission occasion | | | |
|---|---|---|---|---|
| DCI scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

[PUSCH: Related to Repetitive Transmission]

Hereinafter, repetitive transmission of an uplink data channel in a 5G system is described in detail. In the 5G system, two types such as a PUSCH repetitive transmission type A and a PUSCH repetitive transmission type B are supported as the repetitive transmission method of the uplink data channel. The UE may receive a configuration of one of PUSCH repetitive transmission type A or B through higher-layer signaling.

PUSCH Repetitive Transmission Type a (PUSCH Repetition Type A)

As described above, the symbol length of the uplink data channel and the location of a start symbol may be determined through the time domain resource allocation method within one slot, and the BS may notify the UE of the number of repetitive transmissions through higher-layer signaling (for example, RRC signaling) or L1 signaling (for example, DCI).

The UE may repeatedly transmit the same uplink data channel in successive slots of the repetitive transmission section identified by the length of the uplink data channel configured based on the start symbol and the number of repetitive transmissions. At this time, when slots configured as the downlink in the UE by the BS or one or more symbols among the symbols of the uplink data channel configured as the downlink in the UE exist, the UE omits uplink data channel transmission in the corresponding slots or symbols, but counts the number of repetitive transmissions of the uplink data channel.

PUSCH Repetitive Transmission Type B (PUSCH Repetition Type B)

As described above, the symbol length of the uplink data channel and the location of a start symbol may be determined through the time domain resource allocation method within one slot, and the BS may notify the UE of the number numberofrepetitions of repetitive transmissions through higher-layer signaling (for example, RRC signaling) or L1 signaling (for example, DCI).

First, nominal repetition of the uplink data channel is determined on the basis of the start symbol and the length of the configured uplink data channel. A slot at which $n^{th}$ nominal repetition starts is given by $$K_s + \left\lfloor \frac{S + n \cdot L}{N_{symb}^{slot}} \right\rfloor,$$

and a symbol starting at the slot is given by mod $$(S + n \cdot L,\ N_{symb}^{slot}).$$

A slot at which $n^{th}$ nominal repetition ends is given by $$K_s + \left\lfloor \frac{S + (n + 1) \cdot L - 1}{N_{symb}^{slot}} \right\rfloor,$$

and a symbol ending at the slot is given by mod $$(S + (n + 1) \cdot L - 1,\ N_{symb}^{slot}).$$

Here, n=0, . . . , numberofrepetitions−1, S is a start symbol of a configured uplink data channel, and L is the symbol length of the configured uplink data channel. $K_s$ denotes a slot at which PUSCH transmission starts, and $$N_{symb}^{slot}$$

denotes the number of symbols per slot.

For the PUSCH repetitive transmission type B, the UE may determine a specific OFDM symbol as an invalid symbol in the following cases.

1. A symbol configured as the downlink by tdd-UL-DL-ConfigurationCommon or tdd-UL-DL-Configuration-Dedicated is determined as an invalid symbol for the PUSCH repetitive transmission type B.
2. Symbols indicated by ssb-PositionsInBurst within SIB1 or ssb-PositionsInBurst within ServingCellConfig-Common which is higher-layer signaling for SSB reception in unpaired spectrum (TDD spectrum) may be determined as invalid symbols for the PUSCH repetitive transmission type B.
3. In order to transmit a control resources set connected to a Type0-PDCCH CSS set in the unpaired spectrum (TDD spectrum), symbols indicated through pdcch-ConfigSIB1 within the MIB may be determined as invalid symbols for the PUSCH repetitive transmission type B.
4. When numberOfInvalidSymbolsForDL-UL-Switching which is higher-layer signaling is configured in the unpaired spectrum (TDD spectrum), symbols corresponding to numberOfInvalidSymbolsForDL-UL-Switching from the symbols configured as the downlink by tdd-UL-DL-ConfigurationCommon or tdd-UL-DL-ConfigurationDedicated may be determined as invalid symbols.

In addition, the invalid symbol may be configured in a higher-layer parameter (for example, InvalidSymbolPattern). The higher-layer parameter (for example, InvalidSymbolPattern) provides a symbol level bit map over one or two slots to configure the invalid symbol. In the bitmap, 1 indicates an invalid symbol. In addition, a period and a pattern of the bitmap may be configured through a higher-layer parameter (for example, periodicityAndPattern). When the higher-layer parameter (for example, InvalidSymbolPattern) is configured, the UE applies an invalid symbol pattern if an InvalidSymbolPattern-Indicator-ForDCIFormat0_1 or InvalidSymbolPatternIndicator-ForDCIFormat0_2 parameter indicates 1, or the UE may not apply the invalid symbol pattern if the parameter indicates 0. When the higher-layer parameters (for example, InvalidSymbolPattern) is configured and the InvalidSymbolPattern-Indicator-ForDCIFormat0_1 or InvalidSymbolPatternIndicator-ForDCIFormat0_2 is not configured, the UE applies the invalid symbol pattern.

After the invalid symbol is determined, for each nominal repetition, the UE may consider symbols except for the invalid symbol as valid symbols. When one or more valid symbols are included in each nominal repetition, the nominal repetition may include one or more actual repetitions. Each actual repetition includes successive sets of valid symbols which can be used for the PUSCH repetitive transmissions type B in one slot. When the OFDM symbol length of the nominal repetition is not 1 and the length of actual repetition is 1, the UE may ignore transmission for the corresponding actual repetition.

Figure 13:
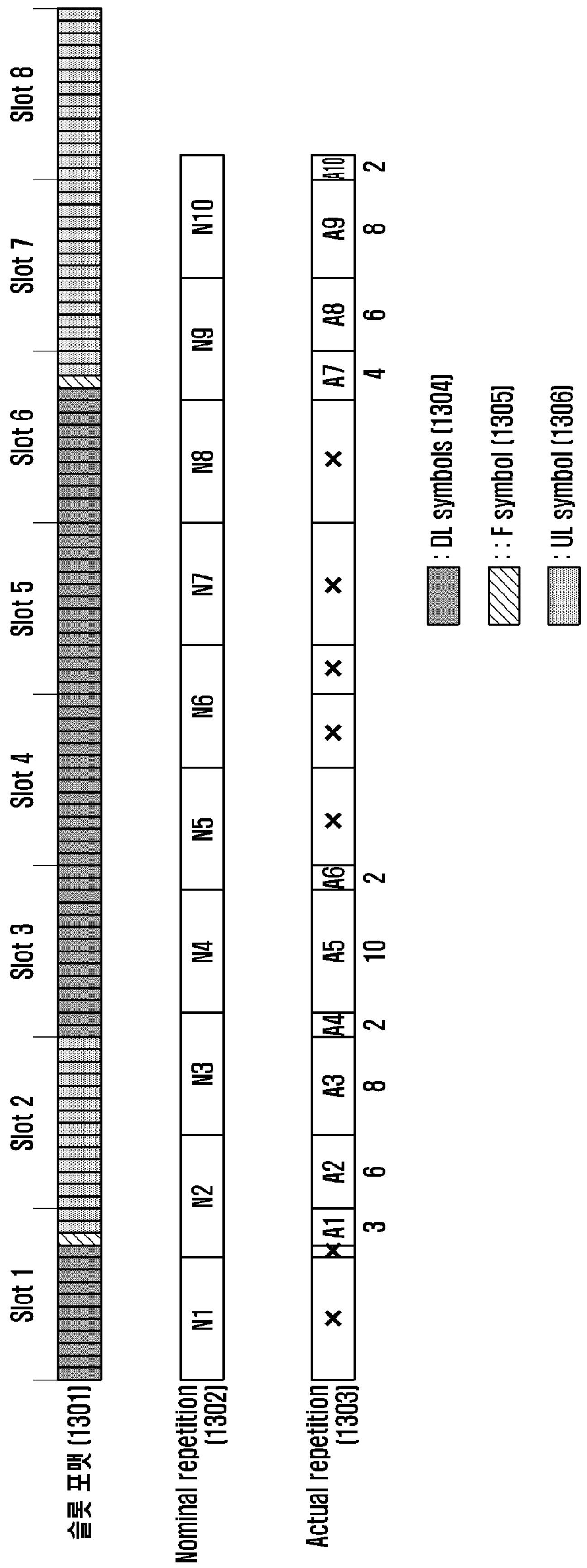
FIG. 13 illustrates an example of the PUSCH repetition type B according to an embodiment of the disclosure.

FIG. 13 illustrates an example of the PUSCH repetition type B according to an embodiment of the disclosure.

FIG. 13 illustrates the case in which the UE receives a configuration of a transmission start symbol S as 0, a transmission symbol length L as 10, and the number of repetitive transmissions as 10 in nominal repetition, which are expressed as N1 to N10 as indicated by reference numeral 1302. At this time, the UE may determine invalid symbols in consideration of a slot format 1301 to decide actual repetition, which may be expressed as A1 to A10 as indicated by reference numeral 1303. At this time, when the PUSCH repetition type B is not transmitted in the symbols determined as the downlink (DL) in the slot format according to the invalid symbols and the actual repetition determination method and there is a slot boundary within the nominal repetition, the nominal repetition may be divided into two actual repetitions and transmitted based on the slot boundary. For example, A1 indicating the first actual repetition includes three OFDM symbols, and A2 which can be transmitted next may include six OFDM symbols.

Further, for PUSCH repetitive transmission, the following additional methods may be defined for UL grant-based PUSCH transmission and configured grant-based PUSCH transmission beyond the slot boundary in NR Release 16.

Method 1 (mini-slot level repetition): two or more PUSCH repetitive transmissions are scheduled within one slot or beyond the boundary of successive slots through one UL grant.

In method 1, time domain resource allocation information within DCI indicates resources of first repetitive transmission. In addition, time domain resource information of the remaining repetitive transmissions may be determined according to the domain resource information of first repetitive transmission and an uplink or downlink direction determined for each symbol. Each repetitive transmission occupies successive symbols.

Method 2 (multi-segment transmission): two or more PUSCH repetitive transmissions are scheduled in successive slots through one UL grant. At this time, one transmission is designated for each slot, and start points or repetition lengths may vary depending on each transmission. In method 2, the time domain resource allocation information within DCI indicates start points and repetition lengths of all repetitive transmissions. When repetitive transmission is performed within a single slot through method 2 and there are several sets of successive uplink symbols within the corresponding slot, each repetitive transmission is performed for each uplink symbol set. When there is only one set of successive uplink symbols within the corresponding slot, one PUSCH repetitive transmission is performed according to the method of NR Release 15.

Method 3: two or more PUSCH repetitive transmissions are scheduled in successive slots through two or more UL grants. At this time, one transmission is designated for each slot, and an $n^{th}$ UL grant may be received before PUSCH transmission scheduled by an $(n-1)^{th}$ UL grant ends.

Method 4: one or a plurality of PUSCH repetitive transmissions may be supported within a signal slot or two or more PUSCH repetitive transmissions may be supported over boundaries of successive slots through one UL grant or one configured grant. The number of repetitions which the BS indicates to the UE is only a nominal value, and the number of PUSCH repetitive transmissions which the UE actually performs may be larger than the nominal number of repetitions. Time domain resource allocation information within the DCI or the configured grant is resources of the first repetitive transmission indicated by the BS. Time domain resource information of the remaining repetitive transmissions may be determined with reference to resource information of the first repetitive transmission and uplink or downlink directions of symbols. If the time domain resource information of repetitive transmission indicated by the BS is over the slot boundary or includes an uplink/downlink switching point, the corresponding repetitive transmission may be divided into a plurality of repetitive transmissions. At this time, one repetitive transmission may be included for each uplink period within one slot.

[Rate Matching for UCI Multiplexed in PUSCH]

Hereinafter, rate matching for uplink control information (UCI) in the 5G system is described in detail. Prior to the description of the rate matching for UCI, the case in which the UCI is multiplexed to the PUSCH is described. When the PUCCH and the PUSCH overlap and a timeline condition for UCI multiplexing is satisfied, the UE may multiplex HARQ-ACK included in the PUCCH and/or CSI information to the PUSCH according to the UCI information included in the PUSCH and may not transmit the PUCCH. At this time, the timeline condition for UCI multiplexing may refer to 3GPP standard TS 38.213 clause 9.2.5. As one example of the timeline condition for UCI multiplexing, when one of PUCCH transmission or PUSCH transmission is scheduled through DCI, the UE may perform UCI multiplexing only when the first symbol $S_0$ of the earliest PUCCH or PUSCH among the PUCCHs and PUSCHs overlapping the slot should satisfy the following condition.

$S_0$ is not a symbol transmitted earlier than a symbol including CP starting after $$T_{proc,1}^{max}$$

from the last symbol of the corresponding PDSCH.

$$T_{proc,1}^{max}$$

is a maximum value among $$\{T_{proc,1}^{max,1}, \ldots, T_{proc,1}^{max,i}, \ldots\}$$

for an $i^{th}$ PDSCH associated with HARQ-ACK transmitted through the PUCCH within a group of the overlapping PUCCH and PUSCH.

$$T_{proc,1}^{max,i}$$

is a processing procedure time for the $i^{th}$ PDSCH and is defined as $$T_{proc,1}^{max,i} = (N_1 + d_{1,1}) \cdot (2048 + 144) \cdot \kappa \cdot 2^{-\mu} \cdot T_C \; d_{1,1}$$

is a value determined for the $i^{th}$ PDSCH with reference to 3GPP standard TS 38.214 clause 5.3, and $N_1$ is a PDSCH processing time according to a PDSCH processing capability. μ is the smallest subcarrier configuration value among PUCCHs including a PDCCH scheduling the $i^{th}$ PDSCH, the $i^{th}$ PDSCH, and HARQ-ACK for $i^{th}$ PDSCH and all PUSCHs in the group of overlapping PUCCHs and PUSCHs. $T_c$ is $1/(\Delta f_{max} \cdot N_f)$ $\Delta f_{max}=480 \cdot 10^3$ Hz, and $N_f=4096$, and κ is 64.

These are parts of the timeline condition for UCI multiplexing, and the UE may perform UCI multiplexing for the PUSCH when all conditions are satisfied with reference to 3GPP standard TS 38.213 clause 9.2.5.

When the PUCCH and the PUSCH overlap, the timeline condition for UCI multiplexing is satisfied, and the UE determines to multiplex UCI included in the PUCCH to the PUSCH, the UE performs UCI rate matching for UCI multiplexing. The UCI multiplexing is performed in the order of HARQ-ACI, configured grant uplink control information (CG-UCI), CSI part 1, and CSI part 2. The UE performs rate matching in consideration of the order of UCI multiplexing. Accordingly, the UE calculates coded modulation symbols per layer for HARQ-ACK and CG-UCI and calculates coded modulation symbols per layer of CSI part 1 in consideration thereof. Thereafter, the UE calculates coded modulation symbols per layer of CSI part 2 in consideration of the coded modulation symbols per layer for HARQ-ACK, CG-UCI, and CSI part 1.

When rate matching is performed according to each UCI type, a method of calculating the number of coded modulation symbols per layer varies depending on a repetitive transmission type of the PUSCH to which UCI is multiplexed and whether uplink data (uplink shared channel (UL-SCH) is included. For example, when rate matching for HARQ-ACK is performed, equations of calculating coded modulation symbols per layer according to the PUSCH to which UCI is multiplexed are the following equations.

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL\text{-}sch}-1} K_r} \right\rceil, \left\lceil \alpha \cdot \sum_{l=l_0}^{N_{symb,all}^{PUSCH}-1} M_{sc}^{UCI}(l) \right\rceil\right\} \quad \text{[Equation 3]}$$

$$Q'_{ACK} = \min\left\{\left\lceil \frac{\left((O_{ACK} + L_{ACK}) \cdot \beta_{offset}^{PUSCH} \cdot \sum_{l=0}^{N_{symb,nominal}^{PUSCH}-1} M_{sc,nominal}^{UCI}(l)\right)}{\left(\sum_{r=0}^{C_{UL\text{-}SCH}-1} K_r\right)} \right\rceil, \left\lceil \alpha \cdot \sum_{l=0}^{N_{symb,nominal}^{PUSCH}-1} M_{sc,nominal}^{UCI}(l) \right\rceil, \sum_{l=0}^{N_{symb,actual}^{PUSCH}-1} M_{sc,actual}^{UCI}(l)\right\} \quad \text{[Equation 4]}$$

-continued $$Q'_{ACK} = \min\left\{\left\lceil \frac{(O_{ACK} + L_{ACK}) \cdot \beta_{offset}^{PUSCH}}{R \cdot Q_m} \right\rceil, \left\lceil \alpha \cdot \sum_{l=l_0}^{N_{symb,all}^{PUSCH}-1} M_{sc}^{UCI}(l) \right\rceil\right\}$$ [Equation 5]

[Equation 3] is an equation of calculating coded modulation symbols per layer for HARQ-ACK multiplexed to the PUSCH in the case of non-PUSCH repetitive transmission type B including the UL-SCH, and [Equation 4] is an equation of calculating coded modulation symbols per layer for HARQ-ACK multiplexed to the PUSCH repetitive transmission type B including the UL-SCH. [Equation 5] is an equation of calculating coded modulation symbols per layer for HARQ-ACK multiplexed to the PUSCH which does not include the UL-SCH. In [Equation 3], $O_{ACK}$ is the number of HARQ-ACK bits. $L_{ACK}$ dis the number of CRC bits for HARQ-ACK.

$$\beta_{offset}^{PUSCH}$$

is a beta offset for HARQ-ACK and corresponds to $$\beta_{offset}^{HARQ\text{-}ACK}.$$

$C_{UL\text{-}SCM}$ is the number of code blocks of the UL-SCH for PUSCH transmission, and $K_r$ is a code block size of an $r^{th}$ code block.

$$M_{sc}^{UCI}(l)$$

is the number of resource elements which can be used by a symbol for UCI transmission and is determined according to whether there is a DMRS and a PTRS of the symbol l. When the DMRS is included in the symbol $$l,\ M_{sc}^{UCI}(l) = 0$$

For the symbol l which does not include the DMRS, $$M_{sc}^{UCI}(l) = M_{sc}^{PUSCH} - M_{sc}^{PT-RS}(l)\ M_{sc}^{PUSCH}$$

is the number of subcarriers for a bandwidth in which PUSHC transmission is scheduled, and $$M_{sc}^{PT-RS}(l)$$

is the number of subcarriers including the PTRS within the symbol i.

$$N_{symb,all}^{PUSCH}$$

is the total number of symbols of the PUSCH. α is higher-layer parameter scaling, and corresponds to a ratio of resources to which UCI can be multiplexed to resources for the entire PUSCH transmission. $i_0$ is an index of a first symbol including no DMRS after a first DMRS. In [Equation 4], $$M_{sc,nominal}^{UCI}(l)$$

is the number of resource elements which can be used for UCI transmission for nominal repetition, and is 0 for a symbol including a DMRS and $$M_{sc,nominal}^{UCI}(l) = M_{sc}^{PUSCH} - M_{sc,nominal}^{PT-RS}(l)$$

for a symbol including no DMRS.

$$M_{sc,nominal}^{PT-RS}(l)$$

is the number of subcarriers including the PTRS within the symbol l for the PUSCH assuming nominal repetition.

$$N_{symb,nominal}^{PUSCH}$$

is the total number of symbols for nominal repetition of the PUSCH.

$$M_{sc,actual}^{UCI}(l)$$

is the number of resource elements which can be used for UCI transmission for actual repetition, and corresponds to 0 for a symbol including the DMRS and $$M_{sc,actual}^{UCI}(l) = M_{sc}^{PUSCH} - M_{sc,actual}^{PT-RS}(l)$$

for a symbol including no DMRS.

$$M_{sc,actual}^{PT-RS}(l)$$

is the number of subcarriers including the PTRS within the symbol l for actual repetition of the PUSCH.

$$N_{symb,actual}^{PUSCH}$$

is the total number of symbols for actual repetition of the PUSCH. In [Equation 5], R is a code rate of the PUSCH, and $Q_m$ is a modulation order of the PUSCH.

The number of coded modulation symbols per layer having passed through the rate matching of CSI part 1 may be calculated similarly to HARQ-ACK, but the number of resources which can be maximally allocated among all resources is reduced to a value except for the number of coded modulation symbols for HARQ-ACK/CG-UCI. Equations of calculating coded modulation symbols per layer of CSI part 1 are [Equation 6], [Equation 7], [Equation 8], and [Equation 9] according to the PUSCH repetitive transmission type and whether the UL-SCH is included or not.

$$\beta_{offset}^{PUSCH}$$

is a beta offset for CSI part 1 and corresponds to $$\beta_{offset}^{CSI-part1} \cdot Q'_{ACK/CG-UCI}$$

is the number of coded modulation symbols per layer calculated for HARQ-ACK and/or CG-UCI. Other param-

[Equation 6]

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UGI} \right\}$$

[Equation 7]

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nominal}^{UCI}(l) \right\rceil Q'_{ACK/CG-UCI}, \sum_{l=0}^{N_{symb,actual}^{PUSCH}-1} M_{sc,actual}^{UCI}(l) - Q'_{ACK/CG-UGI} \right\}$$

[Equation 8]

$$Q'_{CSI-1} = \min\left\{\left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{UCI}(l) - Q'_{ACK} \right\}$$

[Equation 9]

$$Q'_{CSI-1} = \sum_{l=0}^{N_{symb,all}^{PUSCH}-1} M_{sc}^{UCI}(l) - Q'_{ACK}$$

[Equation 6] is an equation of calculating coded modulation symbols per layer for CSI part 1 multiplexed to the PUSCH in the case of non-PUSCH repetitive transmission type B including the UL-SCH, and [Equation 7] is an equation of calculating coded modulation symbols per layer for CSI part 1 multiplexed to the PUSCH repetitive transmission type B including the UL-SCH. [Equation 8] is an equation of calculating coded modulation symbols per layer for multiplexed CSI part 1 when CSI part 1 and CSI part 2 are multiplexed to the PUSCH including no UL-SCH. [Equation 9] is an equation of calculating coded modulation symbols per layer for multiplexed CSI part 1 when CSI part 2 is not multiplexed to the PUSCH including no UL-SCH. In [Equation 6], $O_{CSI-L}$ and $L_{CSI-1}$ are the number of bits for CSI part 1 and the number of CRC bits for CSI part 1.

eters are the same as the parameters required for calculating the number of coded modulation symbols per layer for HARQ-ACK.

The number of coded modulation symbols per layer having passed through the rate matching of CSI part 2 may be calculated similarly to CSI part 1, but the number of resources which can be maximally allocated among all resources is reduced to a value except for the number of coded modulation symbols for HARQ-ACK/CG-UCI and the number of coded modulation symbols for CSI part 2. Equations of calculating coded modulation symbols per layer of CSI part 1 are [Equation 10], [Equation 11], and [Equation 12] according to the PUSCH repetitive transmission type and whether the UL-SCH is included or not.

[Equation 10]

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

-continued $$\left\lceil \alpha \cdot \sum_{l=0}^{N_{symb,all}^{PUSCH}-1} M_{sc}^{UCI}(l) \right\rceil - Q'_{ACK/CG-UGI} - Q'_{CSI-1} \Bigg\}$$

[Equation 11]

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$

$$\left\lceil \alpha \cdot \sum_{l=0}^{N_{symb,nominal}^{PUSCH}-1} M_{sc,nominal}^{UCI}(l) \right\rceil - Q'_{ACK/CG-UGI} - Q'_{CSI-1},$$

$$\left. \sum_{l=0}^{N_{symb,actual}^{PUSCH}-1} M_{sc,actual}^{UCI}(l) - Q'_{ACK/CG-UGI} - Q'_{CSI-1} \right\}$$

[Equation 12]

$$Q'_{CSI-2} = \sum_{l=0}^{N_{symb,all}^{PUSCH}-1} M_{sc}^{UCI}(l) - Q'_{ACK} - Q'_{CSI-1}$$

[Equation 10] is an equation of calculating coded modulation symbols per layer for CSI part 2 multiplexed to the PUSCH in the case of non-PUSCH repetitive transmission type B including the UL-SCH, and [Equation 11] is an equation of calculating coded modulation symbols per layer for CSI part 2 multiplexed to the PUSCH repetitive transmission type B including the UL-SCH. [Equation 12] is an equation of calculating coded modulation symbols per layer for CSI part 2 multiplexed to the PUSCH including no UL-SCH. In [Equation 10], $O_{CSI-2}$ and $L_{CSI-2}$ are the number of bits for CSI part 2 and the number of CRC bits for CSI part 2.

$$\beta_{offset}^{PUSCH}$$

is a beta offset for CSI part 2 and corresponds to $$\beta_{offset}^{CSI-part2}.$$

Other parameters are the same as the parameters required for calculating the number of coded modulation symbols per layer for HARQ-ACK and CSI part 1.

The number of coded modulation symbols per layer having passed through the rate matching of CG-UCI may also be calculated similarly to HARQ-ACK. An equation of calculating coded modulation symbols per layer of CG-UCI multiplexed to the PUSCH including the UL-SCH is [Equation 13].

[Equation 13]

$$Q'_{CG-UCI} = \min\left\{ \left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

In [Equation 13], $O_{CG-UCI}$ and $L_{CG-UCI}$ are the number of bits of CG-UCI and the number of CRC bits for CG-UCI.

$$\beta_{offset}^{PUNCH}\ \beta_{offset}^{PUSCH}$$

is a beta offset for CG-UCI and corresponds to $$\beta_{offset}^{CG-UCI}.$$

Other parameters are the same as the parameters required for calculating the number of coded modulation symbols per layer for HARQ-ACK.

HARQ-ACK and CG-UCI are multiplexed to the PUSCH including the UL-SCH, the number of coded modulation symbols per layer having passed through rate matching of HARQ-ACK and CG-UCI may be calculated through [Equation 14].

$$Q'_{CG-UCI}=\min\left\{\left\lceil\frac{(O_{ACK}+L_{CG-UCI}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\left\lceil\alpha\cdot\sum_{l=l_0}^{N_{symb,all}^{PUSCH}-1}M_{sc}^{UCI}(l)\right\rceil\right\}$$ [Equation 14]

In [Equation 14]

$$\beta_{offset}^{PUSCH}$$

is a beta offset for HARQ-ACK and corresponds to $$\beta_{offset}^{HARQ-ACK},$$

and other parameters are the same as the parameters required for calculating the number of coded modulation symbols per layer for HARQ-ACK.

In an embodiment of the disclosure, a specific type of transmission/reception side structure may be needed to effectively process self-interference between a transmission signal (or a downlink signal) and a reception signal (or an uplink signal). For example, the transmission/reception side structure illustrated in FIG. 9 may be considered. The structure of the transmission side and the reception side illustrated in FIG. 9 may process the self-interference in various ways. For example, a block of DPD 911 on the transmission side may perform line distortion on a transmission signal 901 in a digital domain, thereby minimizing leakage power (for example, corresponding to adjacent carrier leakage (ACL) 1005 illustrated in FIG. 10) output to an adjacent band. In another example, a block of SIC 921 on the transmission side may serve to remove a transmission signal received by the reception side, that is, self-interference from a reception signal. In addition, various transmission and reception technologies for effectively removing interference may be applied. At this time, in order to effectively process interference between transmission and reception sides, the BS or UE apparatus should set parameter values of respective transmission and reception side blocks as specific values. At this time, optimal parameter values of respective transmission and reception side blocks for effectively processing interference may be different according to uplink and downlink transmission resource patterns, and accordingly, a predetermined time of delay for changing the pattern by each device may be generated when the uplink and downlink transmission resource patterns become different.

An embodiment of the disclosure provides various embodiments for configuring resources for uplink and downlink transmission and reception in the time and frequency domains and provides a method of performing rate matching according to a UCI type multiplexed to the PUSCH in a specific uplink and downlink transmission and reception resource pattern, a PUSCH repetitive transmission type, and whether the UL-SCH is included or not.

Hereinafter, higher-layer signaling may be signaling corresponding to at least one of the following signalings or a combination of one or more thereof.

Master information block (MIB)

System information block (SIB) or SIB X (X=1, 2, . . . )

Radio resource control (RRC)

Medium access control (MAC) control element (CE)

UE capability reporting

UE assistance information or message

L1 signaling may be signaling corresponding to at least one of the following physical layer channels or signaling methods or a combination of one or more thereof.

Physical downlink control channel (PDCCH)

Downlink control information (DCI)

UE-specific DCI

Group common DCI

Common DCI

Scheduling DCI (for example, DCI used for scheduling downlink or uplink data)

Non-scheduling DCI (for example, DCI other than DCI for scheduling downlink or uplink data)

Physical uplink control channel (PUCCH)

Uplink control information (UCI)

First Embodiment: Resource Configuration Method in XDD System

A first embodiment of the disclosure relates to a method and an apparatus for configuring resources for uplink or downlink transmission and reception in the time domain and the frequency domain through cell-specific configuration information on the XDD system. Through the resource configuration method for downlink or uplink transmission and reception according to an embodiment of the disclosure, the UE may receive a configuration of uplink resources and downlink resources in different frequency domains within the same time domain.

Accordingly, time domain resources in which the UE can perform uplink transmission or downlink reception may increase, and thus the uplink coverage of the UE and the BS may increase as described above. Hereinafter, for convenience of description, the resource configuration for uplink or downlink transmission and reception is referred to as an uplink-downlink configuration.

Specifically, as described above, the UE may receive allocation of resources divided for uplink and downlink transmission and reception not only in the time domain but also in the frequency domain in the XDD system, and thus the resource configuration for uplink or downlink transmission and reception may be configured not only in the time domain but also each of the time domain and the frequency domain like in the TDD system. The BS may configure the guard band in the UE through the resource configuration for uplink or downlink transmission and reception in the time domain and the frequency domain, thereby controlling an interference effect by OOB emission caused according to frequency bands of the uplink and downlink resources being relatively closer than the FDD. Further, the UE may determine a frequency band in which scheduling is actually performed and a signal can be transmitted and received even though an uplink BWP and a downlink BWP have the same center frequency through the resource configuration for uplink or downlink transmission and reception in the time domain and the frequency domain.

Hereinafter, an uplink or downlink configuration method in the time domain and the frequency domain in the XDD system is provided.

The following methods may be considered as the method of configuring resources for uplink or downlink transmission and reception in the time domain and the frequency domain in the XDD system.

[Method 1]

For the resource configuration for uplink or downlink transmission and reception in the time domain and the frequency domain, the BS divides the entire frequency band into n frequency bands and indicates the uplink and downlink configuration in the time domain to the UE in every frequency band. A method of dividing the entire frequency bands into n frequency bands is described through a second embodiment. Each of the n frequency bands may include a set of successive resource blocks, which may be referred to as a resource block set (RBS) or a resource block group, and is described as an RBS in the disclosure for convenience of description. Uplink-downlink configuration information may include uplink-downlink pattern information and subcarrier information which is a reference in each frequency band. Through the uplink-downlink pattern information, a pattern period 603 in the time domain, the number 611 of consecutive downlink slots from a start point of each pattern, the number 612 of symbols of the next slot, the number 613 of consecutive uplink slots from the end of the pattern, and the number 614 of symbols of the next slot may be indicated. At this time, the UE may determine that the slot and symbol which are not indicated by the uplink and the downlink are flexible slot/symbol.

Figure 14:
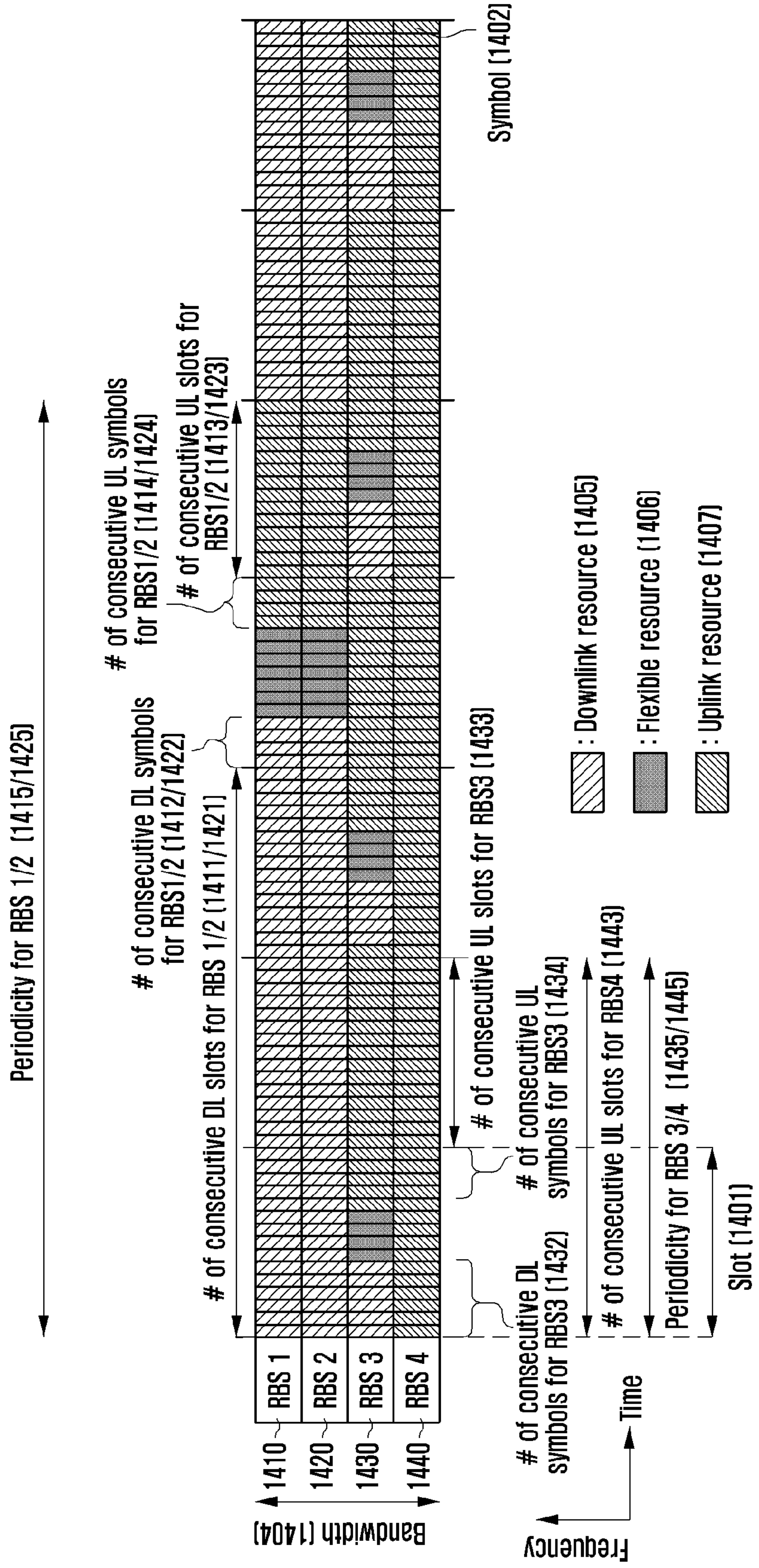
FIG. 14 illustrates an uplink-downlink configuration in the time domain and the frequency domain of the XDD system according to an embodiment of the disclosure.

FIG. 14 illustrates an uplink-downlink configuration in the time domain and the frequency domain of the XDD system according to an embodiment of the disclosure.

Referring to FIG. 14, the entire frequency band is divided into n=4 RBSs 1410, 1420, 1430, and 1440, and the uplink-downlink is configured in the time domain for each RBS. For example, a pattern period of RBS 1 1410 may be configured as five slots 1415 (or 5 ms based on subcarrier spacing 15 kHz), the number of consecutive downlink slots from the start point of the pattern may be configured as three 1411, the number of downlink symbols of the next slot may be configured as four 1412, the number of consecutive uplink slots from the end of the pattern may be configured as one 1413, and the number of uplink symbols of the next slot may be configured as four 1414. The uplink-downlink configuration of RBS 2 1420 may be the same as that of RBS 1 1410. For example, an uplink-downlink pattern period of RBS 3 1430 may be configured as two slots 1435 (or 2 ms based on subcarrier spacing 15 kHz), the number of consecutive downlink slots from the start point of the pattern may be configured as zero, the number of downlink symbols of the next slot may be configured as six 1432, the number of consecutive uplink slots from the end of the pattern may be configured as one 1433, and the number of uplink symbols of the next slot may be configured as four 1434. Last, an uplink-downlink pattern period of RBS 4 1440 may be configured as two slots 1435 (or 2 ms based on subcarrier spacing 15 kHz), the number of consecutive downlink slots from the start point of the pattern may be configured as zero, the number of downlink symbols of the next slot may be configured as zero, the number of consecutive uplink slots from the end of the pattern may be configured as two 1433, and the number of uplink symbols of the next slot may be configured as zero1434.

For the uplink-downlink configuration, the uplink-downlink is configured for each RBS within limited overhead, and thus uplink or downlink resources may be relatively flexibly configured in the time domain.

Method 2

For the uplink-downlink configuration in the time domain and the frequency domain, the BS divides the entire frequency band into n frequency bands and indicates the uplink-downlink configuration in the frequency domain to the UE. In each pattern, uplink-downlink configuration information may include uplink-downlink pattern information and subcarrier information which is a reference. Through the uplink-downlink pattern information, the number of slot(s)/symbol(s) of the time domain having the same pattern, the number of consecutive downlink RBSs from the start point of the entire frequency band, the number of downlink RBs of the next RBS, the number of consecutive uplink RBSs from the end of the entire frequency band, and the number of uplink RBs of the next RBS may be indicated. At this time, the RBS and the RB which are not indicated as the uplink and the downlink may be determined as a (flexible) RBS/RB.

Figure 15:
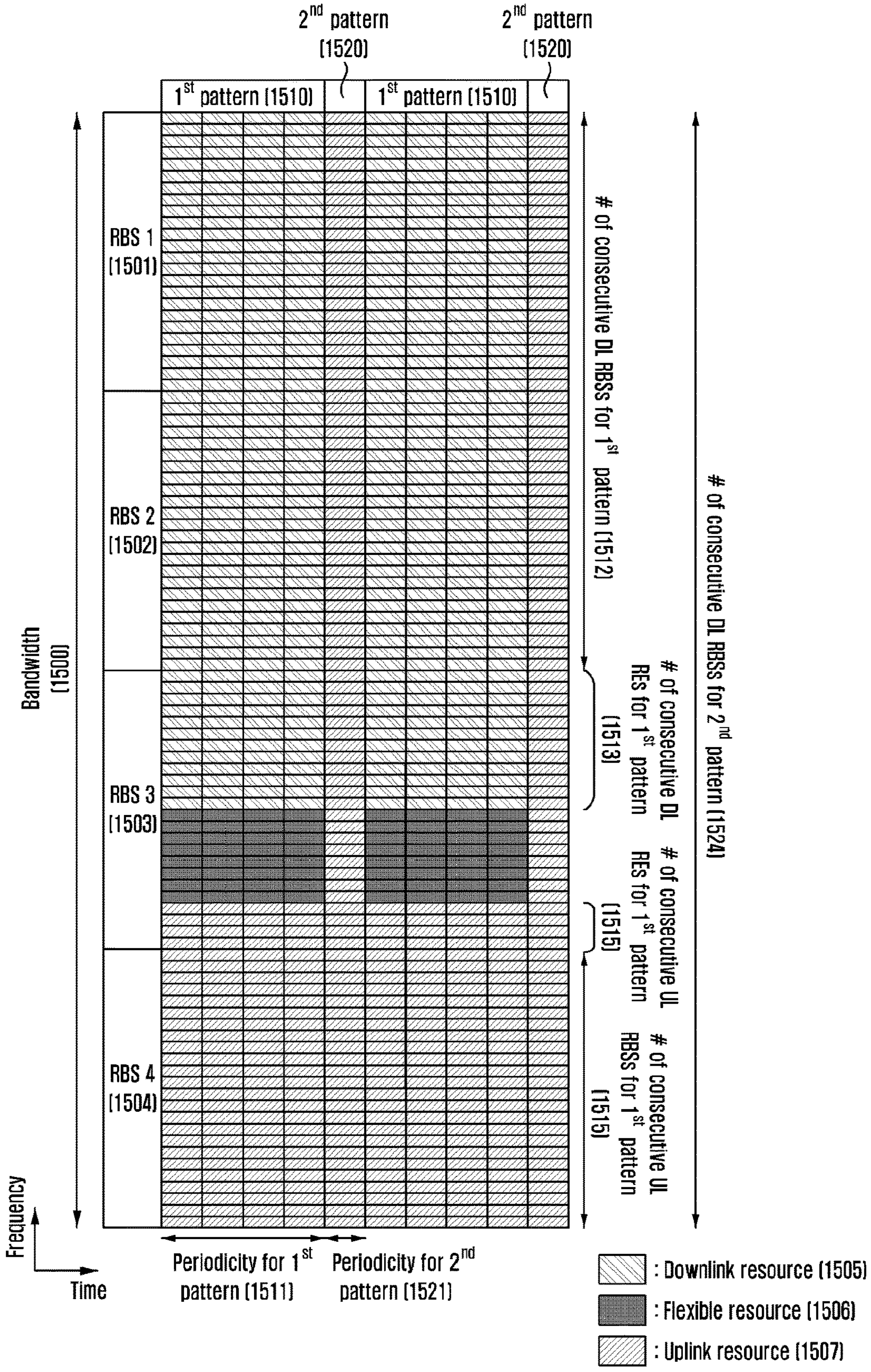
FIG. 15 illustrates the uplink-downlink configuration of the time and frequency in the XDD system according to another embodiment of the disclosure.

FIG. 15 illustrates an uplink-downlink configuration of the time and the frequency in the XDD system according to another embodiment of the disclosure.

Referring to FIG. 15, an entire frequency band 1500 is divided into n=4 RBSs 1501, 1502, 1503, and 1504, each RBS includes 24 RBs, and the uplink-downlink is configured in the frequency domain for each pattern. For example, a period of a first pattern 1510 may be configured as four slots 1511 (or 4 ms based on subcarrier spacing 15 kHz), the number of consecutive downlink RBSs from the start point of the entire frequency band may be configured as two 1512, the number of downlink RBs of the next RBS may be configured as twelve 1513, the number of consecutive uplink RBSs from the end of the entire frequency band may be configured as one 1514, and the number of uplink RBs of the next RBS may be configured as four 1515. A period of a second pattern 1520 may be configured as one slot 1521 (or 1 ms based on subcarrier spacing 15 kHz) and the number of consecutive uplink RBSs from the end of the entire frequency band may be configured as four 1524.

For the uplink-downlink configuration, the uplink-downlink is configured with a period of the time domain in the frequency domain for each pattern within limited overhead, and thus the uplink or downlink may be relatively flexibly configured in the frequency domain. At this time, the guard band may be efficiently configured to reduce interference to reception of an uplink channel or signal by out-of-band emission generated when the BS transmits a downlink channel or signal in downlink resources in the XDD system.

Second Embodiment: Frequency Band Division Method in XDD System

The second embodiment of the disclosure discloses the method of dividing the entire frequency band into n frequency bands according to the first embodiment. Specifically, like in the TDD system, it is required to divide frequency resources in specific units in order to configure uplink-downlink resources in the XDD system as well as dividing the uplink and downlink resources in the time.

Particularly, when the entire frequency band is 100 MHz and subcarrier spacing is 30 kHz, the number of RBs may be 273. At this time, when each of the 273 RBs are configured by uplink or downlink resources, significant overhead may be generated.

Accordingly, for the uplink-downlink configuration in the time domain and the frequency domain in the XDD system, the following methods may be considered as a method of dividing a frequency band into groups.

Method 1

RBs in a frequency band may include n groups including the specific number of RBs. The number of RBs in each group may be determined through an uplink-downlink pattern configuration or may be prearranged, and the number of groups may be n. For example, when subcarrier spacing (SCS) is 30 kHz and the entire frequency band is 100 MHz, the total number of RBs is 273. At this time, when the number of RBs per group is 24 and is included and configured in an uplink-downlink pattern or the 24 RBs are prearranged, the total number n=[total number of RBs/number of RBs configured for each grou]=[273/24]=12 of groups may be configured. This may be efficiently determined to reduce overhead for the uplink-downlink configuration in the frequency domain as described above.

The method is a method of configuring RBs in the frequency band as n groups including the specific number of RBs, the number of RBs configured per group is not limited to determination by the uplink-downlink pattern configuration or the prearranged value, and information required for configuring the number of RBs per group may be included in system information block, user-specific configuration information through dedicated-higher-layer signaling, MAC CE, or downlink control information which is L1 signaling.

Method 2

The entire frequency band may include n groups of a specific frequency band. A specific frequency band value per group may be determined through an uplink-downlink pattern configuration or may be prearranged, and the number of groups may be n. For example, when the entire frequency band is 100 MHz and a frequency band per group of 20 MHz is included in and indicated by the uplink-downlink pattern configuration or a prearranged frequency band is configured as 20 MHz, the total number n=[entire frequency band/frequency band configured for each group]=[100/20]=5 of groups may be configured. This may be efficiently determined to reduce overhead for the uplink-downlink configuration of the frequency domain as described above.

The method is a method of configuring the frequency band as n groups of a specific frequency band, and the method of receiving a configuration of a frequency band value per group is not limited to a configuration of an uplink-downlink pattern. The frequency band value per group may be configured as the prearranged number of RBs or information used for configuring the frequency band value per group may be included in system information block, user-specific configuration information through dedicated-higher-layer signaling, MAC CE, or downlink control information which is L1 signaling.

Method 3

The entire frequency band may include two groups based on a guard band. A frequency band of the guard band may be indicated through an uplink-downlink pattern configuration, and two groups of a frequency band lower than the guard band and a frequency band higher than the guard band may be configured based on the guard band. For example, when a start location and a size of the guard band are configured as a $100^{th}$ CRB from a point A and 50 CRBs in the entire frequency band of 100 MHz, CRBs from the point A to a $99^{th}$ CRB which is a frequency band lower than the buard band may be classified as a first group and CRBs from a $150^{th}$ CRB to the last CRB may be classified as a second group. This may be efficiently determined to reduce overhead for the uplink-downlink configuration in the frequency domain as described above. Particularly, it is very difficult to allocate non-successively the downlink or the uplink at the same time point in implementation of the BS, and interference by the OOB may be generated between the uplink and the downlink as described above. Accordingly, when the downlink or the uplink should be always successively configured, two groups may be efficiently divided by the guard band configured between the downlink and the uplink.

The method is a method of configuring the frequency band as two groups based on the guard band, and a method of receiving a guard band-related configuration is not limited to a configuration of an uplink-downlink pattern. The guard band may be configured as the prearranged number of RBs or information used for configuring the guard band may be included in system information block, user-specific configuration information through dedicated-higher-layer signaling, MAC CE, or downlink control information which is L1 signaling.

Third Embodiment: Uplink Configuration Method in XDD System

According to an embodiment of the disclosure, uplink and downlink resources may be flexibly configured in the time and frequency domains. That is, random time and frequency resources may be configured as the uplink or the downlink. Thereafter, in the description of the disclosure, a configuration as the uplink or the downlink in random time and frequency resources is named an "uplink and downlink configuration (UL_DL configuration)". The uplink and downlink configuration may include a downlink symbol, an uplink symbol, and a flexible symbol.

According to an embodiment of the disclosure, the uplink and downlink configuration may be statically, semi-statically, or dynamically changed. According to an embodiment of the disclosure, the BS may configure or indicate uplink and downlink configuration information to the UE through higher-layer signaling, L1 signaling, or a combination of higher-layer signaling and L1 signaling. For example, the BS may perform the uplink configuration in the UE through higher-layer signaling. In another example, the BS may perform one or a plurality of uplink and downlink configurations in the UE through higher-layer signaling, and activate one uplink and downlink configuration thereof through higher-layer signaling (for example, MAC CE) or L1 signaling. The UE may acquire uplink and downlink configuration information from the BS, expect reception of a signal in resources configured as the downlink, and expect transmission of a signal in resources configured as the uplink. Various detailed uplink and downlink configuration methods may follow the first embodiment and the second embodiment.

According to an embodiment of the disclosure, the uplink and downlink configuration may be changed based on L1 signaling (for example, DCI). More specifically, the BS may transmit a DCI format including an indicator for changing an uplink and downlink configuration A to an uplink and downlink configuration B to the UE through the PDCCH. The UE may receive the DCI format including the indicator for changing the uplink and downlink configuration from the BS and change the uplink configuration A to the uplink configuration B, based on the content indicated by the received DCI format.

According to an embodiment of the disclosure, a table including a plurality of uplink and downlink configurations for changing the uplink and downlink configuration may be predefined or may be configured in the UE by the BS through higher-layer signaling. For example, an "uplink and downlink configuration table" including N uplink and downlink configurations {uplink and downlink configuration #1, uplink and downlink configuration #2, uplink and downlink configuration #3, . . . , uplink and downlink configuration #N} may be predefined or may be configured in the UE by the BS through higher-layer signaling. The BS may transmit an indicator for activating uplink and downlink configuration #X within the uplink and downlink configuration table to the UE through L1 signaling (for example, the DCI format). The UE may activate uplink and downlink configuration #X indicated by L1 signaling (for example, the DCI format) received from the BS, based on the predefined ore preset uplink and downlink configuration table.

According to an embodiment of the disclosure, when the uplink and downlink configuration is changed, an additional change delay time ($T_{delay}$) may be considered. As described above, the optimal parameter values of respective transmission and reception side blocks for effectively processing interference between the downlink and the uplink may be different according to the uplink and downlink transmission resource pattern, and accordingly, a predetermined delay time ($T_{delay}$) for changing the transmission and reception side parameter values may be generated according to the change in the uplink and downlink configuration.

Figure 16:
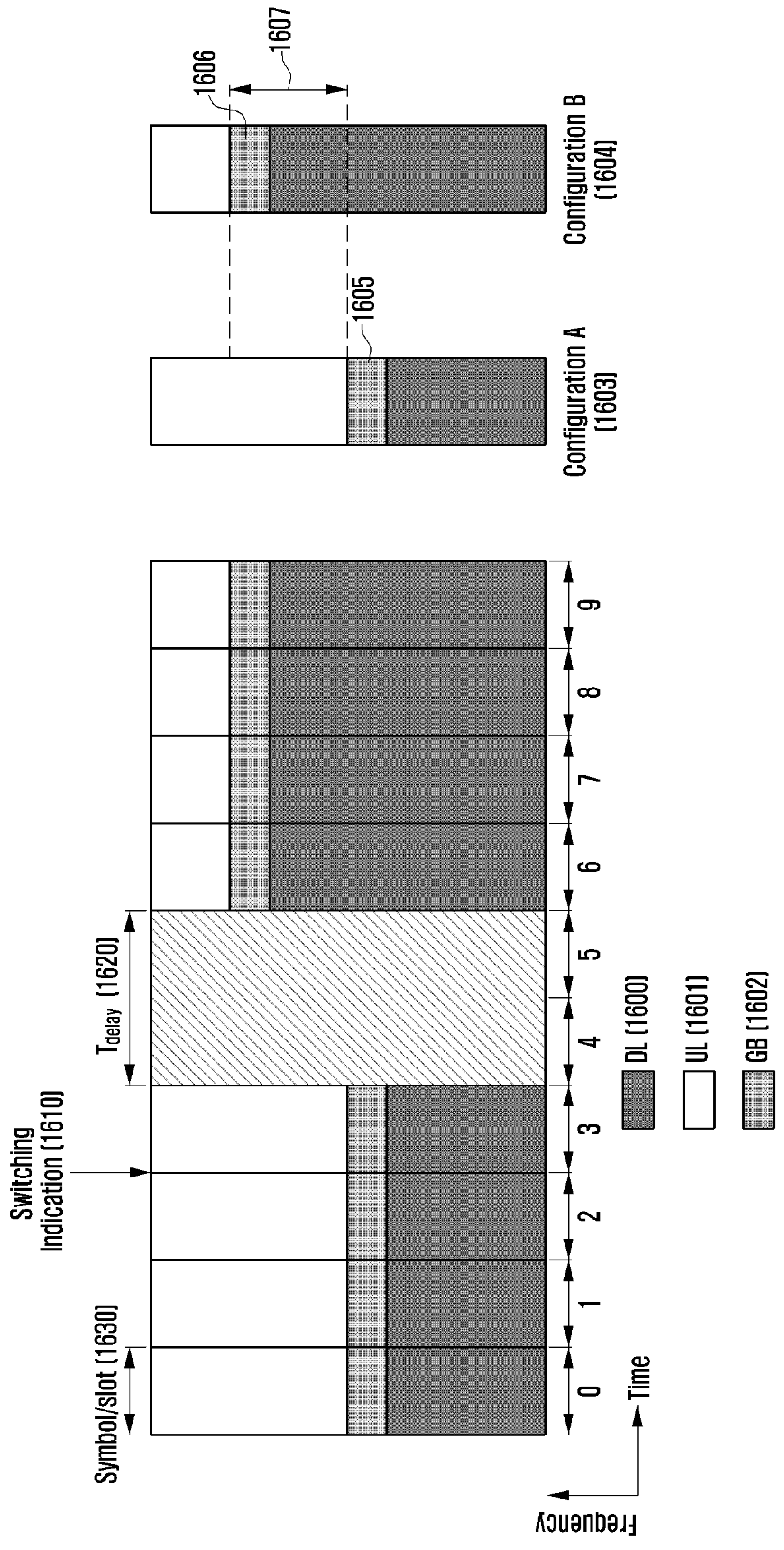
FIG. 16 illustrates an example of an uplink and downlink configuration change according to an embodiment of the disclosure.

FIG. 16 illustrates an example of a change in the uplink and downlink configuration according to an embodiment of the disclosure.

FIG. 16 illustrates an example in which a configuration change between a predetermined uplink and downlink configuration A 1603 and a predetermined uplink and downlink configuration B 1604 is made. The resource unit of the time domain may be a symbol, a slot, or various other time units (for example, a mini slot), and the slot unit is assumed in an example of FIG. 16. In the example of FIG. 16, the BS transmits an uplink and downlink configuration change indicator 1610 to the UE in slot 3 and an operation in which the uplink and downlink configuration is changed from the uplink and downlink configuration A 1603 to the uplink and downlink configuration B 1604 is shown. At this time, in order to change the uplink and downlink configuration from the uplink and downlink configuration A 1603 to the uplink and downlink configuration B 1604, a change time corresponding to $T_{delay}$ 1620 may be needed. That is, in order to change the uplink configuration, the BS may transmit the configuration change indicator 1610 in a predetermined slot n and operate based on the changed uplink and downlink configuration from a time point after slot n+$T_{delay}$. When the UE receives the uplink and downlink configuration change indicator from the BS in the slot n, the UE may operate based on the changed uplink and downlink configuration from a time point after n+$T_{delay}$.

According to an embodiment of the disclosure, the change delay time $T_{delay}$ 1620 may be considered only when a specific "condition A" is satisfied. That is, $T_{delay}$ 1620 may have a value larger than 0 the condition A is satisfied, and $T_{delay}$ 1620 may be 0 when the condition A is not satisfied. For example, when at least one of the following conditions or a combination of one or more conditions is satisfied, $T_{delay}$ 1620 may be considered.

[Condition 1]

When an uplink and downlink direction in specific frequency domain resources is changed in the uplink and downlink configuration A before the change and the uplink and downlink configuration B after the change, the change delay time $T_{delay}$ may be required. For example, specifically, in the example of FIG. 16, when the uplink and downlink configuration 1603 is changed to the uplink and downlink configuration B 1604, specific frequency domain resources 1607 may be changed from the uplink to the downlink. As described above, when the direction change between the uplink and the downlink is made in the frequency domain resources, the change delay time $T_{delay}$ 1620 may be required. When the direction change between the uplink and the downlink is made in the frequency domain, an interference state between the uplink and the downlink may become different, and thus the change delay time $T_{delay}$ corresponding to an additional time may be needed to set a parameter value of the transmission and reception sides as an optimal value by the BS or the UE apparatus.

[Condition 2]

When the guard band is changed in the uplink and downlink configuration A before the change and the uplink and downlink configuration B after the change (for example, the location or the size of the guard band is changed), the change delay time $T_{delay}$ may be required. For example, specifically, in the example of FIG. 16, the uplink and downlink configuration A 1603 before the change and the uplink and downlink configuration B 1604 after the change may have different locations 1605 and 1606 of the guard band, in which case the change delay time $T_{delay}$ 1620 may be required. The guard band within the uplink and downlink configuration may have different sizes and locations required according to interference between the uplink and the downlink. That is, configuration information for the guard band may also be different according to the uplink and downlink configuration, and the change in the configuration of the guard band may mean that interference conditions between the uplink and the downlink are different. Accordingly, when the guard band is changed along with the change in the uplink and downlink configuration, it may mean that the interference conditions between the uplink and the downlink are different, and thus an additional change delay time $T_{delay}$ may be needed to set a parameter value of the transmission and reception sides as an optimal value by the BS or the UE apparatus

[Condition 3]

When the uplink and downlink configuration A before the change corresponds to a specific uplink and downlink configuration X, the additional change delay time $T_{delay}$ 1620 may be required. In an embodiment, the specific uplink and downlink configuration X may be predefined, may be explicitly configured in the UE by the BS through higher-layer signaling, or may be implicitly determined by another system parameter. In an embodiment, the number of specific uplink and downlink configurations X may be one or plural and, when the number of specific uplink and downlink configurations X is plural, the plurality of uplink and downlink configurations may include a set of uplink and downlink configurations X. In this case, when the uplink and downlink configuration X before the change corresponds to a random uplink and downlink configuration within the set of uplink and downlink configurations X, the change delay time may be required.

[Condition 4]

When the uplink and downlink configuration B after the change corresponds to a specific uplink and downlink configuration Y, the additional change delay time $T_{delay}$ 1620 may be required. In an embodiment, the specific uplink and downlink configuration Y may be predefined, may be explicitly configured in the UE by the BS through higher-layer signaling, or may be implicitly determined by another system parameter. In an embodiment, the number of specific uplink and downlink configurations Y may be one or plural and, when the number of specific uplink and downlink configurations Y is plural, the plurality of uplink and downlink configurations may include a set of uplink and downlink configurations Y. In this case, when the uplink and downlink configuration Y after the change corresponds to a random uplink and downlink configuration within the set of uplink and downlink configurations Y, the change delay time may be required.

[Condition 5]

When the uplink and downlink configuration A before the change corresponds to the specific uplink and downlink configuration X and the uplink and downlink configuration B after the change corresponds to the specific uplink and downlink configuration Y, the change delay time $T_{delay}$ 1620 may be required. In an embodiment, the specific uplink and downlink configuration X and the specific uplink and downlink configuration Y may be predefined, may be explicitly preconfigured in the UE by the BS through higher-layer signaling, or may be implicitly determined by another system parameter. In an embodiment, the number of specific uplink and downlink configurations X and specific uplink and downlink configurations Y may be one or plural and, when the number of specific uplink and downlink configurations X and specific uplink and downlink configurations Y is plural, the plurality of uplink and downlink configurations may include a set of uplink and downlink configurations X and a set of uplink and downlink configurations Y. In this case, when the uplink and downlink configuration A before the change corresponds to a random uplink and downlink configuration within the set of uplink and downlink configurations X and the uplink and downlink configuration B after the change corresponds to a random uplink and downlink configuration within the set of uplink and downlink configurations Y, the change delay time may be required.

According to an embodiment of the disclosure, the change delay time $T_{delay}$ 1620 may be always considered when the uplink and downlink configuration is changed. That is, the change delay time $T_{delay}$ may be required regardless of whether the condition A is satisfied or not.

According to an embodiment of the disclosure, the uplink and downlink change delay time $T_{delay}$ may be predefined as a fixed value. The BS and the UE may determine the change delay time, based on the predefined $T_{delay}$.

According to an embodiment of the disclosure, the uplink and downlink change delay time $T_{delay}$ may be explicitly configured or notified to the UE by the BS through higher-layer signaling. The UE may determine the change delay time, based on $T_{delay}$ received from the BS.

According to an embodiment of the disclosure, the uplink and downlink change delay time $T_{delay}$ may be notified to the BS by the UE through a UE capability report (UE capability signaling). The BS may determine the change delay time, based on $T_{delay}$ received from the UE.

According to an embodiment of the disclosure, the uplink and downlink change delay time $T_{delay}$ may be defined as a different value according to a subcarrier spacing value. That is, $T_{delay,i}$ may be defined for subcarrier spacing i. For example, $T_{delay,0}$ may be required when subcarrier spacing is 15 kHz, $T_{delay,1}$ may be required when subcarrier spacing is 30 kHz, $T_{delay,2}$ may be required when subcarrier spacing is 60 kHz, and $T_{delay,3}$ may be required when subcarrier spacing is 120 kHz, According to an embodiment of the disclosure, the uplink and downlink change delay time $T_{delay}$ may be defined as the same value regardless of the subcarrier spacing value.

According to an embodiment of the disclosure, the uplink and downlink change delay time $T_{delay}$ may have a different value according to uplink and downlink configuration information before the change or after the change: For example, when an uplink and downlink configuration A1 is changed to an uplink and downlink configuration B1, the change delay time $T_{delay,1}$ may be required. For example, when an uplink and downlink configuration A2 is changed to an uplink and downlink configuration B2, the change delay time $T_{delay,2}$ may be required.

According to an embodiment of the disclosure, the uplink and downlink change delay time $T_{delay}$ may have a different value according to a changed range of frequency domain resources The range of frequency domain resources may be determined based on at least one of a band of the frequency domain resources or a size of the frequency domain resources.

According to an embodiment of the disclosure, the UE may not expect transmission or reception during the uplink and downlink change delay time $T_{delay}$. More specifically, when the UE receives an indicator for changing the uplink and downlink configuration in the slot n and the indicator corresponds to a change requiring the uplink and downlink change delay time, the UE may not expect transmission or reception during slots from the slot n to a slot n+$T_{delay}$. According to an embodiment of the disclosure, the uplink and downlink configuration change indicator may be transmitted from the BS to the UE through at least one method among common DCI (or a DCI format monitored in a common search space), group-common DCI (or a DCI format monitored in a type-3 common search space), UE-specific DCI (or a DCI format monitored in a UE-specific search space), a DCI format including scheduling, or a DCI format including no scheduling.

According to an embodiment of the disclosure, the uplink and downlink configuration change indicator may include uplink and downlink configuration information for one or a plurality of slots. That is, the BS may transmit the configuration change indicator indicating the uplink and downlink configuration for one or a plurality of slots to the UE, and the UE may receive the configuration change indicator indicating the uplink and downlink configuration for one or a plurality of slots from the BS.

Figure 17A:
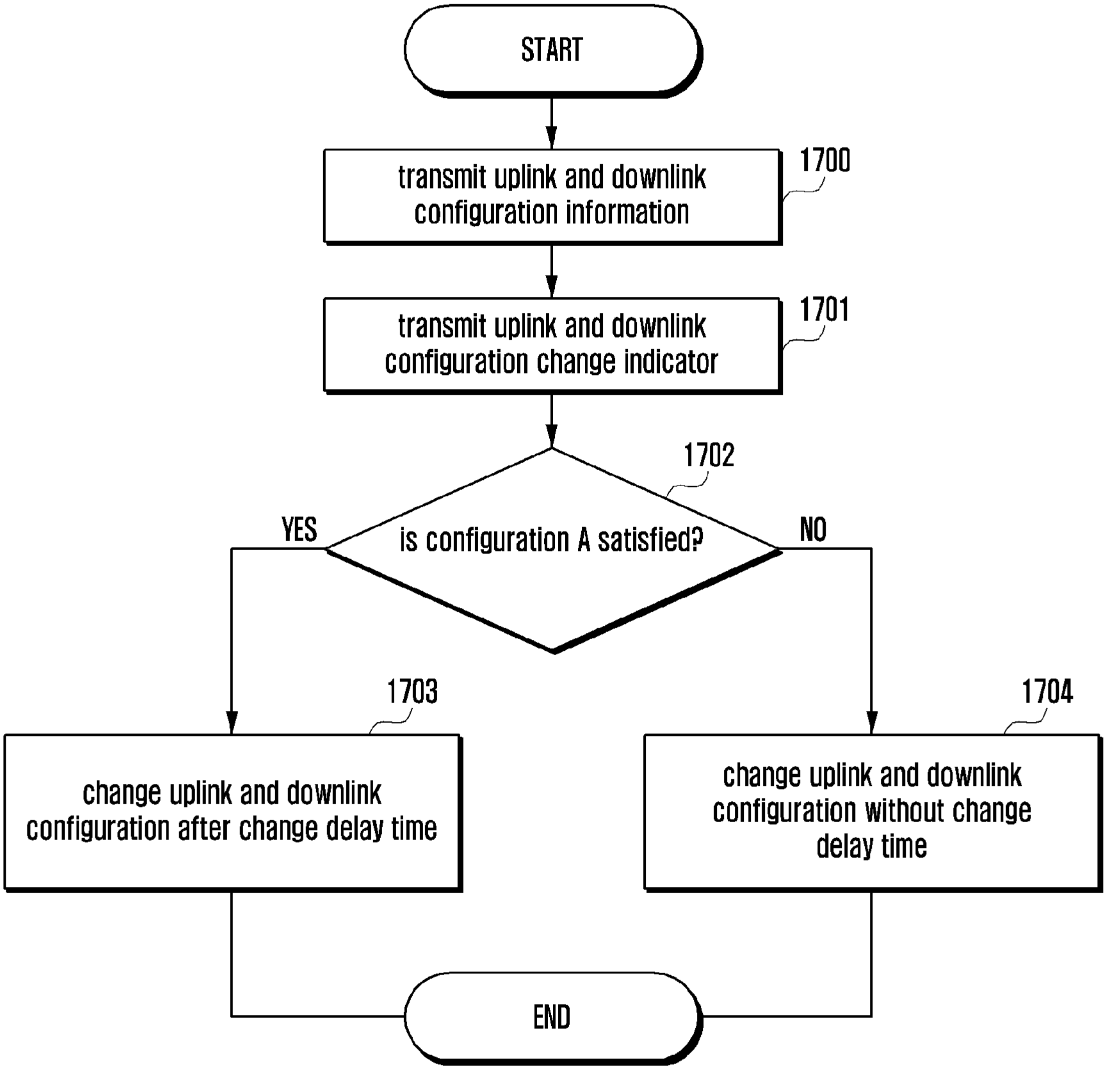
FIG. 17A illustrates a BS procedure according to an embodiment of the disclosure.
Figure 17B:
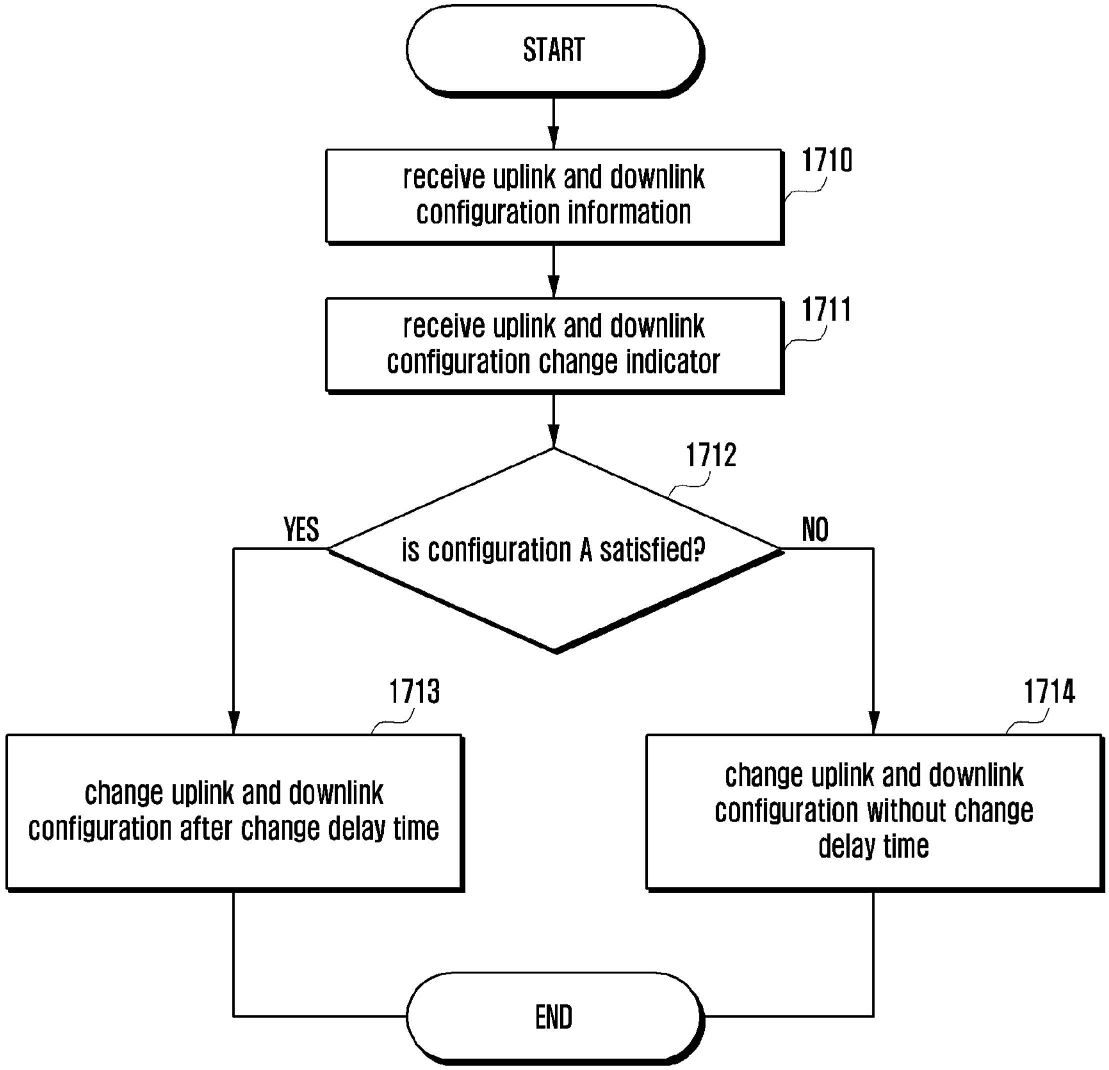
FIG. 17B illustrates a UE procedure according to an embodiment of the disclosure.

FIGS. 17A and 17B illustrate procedures of the BS and the UE according to an embodiment of the disclosure.

First, the BS procedure is described with reference to FIG. 17A.

In operation 1700, the BS may transmit uplink and downlink configuration information to the UE. In operation 1701, the BS may transmit an uplink and downlink configuration change indicator to the UE. In operation 1702, the BS may determine whether a condition A is satisfied. When it is determined that the condition A is satisfied, the BS may change the uplink and downlink configuration in consideration of a change delay time in operation 1703. When it is determined that the condition A is not satisfied, the BS may change the uplink and downlink configuration without any change delay time in operation 1704.

Subsequently, the UE procedure is described with reference to FIG. 17B.

In operation 1710, the UE may receive uplink and downlink configuration information from the BS. In operation 1711, the UE may receive an uplink and downlink configuration change indicator from the BS. In operation 1712, the UE may determine whether a condition A is satisfied. When it is determined that the condition A is satisfied, the UE may change the uplink and downlink configuration in consideration of the change delay time in operation 1713. When it is determined that the condition A is not satisfied, the BS may change the uplink and downlink configuration without any change delay time in operation 1714.

Fourth Embodiment: Uplink Control Information Rate Matching Method in PUSCH Transmission in XDD System According to an embodiment of the disclosure, a method of UCI rate matching performed when uplink control information (hereinafter, referred to as UCI) is multiplexed for PUSCH transmission in the XDD system is described.

In the XDD system, the case in which UL resources and DL resources exist in different frequency resources in specific time resources (slots or OFDM symbols) may be considered. This case may occur through a method of two-dimensionally configuring or indicating a TDD configuration to the UE within the same time resource. That is, resources for UL transmission in a first frequency domain and resources for DL transmission in a second frequency domain may be allocated to the UE in one slot. Alternatively, this case may occur even when a currently activated uplink bandwidth part of the UE and a deactivated downlink bandwidth part configured in the corresponding UE partially overlap in some frequency resources. The BS may perform scheduling such that the deactivated downlink bandwidth for the corresponding UE can be used by another UE as an activated bandwidth part through the configuration method. Accordingly, in the two cases, the former is the case in which actual DL resources are allocated and the latter is the case in which actual DL resources are allocated but some frequency resource area parts overlap DL resources. However, both the two cases may be referred to as the case in which some frequency resources are DL resources in the disclosure. That is, the former is the case in which resources for UL transmission are also allocated to the slot to which resources for DL transmission are allocated. In this case, the resources for DL transmission and the resources for UL transmission may partially overlap. The latter is the case in which the resources for UL transmission are allocated to the UE but some of the allocated resources overlap resources for DL transmission of another UE. That is, the slot having some frequency resources corresponding to DL resources means that DL resources and UL resources exist in different frequency resources in a specific slot. In the disclosure, a slot having some frequency resources corresponding to DL resources is named an XDD slot for convenience of description. This is only an example, and the slot may be named another term. At this time, some guards may exist between the DL resources and the UL resources according to a UE capability.

Meanwhile, when the UE performs UCI rate matching, the number of coded modulation symbols per layer may be determined through [Equation 3] to [Equation 14] according to the type of UCI multiplexed to the PUSCH, the PUSCH repetitive transmission type to which UCI is multiplexed, and whether the UL-SCH of the corresponding PUSCH is transmitted. At this time, $$M_{sc}^{UCI}$$

used for determining the number of coded modulation symbols per layer is based on a bandwidth $$M_{sc}^{PUSCH}$$

scheduled for PUSCH transmission. This means that, when the number of symbols for UCI rate matching and transmission, the UE considers resources for the entire bandwidth in which the PUSCH is scheduled. However, in the XDD system, not all the frequency resources in which the slot for transmitting the PUSCH to which UCI is multiplexed is scheduled are configured as the uplink, but some frequency resources may be the slot (that is, XDD slot) having DL resources.

Figure 18:
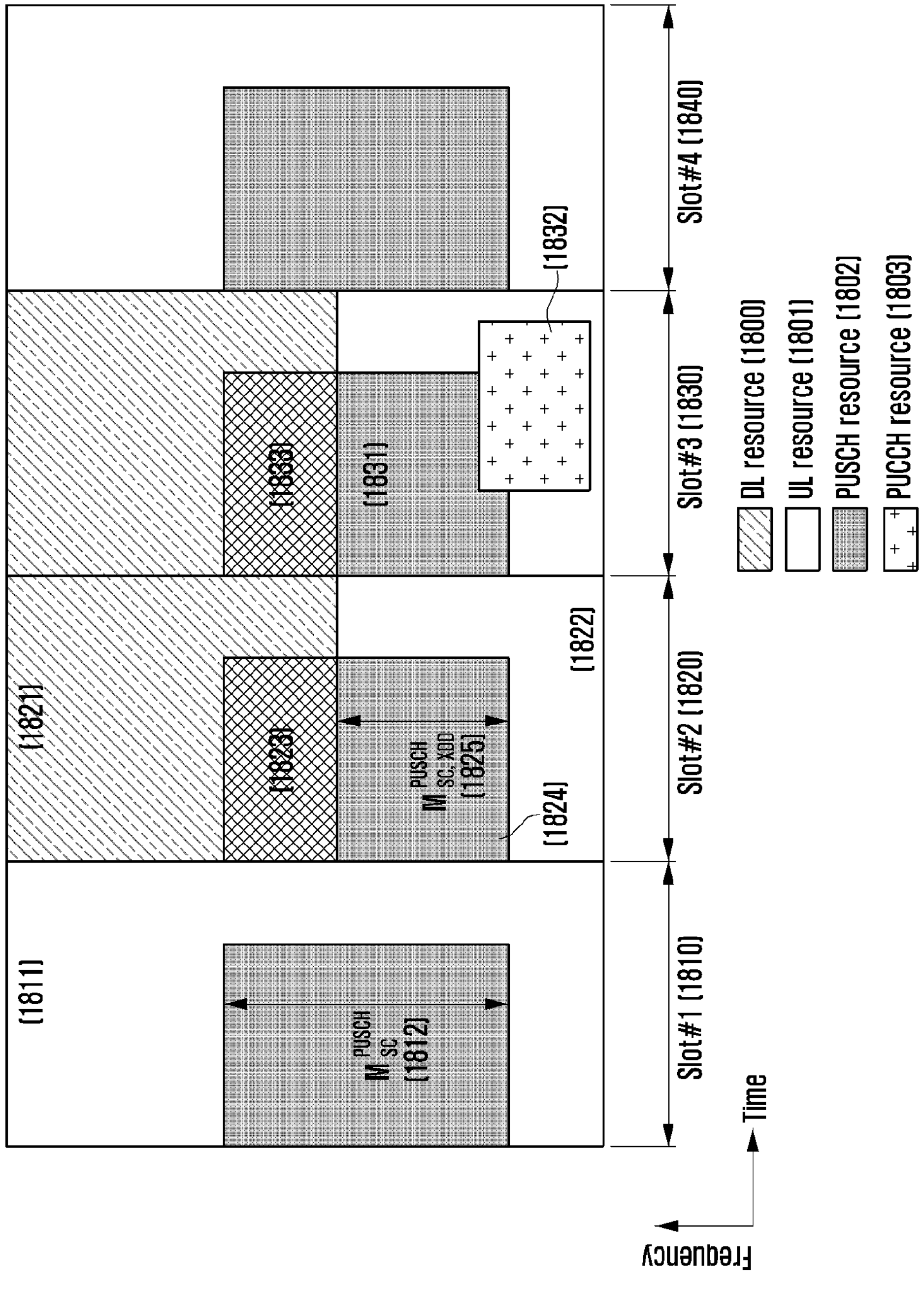
FIG. 18 illustrates an example of multiplexing in the case of a PUSCH repetitive transmission type A in the XDD system.

FIG. 18 illustrates an example of multiplexing in the case of a PUSCH repetitive transmission type A in the XDD system.

In FIG. 18, it is assumed that the PUSCH repetitive transmission type A is scheduled by the BS to repeatedly perform transmission through slot #1 to slot #4 1810, 1820, 1830, and 1840 four times. At this time, a bandwidth 1812 of the scheduled PUSCH is $$M_{sc}^{PUSCH},$$

and the UE may transmit the PUSCH through the bandwidth of the scheduled PUSCH in slot #1 1810 and slot #4 1840 having only uplink resources. However, in slot #2 1820 and slot #3 1830 which are XDD slots having UL resources and DL resources existing in different frequency resources, the UE may not transmit the PUSCH through scheduled PUSCH resources 1823 and 1833 overlapping frequency resources configured as the DL resources but may transmit the PUSCH through resources 1824 and 1831 configured as the UL resources. At this time, a bandwidth 1825 of resources through which the UE can transmit the PUSCH may be defined as $$M_{sc,XDD}^{PUSCH}.$$

As described above, in the XDD slots, the UE transmits the PUSCHs 1824 and 1831 through the reduced resources compared to the scheduled PUSCH resources. Further, like in slot #3, when the PUCCH 1832 overlaps the PUSCH in the time domain and the UE performs UCI multiplexing, the UE should perform rate matching for multiplexing UCI to the PUSCH having the bandwidth reduced to $$M_{sc,XDD}^{PUSCH}.$$

In the disclosure, when the PUSCH and the PUCCH overlap XDD slots having UL resources and DL resources existing in different frequency resources in the XDD system, a method by which the UE performs rate matching considering the reduced bandwidth compared to the scheduled bandwidth and determines the number of coded modulation symbols per layer for each UCI, based thereon is described in detail. More specifically, a UCI rate matching method for PUSCH transmission other than the PUSCH repetitive transmission type B including the UL-SCH is described in detail in embodiment 4-1, and a UCI rate matching method for the PUSCH repetitive transmission type B transmission including the UL-SCH is described in embodiment 4-2. Further, a rate matching method for UCI multiplexed to the PUSCH when the UL-SCH is not included in the PUSCH is described in embodiment 4-3.

Embodiment 4-1: Uplink Control Information Rate Matching Method when PUSCH Transmission Other than PUSCH Repetitive Transmission Type B Including UL-SCH is Supported According to an embodiment of the disclosure, a method by which the UE performs UCI rate matching when UCI is multiplexed to PUSCH transmission other than the PUSCH repetitive transmission type B including the UL-SCH is described in detail. For example, PUSCH transmission other than the PUSCH repetitive transmission type B may be a PUSCH repetitive transmission type A or single PSUC transmission. For convenience description, the PUSCH repetitive transmission type A is assumed, but the disclosure is limited to the PUSCH repetitive transmission type A and the method of embodiment 4-1 may be similarly applied to single PUSCH transmission and PUCCH transmission overlapping the XDD slot.

When the UE calculates the number of coded modulation symbols per layer through rate matching in order to multiple UCI to the PUSCH transmitted through the XDD slot in the XDD system, there may be a method of performing calculation based on an amount of resources of the scheduled PUSCH and comparing the resources with resources through which UCI can be actually transmitted to determine the number and a method of performing calculation based on an amount of the PUSCH actually transmitted in the XDD slot, comparing the resources with resources through which UCI can be actually transmitted to determine the number. When the method of performing calculation based on the amount of resources of the scheduled PUSCH and comparing the resources with the resources through which UCI can be actually transmitted to determine the number is defined as [Method 4-1-1] like the first method, a detailed method according to each UCI type may be considered as follows. At this time, for all cases, it is assumed that the timeline condition (see the 3GPP standard TS 38.213 clause 9.2.5) for multiplexing UCI is satisfied.

[Method 4-1-1: HARQ-ACK]like in slot #3 1830 of FIG. 18, the PUCCH and the PUSCH overlap in the XDD system and, when resources through which the PUSCH is transmitted are reduced as indicated by reference numeral 1831, the calculation may be performed based on a bandwidth $$M_{sc}^{PUSCH}$$

scheduled for PUSCH transmission. At this time, the calculation equation is the same as [Equation 3] above. However, the number of coded modulation symbols calculated by [Equation 3] may be larger than the number of symbols which can be transmitted by the UE through the XDD slot. Accordingly, like [Equation 15], $$Q'_{ACK,XDD}$$

for HARQ-ACK multiplexed to the PUSCH may be determined in consideration of an additional condition. The determined number of coded modulation symbols per layer for HARQ-ACK in the XDD slot is defined as $$Q'_{ACK,XDD}$$

but may be defined as $$Q'_{ACK}$$

as the original expression. The condition added to [Equation 15] assumes the case in which UCI for HARQ-ACK can be multiplexed to all PUSCH resources which the UE can transmit in the XDD slot, but the UE may determine $$Q'_{ACK,XDD}$$

in consideration of a ratio of multiplexed UCI to PUSCH resources which can be transmitted by adding a higher-layer parameter α for scaling as shown in [Equation 16].

[Equation 15]

$$Q'_{ACK,XDD} = \min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL\text{-}SCH}-1}K_r}\right\rceil,\left\lceil\alpha\cdot\sum_{l=l_0}^{N_{symb,all}^{PUSCH}-1}M_{sc}^{UCI}(l)\right\rceil,\left\lceil\alpha\cdot\sum_{l=l_0}^{N_{symb,all}^{PUSCH}-1}M_{sc,XDD}^{UCI}(l)\right\rceil\right\}$$

[Equation 16]

$$Q'_{ACK,XDD} = \min\left\{\left\lceil\frac{(O_{ACK}+L_{ACK})\cdot\beta_{offset}^{PUSCH}\cdot\sum_{l=0}^{N_{symb,all}^{PUSCH}-1}M_{sc}^{UCI}(l)}{\sum_{r=0}^{C_{UL\text{-}SCH}-1}K_r}\right\rceil,\right.$$

-continued $$\left\lceil \alpha \cdot \sum_{l=l_0}^{N_{symb,all}^{PUSCH}-1} M_{sc}^{UCI}(l) \right\rceil, \left\lceil \alpha \cdot \sum_{l=l_0}^{N_{symb,all}^{PUSCH}-1} M_{sc,XDD}^{UCI}(l) \right\rceil \Bigg\}$$

In [Equation 15] and [Equation 16], $$M_{sc,XDD}^{UCI}(l)$$

is the number of resource elements which can be used for multiplexing UCI to the symbol l within the XDD slot. When the symbol l includes a DMRS, $$M_{sc,XDD}^{UCI}(l) = 0$$

and, otherwise, $$M_{sc,XDD}^{UCI}(l) = M_{sc,XDD}^{PUSCH} - M_{sc,XDD}^{PT-RS}(l) \cdot M_{sc,XDD}^{PUSCH}$$

is the number of all subcarriers through which the PUSCH can be transmitted in the XDD slot, and $$M_{sc,XDD}^{PT-RS}(l)$$

is the number of subcarriers of a PTRS included in the symbol l.

[Method 4-1-1: CSI part 1] similar to HARQ-ACK, the number $$Q'_{CSI-1,XDD}$$

of coded modulation symbols per layer of CSI part 1 multiplexed to the PUSCH transmitted in the XDD slot may be determined as shown in [Table 17] below. At this time, $$Q'_{ACK/CG-UCI,XDD}$$

may be $$Q'_{ACK,XDD}$$

described above according to the condition of UCI multiplexed to the PUSCH together with CSI part 1, or $$Q'_{CG-UCI,XDD} \text{ or } Q'_{ACK/CG-UCI,XDD}$$

described below. Similar to [Equation 16] described above, $$\left\lceil \sum_{i=i_0}^{N_{symb,all}^{PUSCH}-1} M_{sc,XDD}^{UCI}(l) \right\rceil - Q'_{ACK/CG-UCI,XDD}$$

of [Equation 17] may be replaced with $$\left\lceil \alpha \cdot \sum_{i=i_0}^{N_{symb,all}^{PUSCH}-1} M_{sc,XDD}^{UCI}(l) \right\rceil - Q'_{ACK/CG-UCI,XDD}$$

in consideration of the higher-layer parameter α for scaling.

[Equation 17]

$$Q'_{CSI-1,XDD} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil - Q'_{ACK/CG-UGI,XDD}, \left\lceil \sum_{l=0}^{N_{symb,all}^{PUSCH}-1} M_{sc,XDD}^{UCI}(l) \right\rceil - Q'_{ACK/CG-UGI,XDD} \right\}$$

[Method 4-1-1: CSI part 2] similar to HARQ-ACK and CSI part 1, the number $Q_{CSI-2,XDD}'$ of coded modulation symbols per layer of CSI part 2 multiplexed to the PUSCH transmitted in the XDD slot may be determined as shown in [Table 18] below. Similar to [Equation 16] described above, $$\left\lceil \sum_{i=i_0}^{N_{symb,all}^{PUSCH}-1} M_{sc,XDD}^{UCI}(l) \right\rceil - Q'_{ACK/CG-UCI,XDD} - Q'_{CSI-LXDD}$$

of [Equation 18] may be replaced with α in consideration of the higher-layer parameter $$\left\lceil \alpha \cdot \sum_{i=i_0}^{N_{symb,all}^{PUSCH}-1} M_{sc,XDD}^{UCI}(l) \right\rceil - Q'_{ACK/CG-UCI/XDD} - Q'_{CNI-LXDD}$$

for scaling.

[Equation 18]

$$Q'_{CSI-2,XDD} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UGI,XDD} - Q'_{CSI-1,XDD}, \left\lceil \sum_{l=0}^{N_{symb,all}^{PUSCH}-1} M_{sc,XDD}^{UCI}(l) \right\rceil - Q'_{ACK/CG-UGI,XDD} - Q'_{CSI-1,XDD} \right\}$$

[Method 4-1-1: CG-UCI]similar to HARQ-ACK, the number $$Q'_{CG-UCI,XDD}$$

of coded modulation symbols per layer of CG-UCI multiplexed to the PUSCH transmitted in the XDD slot may be determined as shown in [Table 19] below. Similar to [Equation 16] described above, $$\left\lceil \sum_{l=l_0}^{N_{symb,all}^{PUSCH}-1} M_{sc,XDD}^{UCI}(l) \right\rceil$$

of [Equation 19] may be replaced with α in consideration of the higher-layer parameter $$\left\lceil \alpha \cdot \sum_{l=l_0}^{N_{symb,all}^{PUSCH}-1} M_{sc,XDD}^{UCI}(l) \right\rceil$$

for scaling.

[Equation 19]

$$Q'_{CG-UCI,XDD} = \min\left\{ \left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil, \left\lceil \sum_{l=l_0}^{N_{symb,all}^{PUSCH}-1} M_{sc,XDD}^{UCI}(l) \right\rceil \right\}$$

[Method 4-1-1: HARQ-ACK and CG-UCI]similar to HARQ-ACK, the number $$Q'_{ACK,XDD}$$

of coded modulation symbols per layer of HARQ-ACK and CG-UCI multiplexed to the PUSCH transmitted in the XDD slot may be determined as shown in [Table 20] below. Similar to [Equation 16] described above, $$\left\lceil \sum_{l=l_0}^{N_{symb,all}^{PUSCH}-1} M_{sc,XDD}^{UCI}(l) \right\rceil$$

of [Equation 20] may be replaced with α in consideration of the higher-layer parameter $$\left\lceil \alpha \cdot \sum_{l=l_0}^{N_{symb,all}^{PUSCH}-1} M_{sc,XDD}^{UCI}(l) \right\rceil$$

for scaling.

[Equation 20]

$$Q'_{ACK,XDD} = \min\left\{ \left\lceil \frac{(O_{ACK} + O_{CG-UCI} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-sch}-1} K_r} \right\rceil, \left\lceil \alpha \cdot \sum_{l=l_0}^{N_{symb,all}^{PUSCH}-1} M_{sc}^{UCI}(l) \right\rceil, \left\lceil \sum_{l=l_0}^{N_{symb,all}^{PUSCH}-1} M_{sc,XDD}^{UCI}(l) \right\rceil \right\}$$

Unlike [Method 4-1-1], when the bandwidth of the actually transmitted PUSCH is reduced according to the XDD slot, rate matching may be performed in consideration of the reduced bandwidth. When this is defined as [Method 4-1-2], a detailed method according to each UCI type may be considered as follows.

[Method 4-1-2: HARQ-ACK] when the PUCCH and the PUSCH overlap like slot #3 of FIG. 18 in the XDD system as indicated by reference numeral 1830 and when resources through which the PUSCH is transmitted are reduced as indicated by reference numeral 1831, the calculation may be performed based on a bandwidth $$M_{sc,XDD}^{PUSCH}$$

1825 in which the PUSCH can be transmitted in the XDD for PUSCH transmission. Accordingly, like [Equation 21], $$Q'_{ACK,XDD}$$

of HARQ-ACK multiplexed to the PUSCH transmitted in the XDD slot may be determined.

[Equation 21]

$$Q'_{ACK,XDD} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc,XDD}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc,XDD}^{UCI}(l) \right\rceil \right\}$$

In [Equation 21], $$M_{sc,XDD}^{UCI}(l)$$

is defined as the number of subcarriers in which the PUSCH can be transmitted in the symbol l within the XDD slot. When the symbol l includes a DMRS, $$M_{sc,XDD}^{UCI}(l)=0.$$

When the symbol l does not include a DMRS, $$M_{sc,XDD}^{UCI}(l)=M_{sc,XDD}^{PUSCH}-M_{sc,XDD}^{PT-RS}(l),\text{ and }M_{sc,XDD}^{PT-RS}(l)$$

is the number of subcarriers of a PTRS included in the symbol l within the XDD slot. When $$Q'_{ACK,XDD}$$

is determined as shown in [Equation 21], $$Q'_{ACK,XDD}$$

may be a value smaller than $$Q'_{ACK,XDD}$$

determined based on the scheduled bandwidth $$M_{SC}^{PUSCH},$$

that is, calculated by [Equation 15]. This means that reliability of transmission after HARQ-ACK is multiplexed to the PUSCH is reduced. In order to compensate for this, when $$Q'_{ACK,XDD}$$

is calculated based on [Equation 21] according to method 2, an additional higher-layer parameter $$\beta_{offset}^{PUSCH,XDD}$$

may be introduced to calculate $$Q'_{ACK,XDD}$$

in the XDD slot rather than $$\beta_{offset}^{PUSCH}$$

configured as the existing higher-layer parameter.

$$\beta_{offset}^{PUSCH,XDD}$$

may be added to a higher-layer parameter UCI-OnPUSCH in which $$\beta_{offset}^{PUSCH}$$

is configured or configured within a new higher-layer parameter (for example, CG-UCI-OnPUSCH-ForXDD). Such a new beta offset value may be similarly defined for CSI part 1 and CSI part 2 as well as HARQ-ACK.

[Method 4-1-2: CSI part 1] similar to HARQ-ACK, the number $$Q'_{CSI-1,XDD}$$

of coded modulation symbols per layer of CSI part 1 multiplexed to the PUSCH transmitted in the XDD slot may be determined as shown in [Table 22] below.

[Equation 22]

$$Q'_{CSI-1,XDD}=\min\left\{\left\lceil\frac{(O_{CSI-1}+L_{CSI-1})\cdot\beta_{offset}^{PUSCH}\cdot\sum_{l=0}^{N_{symb,all}^{PUSCH}-1}M_{sc,XDD}^{UCI}(l)}{\sum_{r=0}^{C_{UL-SCH}-1}K_r}\right\rceil,\left\lceil\alpha\cdot\sum_{l=0}^{N_{symb,all}^{PUSCH}-1}M_{sc,XDD}^{UCI}(l)\right\rceil-Q'_{ACK/CG-UGI,XDD}\right\}$$

[Method 4-1-2: CSI part 2] similar to HARQ-ACK and CSI part 1, the number $$Q'_{CSI-2,XDD}$$

of coded modulation symbols per layer of CSI part 2 multiplexed to the PUSCH transmitted in the XDD slot may be determined as shown in [Table 23] below.

[Equation 23]

$$Q'_{CSI-2,XDD}=\min\left\{\left\lceil\frac{(O_{CSI-2}+L_{CSI-2})\cdot\beta_{offset}^{PUSCH}\cdot\sum_{l=0}^{N_{symb,all}^{PUSCH}-1}M_{sc,XDD}^{UCI}(l)}{\sum_{r=0}^{C_{UL-SCH}-1}K_r}\right\rceil,\left\lceil\alpha\cdot\sum_{l=0}^{N_{symb,all}^{PUSCH}-1}M_{sc}^{UCI}(l)\right\rceil-Q'_{ACK/CG-UGI,XDD}-Q'_{CSI-1,XDD}\right\}$$

[Method 4-1-2: CG-UCI]similar to HARQ-ACK, the number $$Q'_{CG-UCI,XDD}$$

of coded modulation symbols per layer of CG-UCI multiplexed to the PUSCH transmitted in the XDD slot may be determined as shown in [Table 24] below.

$$Q'_{CG-UCI,XDD} = \min\left\{\left\lceil \frac{(O_{CG-UCI} + L_{CG-UCI}) \cdot \beta_{offset}^{PUSCH} \cdot \sum_{l=0}^{N_{symb,all}^{PUSCH}-1} M_{sc,XDD}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc,XDD}^{UCI}(l) \right\rceil \right\}$$ [Equation 24]

[Method 4-1-2: HARQ-ACK and CG-UCI] similar to HARQ-ACK, the number $$Q'_{ACK,XDD}$$

of coded modulation symbols per layer of HARQ-ACK and CG-UCI multiplexed to the PUSCH transmitted in the XDD slot may be determined as shown in [Table 25] below.

$$Q'_{ACK,XDD} = \min\left\{\left\lceil \frac{(O_{ACK} + O_{CG-UCI} + L_{ACK}) \cdot \beta_{offset}^{PUSCH} \cdot \sum_{l=0}^{N_{symb,all}^{PUSCH}-1} M_{sc,XDD}^{UCI}(l)}{\sum_{r=0}^{C_{UL-sch}-1} K_r} \right\rceil, \left\lceil \alpha \cdot \sum_{l=l_0}^{N_{symb,all}^{PUSCH}-1} M_{sc,XDD}^{UCI}(l) \right\rceil \right\}$$ [Equation 25]

Embodiment 4-2: Uplink Control Information Rate Matching Method when PUSCH Repetitive Transmission Type B Including UL-SCH is Supported According to an embodiment of the disclosure, a method by which the UE performs UCI rate matching when UCI is multiplexed to the PUSCH repetitive transmission type B including the UL-SCH is described in detail.

As described above, the PUSCH repetitive transmission type B may be considered according to division of nominal repetition based on scheduling information and actual repetition corresponding to the unit of actual transmission by the UE in consideration of the slot boundary and the nominal repetition. When the PUCCH overlaps a plurality of actual repetitions of the PUSCH repetitive transmission type B and all of the overlapping actual repetitions satisfy a timeline condition for UCI multiplexing (see 3GPP standard TS 38.213 clause 9.2.5), the UE multiplex UCI (for example, HARQ-ACK and/or CSI information) to the earliest actual repetition among the overlapping actual repetitions. At this time, the UE does not expect the case in which all of the actual repetitions overlapping the PUCCH have symbols not larger than 1. Unlike the case of the PUSCH repetitive transmission type A or single PUSCH transmission in the XDD system, UCI is multiplexed to actual repetition in the PUSCH repetitive transmission type B, and thus the number of resources available for UCI multiplexing may be reduced by reduction in the number of symbols of actual repetition due to bandwidth reduction by the XDD slot and the slot boundary. Accordingly, in order to determine the number of coded modulation symbols per layer in the case in which UCI is multiplexed to the PUSCH repetitive transmission type B, the reduction in the number of resources available for UCI multiplexing may be considered.

Figure 19:
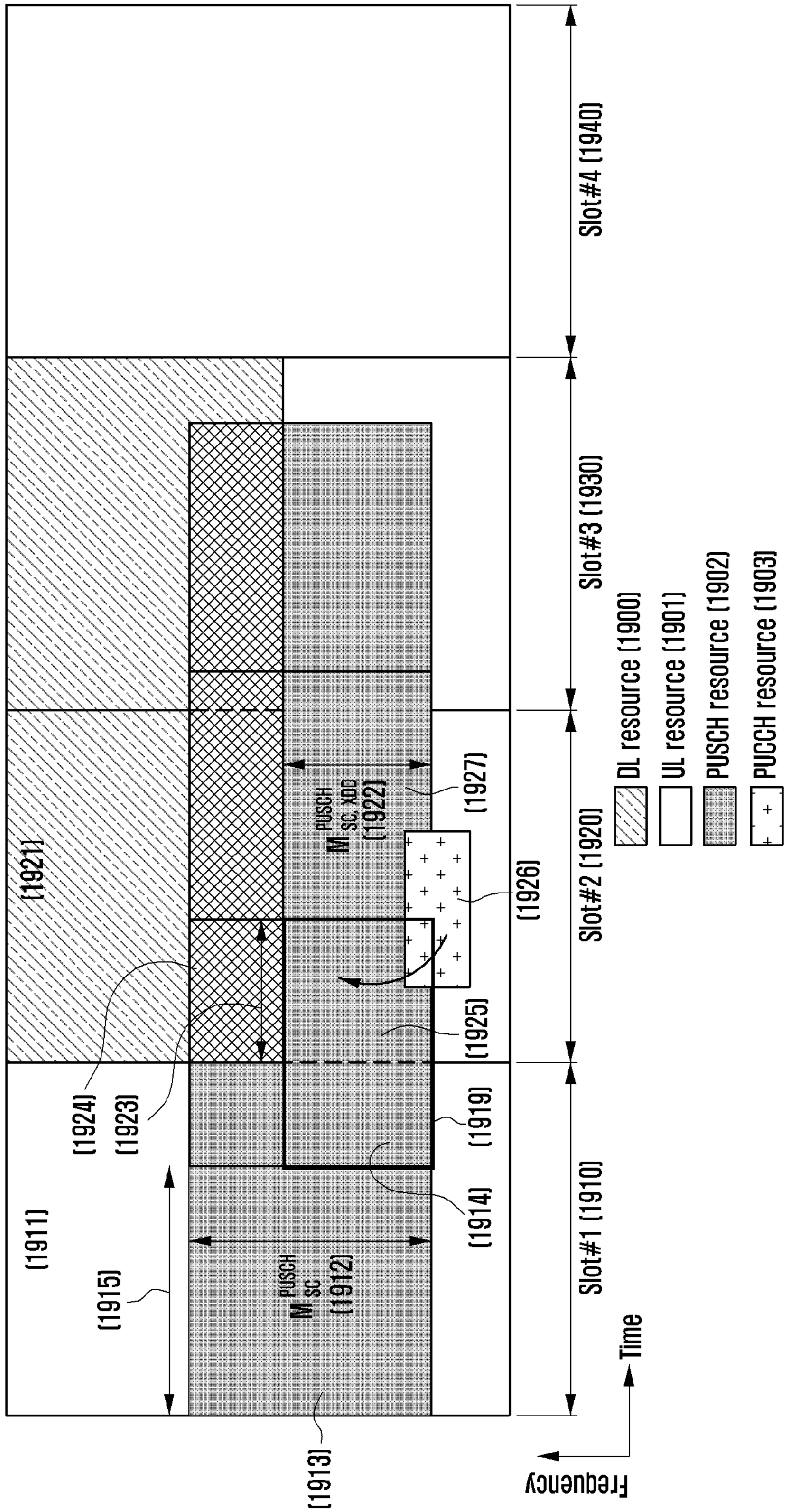
FIG. 19 illustrates an example of multiplexing in the case of a PUSCH repetitive transmission type B in the XDD system.

FIG. 19 illustrates an example of multiplexing in the case of a PUSCH repetitive transmission type B in the XDD system.

In FIG. 19, it is assumed that the PUSCH repetitive transmission type B is scheduled by the BS to perform four nominal repetitions through slot #1 to slot #3 1910, 1920, and 1930. At this time, a bandwidth 1912 of the scheduled PUSCH is $$M_{sc}^{PUSCH},$$

and the UE may transmit the PUSCH through the bandwidth of the scheduled PUSCH in slot #1 1910 having only uplink resources. Accordingly, the UE may transmit the first nominal repetition 1913 through slot #1 1910 without additional division. Meanwhile, the second nominal repetition is divided into two actual repetitions 1914 and 1925, and each thereof is transmitted to the BS. The first actual repetition 1914 of the second nominal repetition has a time domain from a start point of the PUSCH to a boundary point of slot #1, and the second actual repetition 1925 has a time domain from a start point of slot #2 to an end point of the PUSCH. The start point of slot #2 may be located between a start point and an end point of the PUSCH (that is, the second nominal repetition of the PUSCH). At this time, the second actual repetition 1925 of the second nominal repetition may be transmitted through the XDD slot in which DL resources and UL resources coexist in different frequencies, and the number of symbols is $N_{symb,actual}^{PUSCH}$ 1923. At this time, some resources 1924 of the actual repetition overlap frequency resources configured as DL resources, and thus the UE transmits the second actual repetition of the second nominal repetition through the resources 1925 except therefor. When the PUSCH 1926 overlaps the second actual repetition 1925 of the second nominal repetition and the first actual repetition 1927 of the third nominal repetition in slot #2 1920, UCI (for example, HARQ-ACK and/or CSI information) included in the PUCCH is multiplexed to the second actual repetition 1925 of the second nominal repetition which is the earliest actual repetition.

When rate matching for multiplexing is performed, the reduced bandwidth $M_{sc,XDD}^{PUSCH}$ 1922 compared to the scheduled bandwidth due to the XDD slot and the reduced number $N_{symb,actual}^{PUSCH}$ 1923 of symbols of the actual repetitions compared to the number of symbols of the nominal repetitions may be considered. The number of coded modulation symbols per layer, determined through rate matching defined in NR release 15/16/17 may be larger than an amount of resources for actually multiplexing UCI due to the reduced bandwidth and number of symbols. Accordingly, embodiment 4-2 describes in detail methods of determining coded modulation symbols per layer according to each UCI type when UCI is multiplexed to the PUSCH repetitive transmission type B within the XDD slot.

Similar to the description in embodiment 4-1, the methods may be divided into a method of performing calculation, based on an amount of resources of the scheduled PUSCH, comparing the same with resources for actually transmitting UCI, and determining the number and a method of performing calculation, based on an amount of resources of the PUSCH actually transmitted in the XDD slot, comparing the same with resources for actually transmitting UCI, and determining the number. However, in the PUSCH repetitive transmission type B transmitted in the XDD slot, the number of symbols in the time domain and a bandwidth in the frequency domain may be reduced, and thus candidates for determining the number of coded modulation symbols per layer may be variously calculated according to the reduced resources in the time or frequency domain. In embodiment 4-2, a method of calculating the number of coded modulation symbols per layer based on the scheduled bandwidth $M_{sc}^{PUSCH}$ 1912 in the frequency domain and the number $N_{symb,nominal}^{PUSCH}$ 1915 of symbols of nominal repetition in the time domain, comparing the number with resources for actually transmitting UCI, and determining the number of symbols to which UCI is multiplexed is defined as [Method 4-2-1]. In another method, a method of calculating the number of coded modulation symbols per layer based on the bandwidth $M_{sc,XDD}^{PUSCH}$ 1922 in the frequency domain reduced by the XDD slot and the number $N_{symb,nominal}^{PUSCH}$ 1915 of symbols of nominal repetition in the time domain, comparing the number with resources for actually transmitting UCI, and determining the number of symbols to which UCI is multiplexed is defined as [Method 4-2-2]. In another method, a method of calculating the number of coded modulation symbols per layer based on the bandwidth $M_{sc}^{PUSCH}$ 1912 in the frequency domain in which the PUSCH is scheduled and the number $N_{symb,actual}^{PUSCH}$ 1923 of symbols which can be reduced by the actual repetition in the time domain, comparing the number with resources for actually transmitting UCI, and determining the number of symbols to which UCI is multiplexed is defined as [Method 4-2-3].

In another method, a method of calculating the number of coded modulation symbols per layer based on the bandwidth $M_{sc,XDD}^{PUSCH}$ 1922 in the frequency domain reduced by the XDD slot and the number $N_{symb,actual}^{PUSCH}$ 1923 of symbols which can be reduced by the actual repetition in the time domain, comparing the number with resources for actually transmitting UCI, and determining the number of symbols to which UCI is multiplexed is defined as [Method 4-2-4].

As described above, methods of determining the number of coded modulation symbols per layer according to each UIC type are described in detail in consideration of [Method 4-2-1] to [Method 4-2-4] and each UCI type. At this time, it is assumed that the timeline condition for multiplexing UCI (see 3GPP standard TS 38.213 clause 9.2.5) is satisfied for all cases.

[Method 4-2-1: HARQ-ACK] Like in slot #2 1920 of FIG. 19, the PUCCH and the PUSCH overlap in the XDD system and, when resources in the time and frequency domains of the PUSCH to which UCI is multiplexed are reduced as indicated by reference numeral 1925, the calculation may be performed based on a bandwidth $$M_{sc}^{PUSCH}$$

1912 scheduled for PUSCH transmission and the number $$N_{symb,nominal}^{PUSCH}$$

1915 of symbols of the nominal repetition.

The calculation equation is similar to [Equation 3] described above. However, since the number of coded modulation symbols calculated by [Equation 3] may be larger than the number of symbols which can be transmitted through the XDD slot, $$Q'_{ACK,XDD}$$

for HARQ-ACK multiplexed to the PUSCH may be determined in consideration of an additional condition such as [Equation 26] below. The determined number of coded modulation symbols per layer for HARQ-ACK in the XDD slot is defined as $$Q'_{ACK,XDD}$$

but may be defined as $$Q'_{ACK}$$

as the original expression.

$$Q'_{ACK,XDD} = \min\left\{\left\lceil \frac{(O_{ACK} + L_{ACK}) \cdot \beta_{offset}^{PUSCH} \cdot \sum_{l=0}^{N_{symb,nomial}^{PUSCH}-1} M_{sc,nom,sch}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nom,sch}^{UCI}(l) \right\rceil, \sum_{l=0}^{N_{symb,actual}^{PUSCH}-1} M_{sc,act,XDD}^{UCI}(l) \right\} \quad \text{[Equation 26]}$$

In [Equation 26], $$M_{sc,nom,sch}^{UCI}(l)$$

is the number of resource elements which can be used for multiplexing UCI to the symbol l considering the scheduled bandwidth and the number of symbols of the nominal repetition, and is the number of resource elements which can be used for multiplexing UCI to the symbol l of the PUSCH corresponding to reference numeral 1913 of FIG. 19. When the symbol l includes a DMRS, $$M_{sc,nom,sch}^{UCI}(l) = 0$$

and, otherwise, $$M_{sc,nom,sch}^{UCI}(l) = M_{sc}^{PUSCH} - M_{sc}^{PT-RS}(l).$$

Further, $$M_{sc,act.XDD}^{UCI}(l)$$

is the number of resource elements which can be used for multiplexing UCI to the symbol l of the actual repetition 1925 to which UCI transmitted by the UE in the XDD slot is multiplexed. When the symbol l includes a DMRS, $$M_{sc,act,XDD}^{UCI}(l) = 0,$$

and otherwise, $$M_{sc,act,XDD}^{UCI}(l) = M_{sc,XDD}^{PUSCH} - M_{sc,XDD}^{PT-RS}(l) \cdot M_{sc,act,XDD}^{PT-RS}(l)$$

is the number of subcarriers of a PTRS included in the symbol l of the actual repetition to which UCI within the XDD slot is multiplexed.

$$\sum_{l=0}^{N_{symb,actual}^{PUSCH}-1} M_{sc,act,XDD}^{UCI}(l)$$

of [Equation 26] means all resources available for UCI multiplexing of the actual repetition to which UCI is multiplexed in the XDD slot, but $$\sum_{l=0}^{N_{symb,actual}^{PUSCH}-1} M_{sc,act,XDD}^{UCI}(l)$$

may be replaced with $$\alpha \cdot \sum_{l=0}^{N_{symb,actual}^{PUSCH}-1} M_{sc,act,XDD}^{UCI}(l)$$

by adding a higher-layer parameter α for scaling.

[Method 4-2-1: CSI part 1] similar to HARQ-ACK, the number $Q_{CSI-1,XDD}'$ of coded modulation symbols per layer of CSI part 1 multiplexed to the PUSCH transmitted in the XDD slot may be determined as shown in [Table 27] below. At this time, $$Q'_{ACK/CG-UCI,XDD}$$

may be $$Q'_{ACK,XDD}$$

according to [Method 4-2-1: HARQ-ACK]based on the condition of UCI and CSI part 4 multiplexed to the PUSCH, or $$Q'_{CG-UCI,XDD} \text{ or } Q'_{ACK/CG-UCI,XDD}$$

described in embodiment 4-1.

$$\sum_{l=0}^{N_{symb,actual}^{PUSCH}-1} M_{sc,act,XDD}^{UCI}(l) - Q'_{ACK/CG-UCI,XDD}$$

of [Equation 27] may be replaced with $$\alpha \cdot \sum_{l=0}^{N_{symb,actual}^{PUSCH}-1} M_{sc,act.XDD}^{UCI}(l) - Q'_{ACK/CG-UCI,XDD}$$

in consideration of the higher-layer parameter α for scaling.

[Equation 27]

$$Q'_{CSI-1,XDD} = \min\left\{ \left\lceil \frac{(O_{CSI-1} + L_{CSI-1}) \cdot \beta_{offset}^{PUSCH} \cdot \sum_{l=0}^{N_{symb,nomial}^{PUSCH}-1} M_{sc,nom,sch}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nom,sch}^{UCI}(l) \right\rceil - Q'_{ACK/CG-UCI,XDD}, \sum_{l=0}^{N_{symb,actual}^{PUSCH}-1} M_{sc,act,XDD}^{UCI}(l) Q'_{ACK/CG-UCI,XDD} \right\}$$

[Method 4-2-1: CSI part 2] similar to HARQ-ACK and CSI part 1, the number $Q_{CSI,2,XDD}'$ of coded modulation symbols per layer of CSI part 2 multiplexed to the PUSCH transmitted in the XDD slot may be determined as shown in [Table 28] below.

$$\sum_{l=0}^{N_{symb,actual}^{PUSCH}-1} M_{sc,act,XDD}^{UCI}(l) - Q'_{ACK/CG-UCI,XDD} - Q'_{CSI-1,XDD} \text{ of}$$

[Equation 28] may be replaced with α in consideration of the higher-layer parameter $$\alpha \cdot \sum_{l=0}^{N_{symb,actual}^{PUSCH}-1} M_{sc,act,XDD}^{UCI}(l) - Q'_{ACK/CG-UCI,XDD} - Q'_{CSI-1,XDD}$$

for scaling.

[Equation 28]

$$Q'_{CSI-2,XDD} = \min\left\{ \left\lceil \frac{(O_{CSI-2} + L_{CSI-2}) \cdot \beta_{offset}^{PUSCH} \cdot \sum_{l=0}^{N_{symb,nomial}^{PUSCH}-1} M_{sc,nom,sch}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nom,sch}^{UCI}(l) \right\rceil - Q'_{ACK/CG-UCI,XDD} - Q'_{CSI-1,XDD}, \sum_{l=0}^{N_{symb,actual}^{PUSCH}-1} M_{sc,act,XDD}^{UCI}(l) - Q'_{ACK/CG-UCI,XDD} - Q'_{CSI-1,XDD} \right\}$$

[Method 4-2-2: HARQ-ACK] Like in slot #2 1920 of FIG. 19, the PUCCH and the PUSCH overlap in the XDD system and, when resources in the time and frequency domains of the PUSCH to which UCI is multiplexed are reduced as indicated by reference numeral 1925, the calculation may be performed based on a bandwidth $$M_{sc,XDD}^{PUSCH}$$

1922 of the frequency domain reduced by the XDD slot and the number $$N_{symb,nominal}^{PUSCH}$$

1915 of symbols of the nominal repetition. At this time, the calculation equation is similar to [Equation 3] described above, but the number of coded modulation symbols calculated in consideration of $$M_{sc,XDD}^{PUSCH}$$

for actually transmitting the PUSCH in the XDD slot rather than the scheduled bandwidth $$M_{sc}^{PUSCH}$$

may be larger than the number of symbols which the UE can transmitted through the XDD slot, and thus $$Q'_{ACK,XDD}$$

for HARQ-ACK multiplexed to the PUSCH may be determined in consideration of an additional condition such as [Equation 29] below.

$$Q'_{ACK}=\min\left\{\left\lceil\frac{(O_{ACK}+L_{ACK})\cdot\beta_{offset}^{PUSCH}\cdot\sum_{l=0}^{N_{symb,nominal}^{PUSCH}-1}M_{sc,nom,XDD}^{UCI}(l)}{\sum_{r=0}^{C_{UL-SCH}-1}K_r}\right\rceil,\left\lceil\alpha\cdot\sum_{l=0}^{N_{symb,nominal}^{PUSCH}-1}M_{sc,nom,XDD}^{UCI}(l)\right\rceil,\sum_{l=0}^{N_{symb,actual}^{PUSCH}-1}M_{sc,act,XDD}^{UCI}(l)\right\}\quad\text{[Equation 29]}$$

In [Equation 29], $$M_{sc,nom,XDD}^{UCI}(l)$$

is the number of resource elements which can be used for multiplexing UCI to the symbol l considering the bandwidth in the frequency domain reduced by the XDD slot and the number of symbols of the nominal repetition, and is the number of resource elements which can be used for multiplexing UCI to the symbol l of the PUSCH corresponding to reference numeral 1919 of FIG. 19. When the symbol l includes a DMRS, $$M_{sc,nom,XDD}^{UCI}(l)=0,$$

and otherwise, $$M_{sc,nom,XDD}^{UCI}(l)=M_{sc,XDD}^{PUSCH}-M_{sc,nom,XDD}^{PT-RS}(l)\cdot M_{sc,nom,XDD}^{\mathrm{PT\_RS}}(l)$$

is the number of subcarriers of a PTRS included in the symbol l of the actual nominal repetition 1919 considering the bandwidth in the frequency domain reduced by the XDD slot.

$$\sum_{i=0}^{N_{symb,actual}^{PUSCH}-1}M_{sc,act,XDD}^{UCI}(l)$$

of [Equation 29] means all resources available for UCI multiplexing of the actual repetition to which UCI is multiplexed in the XDD slot, but α may be replaced with $$\sum_{i=0}^{N_{symb,actual}^{PUSCH}-1}M_{sc,act,XDD}^{UCI}(l)$$

by adding a higher-layer parameter $$\alpha\cdot\sum_{i=0}^{N_{symb,actual}^{PUSCH}-1}M_{sc,act,XDD}^{UCI}(l)$$

for scaling.

[Method 4-2-2: CSI part 1] similar to HARQ-ACK, the number $$Q'_{CSI-1,XDD}$$

of coded modulation symbols per layer of CSI part 1 multiplexed to the PUSCH transmitted in the XDD slot may be determined as shown in [Table 30] below.

$$\sum_{i=0}^{N_{symb,actual}^{PUSCH}-1}M_{sc,act,XDD}^{UCI}(l)-Q'_{ACK/CG-UCI,XDD}$$

of [Equation 30] may be replaced with $$\alpha\cdot\sum_{i=0}^{N_{symb,actual}^{PUSCH}-1}M_{sc,act,XDD}^{UCI}(l)-Q'_{ACK/CG-UCI,XDD}$$

in consideration of the higher-layer parameter α for scaling.

$$Q'_{CSI-1,XDD}=\min\left\{\left\lceil\frac{(O_{CSI-1}+L_{CSI-1})\cdot\beta_{offset}^{PUSCH}\cdot\sum_{l=0}^{N_{symb,nomial}^{PUSCH}-1}M_{sc,nom,XDD}^{UCI}(l)}{\sum_{r=0}^{C_{UL-SCH}-1}K_r}\right\rceil,\left\lceil\alpha\cdot\sum_{l=0}^{N_{symb,nominal}^{PUSCH}-1}M_{sc,nom,XDD}^{UCI}(l)\right\rceil-Q'_{ACK/CG-UCI},\sum_{l=0}^{N_{symb,actual}^{PUSCH}-1}M_{sc,act,XDD}^{UCI}(l)Q'_{ACK/CG-UCI,XDD}\right\}\quad\text{[Equation 30]}$$

[Method 4-2-2: CSI part 2] similar to HARQ-ACK and CSI part 1, the number $Q_{CSI-2,XDD}'$ of coded modulation symbols per layer of CSI part 2 multiplexed to the PUSCH transmitted in the XDD slot may be determined as shown in [Table 31] below.

$$\sum_{i=0}^{N_{symb,actual}^{PUSCH}-1}M_{sc,act,XDD}^{UCI}(l)-Q'_{ACK/CG-UCI,XDD}-Q'_{CSI-1,XDD}$$

of [Equation 31] may be replaced with α in consideration of the higher-layer parameter $$\alpha\cdot\sum_{i=0}^{N_{symb,actual}^{PUSCH}-1}M_{sc,act,XDD}^{UCI}(l)-Q'_{ACK/CG-UCI,XDD}-Q'_{CSI-1,XDD}$$

for scaling.

$$Q'_{CSI-2,XDD}=\min\left\{\left\lceil\frac{(O_{CSI-2}+L_{CSI-2})\cdot\beta_{offset}^{PUSCH}\cdot\sum_{l=0}^{N_{symb,nomial}^{PUSCH}-1}M_{sc,nom,XDD}^{UCI}(l)}{\sum_{r=0}^{C_{UL-SCH}-1}K_r}\right\rceil,\right.\quad\text{[Equation 31]}$$

-continued $$\left\lceil \alpha \cdot \sum_{l=0}^{N_{symb,nominal}^{PUSCH}-1} M_{sc,nom,XDD}^{UCI}(l) \right\rceil - Q'_{ACK/CG-UCI,XDD} - Q'_{CSI-1,XDD},$$

$$\left.\sum_{l=0}^{N_{symb,actual}^{PUSCH}-1} M_{sc,act,XDD}^{UCI}(l) - Q'_{ACK/CG-UCI,XDD} - Q'_{CSI-1,XDD}\right\}$$

[Method 4-2-3: HARQ-ACK] Like in slot #2 1920 of FIG. 19, the PUCCH and the PUSCH overlap in the XDD system and, when resources in the time and frequency domains of the PUSCH to which UCI is multiplexed are reduced as indicated by reference numeral 1925, the calculation may be performed based on a bandwidth $$M_{sc}^{PUSCH}$$

1912 scheduled for PUSCH transmission and the number $$N_{symb,actual}^{PUSCH}$$

1923 of symbols of the actual repetition.

At this time, the calculation equation is similar to [Equation 3] described above but considers available resources to which UCI is multiplexed as the number $$N_{symb,actual}^{PUSCH}$$

of symbols of the actual repetition in the time domain. Further, since the number of coded modulation symbols calculated by the bandwidth $$M_{sc}^{PUSCH}$$

1912 scheduled for PUSCH transmission may be larger than the number of symbols which can be transmitted by the UE through the XDD slot, $$Q'_{ACK,XDD}$$

for HARQ-ACK multiplexed to the PUSCH may be determined in consideration of an additional condition such as [Equation 32] below.

[Equation 32]

$$Q'_{ACK,XDD} = \min\left\{\left\lceil \frac{(O_{ACK} + L_{ACK}) \cdot \beta_{offset}^{PUSCH} \cdot \sum_{l=0}^{N_{symb,actual}^{PUSCH}-1} M_{sc,act,sch}^{UCI}(l)}{\sum_{r=0}^{C_{UL-SCH}-1} K_r} \right\rceil,\right.$$

-continued $$\left.\left\lceil \alpha \cdot \sum_{l=0}^{N_{symb,actual}^{PUSCH}-1} M_{sc,act,sch}^{UCI}(l) \right\rceil, \sum_{l=0}^{N_{symb,actual}^{PUSCH}-1} M_{sc,act,XDD}^{UCI}(l)\right\}$$

In [Equation 32], $$M_{sc,act,sch}^{UCI}(l)$$

is the number of resource elements which can be used for multiplexing UCI to the symbol l considering the bandwidth in which the PUSCH in the frequency domain is scheduled and the number of symbols of the actual repetition. That is, when it is assumed that there is no DL resource in FIG. 19, $$M_{sc,act,sch}^{UCI}(l)$$

is the number of resource elements which can be used for multiplexing UCI in the symbol l among PUSCH resources corresponding to an area obtained by adding reference numerals 1924 and 1925. When the symbol l includes a DMRS, $$M_{sc,nom,XDD}^{UCI}(l) = 0$$

and, otherwise, $$M_{sc,act,sch}^{UCI}(l) = M_{sc}^{PUSCH} - M_{sc,act,sch}^{PT-RS}(l) \cdot M_{sc,act,sch}^{PT-RS}(l)$$

is the number of subcarriers of a PTRS which can be included in the symbol l of the actual repetition (area corresponding to sum of reference numerals 1924 and 1925) considering the bandwidth in which the PUSCH is scheduled in the frequency domain.

$$\sum_{l=0}^{N_{symb,actual}^{PUSCH}-1} M_{sc,act,XDD}^{UCI}(l)$$

of [Equation 32] means all resources available for UCI multiplexing of the actual repetition to which UCI is multiplexed in the XDD slot, but α may be replaced with $$\sum_{l=0}^{N_{symb,actual}^{PUSCH}-1} M_{sc,act,XDD}^{UCI}(l)$$

by adding a higher-layer parameter $$\alpha \cdot \sum_{l=0}^{N_{symb,actual}^{PUSCH}-1} M_{sc,act,XDD}^{UCI}(l)$$

for scaling.

[Method 4-2-3: CSI part 1] similar to HARQ-ACK, the number $$Q'_{CSI-1,XDD}$$

of coded modulation symbols per layer of CSI part 1 multiplexed to the PUSCH transmitted in the XDD slot may be determined as shown in [Table 33] below.

$$\sum_{i=0}^{N_{symb,actual}^{PUSCH}-1} M_{sc,act,XDD}^{UCI}(l) - Q'_{ACK/CG-UCI,XDD}$$

of [Equation 33] may be replaced with $$\alpha \cdot \sum_{i=0}^{N_{symb,actual}^{PUSCH}-1} M_{sc,act,XDD}^{UCI}(l) - Q'_{ACK/CG-UCI,XDD}$$

in consideration of the higher-layer parameter α for scaling.

$$Q'_{CSI-1,XDD} = \min\left\{\left\lceil \frac{(O_{CSI-1} + L_{CSI-1}) \cdot \beta_{offset}^{PUSCH} \cdot \sum_{l=0}^{N_{symb,actual}^{PUSCH}-1} M_{sc,act,sch}^{UCI}(l)}{\sum_{r=0}^{C_{UL-SCH}-1} K_r} \right\rceil, \left\lceil \alpha \cdot \sum_{l=0}^{N_{symb,actual}^{PUSCH}-1} M_{sc,act,sch}^{UCI}(l) \right\rceil - Q'_{ACK/CG-UCI,XDD}, \sum_{l=0}^{N_{symb,actual}^{PUSCH}-1} M_{sc,act,XDD}^{UCI}(l) Q'_{ACK/CG-UCI,XDD} \right\} \quad \text{[Equation 33]}$$

[Method 4-2-3: CSI part 2] similar to HARQ-ACK and CSI part 1, the number $Q_{CSI-2,XDD}'$ of coded modulation symbols per layer of CSI part 2 multiplexed to the PUSCH transmitted in the XDD slot may be determined as shown in [Table 34] below.

$$\sum_{i=0}^{N_{symb,actual}^{PUSCH}-1} M_{sc,act,XDD}^{UCI}(l) - Q'_{ACK/CG-UCI,XDD} - Q'_{CNI-1,XDD}$$

of [Equation 31] may be replaced with $$\alpha \cdot \sum_{i=1}^{N_{symb,actual}^{PUSCH}-1} M_{sc,act,XDD}^{UCI}(l) - Q'_{ACK/CG-UCI,XDD} - Q'_{CNI-1,XDD}$$

in consideration of the higher-layer parameter α for scaling.

$$Q'_{CSI-2,XDD} = \min\left\{\left\lceil \frac{(O_{CSI-2} + L_{CSI-2}) \cdot \beta_{offset}^{PUSCH} \cdot \sum_{l=0}^{N_{symb,actual}^{PUSCH}-1} M_{sc,act,sch}^{UCI}(l)}{\sum_{r=0}^{C_{UL-SCH}-1} K_r} \right\rceil, \left\lceil \alpha \cdot \sum_{l=0}^{N_{symb,actual}^{PUSCH}-1} M_{sc,act,sch}^{UCI}(l) \right\rceil - Q'_{ACK/CG-UCI,XDD} - Q'_{CSI-1,XDD}, \sum_{l=0}^{N_{symb,actual}^{PUSCH}-1} M_{sc,act,XDD}^{UCI}(l) - Q'_{ACK/CG-UCI,XDD} - Q'_{CSI-1,XDD} \right\} \quad \text{[Equation 34]}$$

-continued

[Method 4-2-4: HARQ-ACK] Like in slot #2 1920 of FIG. 19, the PUCCH and the PUSCH overlap in the XDD system and, when resources in the time and frequency domains of the PUSCH to which UCI is multiplexed are reduced as indicated by reference numeral 1925, the calculation may be performed based on a bandwidth $$M_{sc,XDD}^{PUSCH}$$

1922 of the frequency domain reduced by the XDD slot and the number $$N_{symb,actual}^{PUSCH}$$

1923 of symbols of the actual repetition. At this time, the calculation equation is similar to [Equation 3] described above but considers available resources to which UCI can be multiplexed as the bandwidth $$M_{sc,XDD}^{PUSCH}$$

1922 reduced by the XDD slot in the frequency domain and the number $$N_{symb,actual}^{PUSCH}$$

of symbols of the actual repetition in the time domain. [Equation 35] is calculated based on an amount of resources of the PUSCH to which UCI actually transmitted by the UE is multiplexed, rather than information scheduled for PUSCH transmission.

$$Q'_{ACK,XDD} = \min\left\{\left\lceil \frac{(O_{ACK} + L_{ACK}) \cdot \beta_{offset}^{PUSCH} \cdot \sum_{l=0}^{N_{symb,actual}^{PUSCH}-1} M_{sc,act,XDD}^{UCI}(l)}{\sum_{r=0}^{C_{UL-SCH}-1} K_r} \right\rceil, \left\lceil \alpha \cdot \sum_{l=0}^{N_{symb,actual}^{PUSCH}-1} M_{sc,act,XDD}^{UCI}(l) \right\rceil \right\} \quad \text{[Equation 35]}$$

In [Equation 35], $$M_{sc,act,XDD}^{UCI}(l)$$

is the number of resource elements which can be used for multiplexing UCI to the symbol l considering the bandwidth in the frequency domain reduced by the XDD slot and the number of symbols of the actual repetition, and is the number of resource elements which can be used for multiplexing UCI to the symbol l of the PUSCH corresponding to reference numeral 1925 of FIG. 19. When the symbol l includes a DMRS, $$M_{sc,act,XDD}^{UCI}(l)=0,$$

and otherwise, $$M_{sc,act,XDD}^{UCI}(l)=M_{sc,XDD}^{PUSCH}-M_{sc,act,XDD}^{PT-RS}(l)\cdot M_{sc,act,XDD}^{PT-RS}(l)$$

is the number of subcarriers of a PTRS included in the symbol l of the actual repetition 1925 considering the bandwidth in the frequency domain reduced by the XDD slot.

[Method 4-2-4: CSI part 1] similar to HARQ-ACK, the number $$Q'_{CSI-1,XDD}$$

of coded modulation symbols per layer of CSI part 1 multiplexed to the PUSCH transmitted in the XDD slot may be determined as shown in [Table 36] below.

[Equation 36]

$$Q'_{CSI-1,XDD}=\min\left\{\left\lceil\frac{(O_{CSI-1}+L_{CSI-1})\cdot\beta_{offset}^{PUSCH}\cdot\sum_{l=0}^{N_{symb,actual}^{PUSCH}-1}M_{sc,act,XDD}^{UCI}(l)}{\sum_{r=0}^{C_{UL-SCH}-1}K_r}\right\rceil,\left\lceil\alpha\cdot\sum_{l=0}^{N_{symb,actual}^{PUSCH}-1}M_{sc,act,sch}^{UCI}(l)\right\rceil-Q'_{ACK/CG-UCI,XDD}\right\}$$

[Method 4-2-4: CSI part 2] similar to HARQ-ACK and CSI part 1, the number $$Q'_{CSI-2,XDD}$$

of coded modulation symbols per layer of CSI part 2 multiplexed to the PUSCH transmitted in the XDD slot may be determined as shown in [Table 37] below.

[Equation 37]

$$Q'_{CSI-2,XDD}=\min\left\{\left\lceil\frac{(O_{CSI-2}+L_{CSI-2})\cdot\beta_{offset}^{PUSCH}\cdot\sum_{l=0}^{N_{symb,actual}^{PUSCH}-1}M_{sc,act,XDD}^{UCI}(l)}{\sum_{r=0}^{C_{UL-SCH}-1}K_r}\right\rceil,\left\lceil\alpha\cdot\sum_{l=0}^{N_{symb,actual}^{PUSCH}-1}M_{sc,act,XDD}^{UCI}(l)\right\rceil-Q'_{ACK/CG-UCI,XDD}-Q'_{CSI-1,XDD}\right\}$$

When rate matching is performed according to [Method 4-2-2] to [Method 4-2-4] considering reduced resources in the XDD slot, the higher-layer parameter $$\beta_{offset}^{PUSCH,XDD}$$

may be additionally introduced to calculate $$Q'_{ACK,HDD}$$

in the XDD slot, rather than $$\beta_{offset}^{PUSCH}$$

configured as the existing higher-layer parameter as described above in [Method 4-1-2].

Embodiment 4-3: Uplink Control Information Rate Matching Method when PUSCH Including No UL-SCH is Supported According to an embodiment of the disclosure, a method by which the UE performs rate matching when UCI is multiplexed to the PUSCH including no UL-SCH is described in detail. Unlike embodiment 4-1 and embodiment 4-2, the UL-SCH is not included, and thus rate matching is performed based on a scheduled code rate, a modulation order, and an amount of resources of the scheduled PUSCH. In the XDD system, the UE may perform rate matching through the following method according to each UCI type and determine coded modulation symbols per layer for each UCI.

[Method 4-3: HARQ-ACK] when HARQ-ACK is multiplexed to the PUSCH including no UL-SCH, [Equation 6] may be used. However, the number of coded modulation symbols determined by [Equation 6] may be larger than the number of resources which can be transmitted by the UE through the XDD slot. Accordingly, the UE may determine the number of coded modulation symbols per layer for HARQ-ACK multiplexed to the PUSCH in consideration of an amount of resources which can be actually transmitted, as shown in [Equation 38] below.

[Equation 38]

$$Q'_{ACK,XDD}=\min\left\{\left\lceil\frac{(O_{ACK}+L_{ACK})\cdot\beta_{offset}^{PUSCH}}{R\cdot Q_m}\right\rceil,\left\lceil\alpha\cdot\sum_{l=l_0}^{N_{symb,all}^{PUSCH}-1}M_{sc}^{UCI}(l)\right\rceil,\sum_{l=0}^{N_{symb,all}^{PUSCH}-1}M_{sc,XDD}^{UCI}(l)\right\}$$

[Method 4-3: CSI part 1] when CSI part 1 is multiplexed to the PUSCH including no UL-SCH, the UE performs rate matching according to the existence or non-existence of CSI part 2 information. When CSI part 2 information exists, the UE may use [Equation 8]. However, similar to the case of multiplexing HARQ-ACK, the number of coded modulation symbols per layer for CSI part 1 may be determined through rate matching as shown in [Equation 39] in consideration of the number of resources which can be actually transmitted by the UE in the XDD slot. When CSI part 2 information does not exist, [Equation 9] can be used, and, similar to the method, the UE may determine the number of coded modulation symbols per layer for CSI part 1 by performing rate matching as shown in [Equation 40] in consideration of the number of resources which can be actually transmitted by the UE in the XDD slot.

[Equation 39]

$$Q'_{CSI-1,XDD} = \min\left\{\left\lceil\frac{(O_{CSI-1}+L_{CSI-1})\cdot\beta_{offset}^{PUSCH}}{R\cdot Q_m}\right\rceil,\ \sum_{l=0}^{N_{symb,all}^{PUSCH}-1} M_{sc,XDD}^{UCI}(l)-Q'_{ACK,XDD}\right\}$$

[Equation 40]

$$Q'_{CSI-1,XDD} = \sum_{l=0}^{N_{symb,all}^{PUSCH}-1} M_{sc,XDD}^{UCI}(l)-Q'_{ACK,XDD}$$

[Method 4-3: CSI part 2] when CSI part 2 information is multiplexed to the PUSCH including no UL-SCH, the UE multiplexes CSI part 2 information to the PUSCH through the remaining resources after multiplexing of HARQ-ACK and CSI part 1 information. At this time, the UE may determine the number of coded modulation symbols per layer for CSI part 2 by performing rate matching as shown in [Equation 41] by using the number of resources which can be transmitted through the XDD slot and $Q'_{ACK,XDD}$ and $Q'_{CSI-1,XDD}$ determined according to [Method 4-3: HARQ-ACK] and [Method 4-3: CSI part 1].

[Equation 41]

$$Q'_{CSI-2,XDD} = \sum_{l=0}^{N_{symb,all}^{PUSCH}-1} M_{sc,XDD}^{UCI}(l)-Q'_{ACK,XDD}-Q'_{CSI-1,XDD}$$

Fifth Embodiment: A UE Capability Report and Rate Matching Method Based on the Reported UE Capability in the XDD System As an embodiment of the disclosure, an operation in which the UE reporting a UE capability which can support the XDD system and determines a rate matching method, based thereon is described in detail.

The UE may report at least one of the lists below as the UE capability to indicate that the operation of the UE which has been mentioned in the various embodiments can be performed.

UE capability indicating whether the XDD system is supported

UE capability indicating whether each resource configuration method is supported in the XDD system UE capability indicating whether each frequency band division method is supported in the XDD system UE capability indicating whether each resource uplink configuration and indication method is supported in the XDD system UE capability indicating whether each bandwidth part configuration and indication method is supported in the XDD system UE capability indicating whether each rate matching method of UCI multiplexed to the PUSCH is supported in the XDD system For example, the UE capability indicating whether each rate matching method of UCI multiplexed to the PUSCH is supported may include indicators indicating whether, when the UE performs rate matching the number of coded modulation symbols per layer can be determined in consideration of a bandwidth reduced for the XDD slot and the number of coded modulation symbols per layer can be determined in consideration of the reduced number of OFDM symbols according to actual repetition. Alternatively, whether, when the number of coded modulation symbols per layer is determined, calculation for rate matching is performed based on scheduled PUSCH resources and is compared with an amount of actual transmission resources or whether calculation for rate matching is performed based on an amount of actual transmission resources may be included in the UE capability. Alternatively, the UE capability indicating whether the detailed rate matching methods described in embodiment 4-1 are supported, the UE capability indicating whether the detailed rate matching methods described in embodiment 4-2 are supported, and the UE capability indicating the detailed rate matching methods described in embodiment 4-3 may be included. The UE capabilities may be configured as information elements for reporting the UE capability to be individually reported and reported to the BS or may be reported to the BS in the form of detailed values within one information element.

Thereafter, the BS configures a higher-layer parameter (for example, a new beta offset value according to the detailed methods as necessary) for supporting the XDD system and performing rate matching, based on the UE capabilities reported by the UE. The UE may support the XDD system according to the higher-layer parameter configured by the BS and determine a rate matching method for multiplexing UCI to the PUSCH according to the higher-layer parameter configured by the BS. When the XDD system is supported but the higher-layer parameter (for example, a new higher-layer parameter 'RateMatching-forXDD' indicating a rate matching method is configured within the higher-layer parameter UCI-OnPUSCH) for performing the rate matching method considering the same is not configured, the UE multiplexes UCI to the PUSCH by using a rate matching method of NR Release 15/16. When the XDD system is supported and the higher-layer parameter for performing the rate matching method considering the same is configured, the UE multiplexes UCI to the PUSCH by using a rate matching method according to each UCI type according to an implicitly determined method among the above-described detailed rate matching methods or a method explicitly determined by the new higher-layer parameter.

Figure 20:
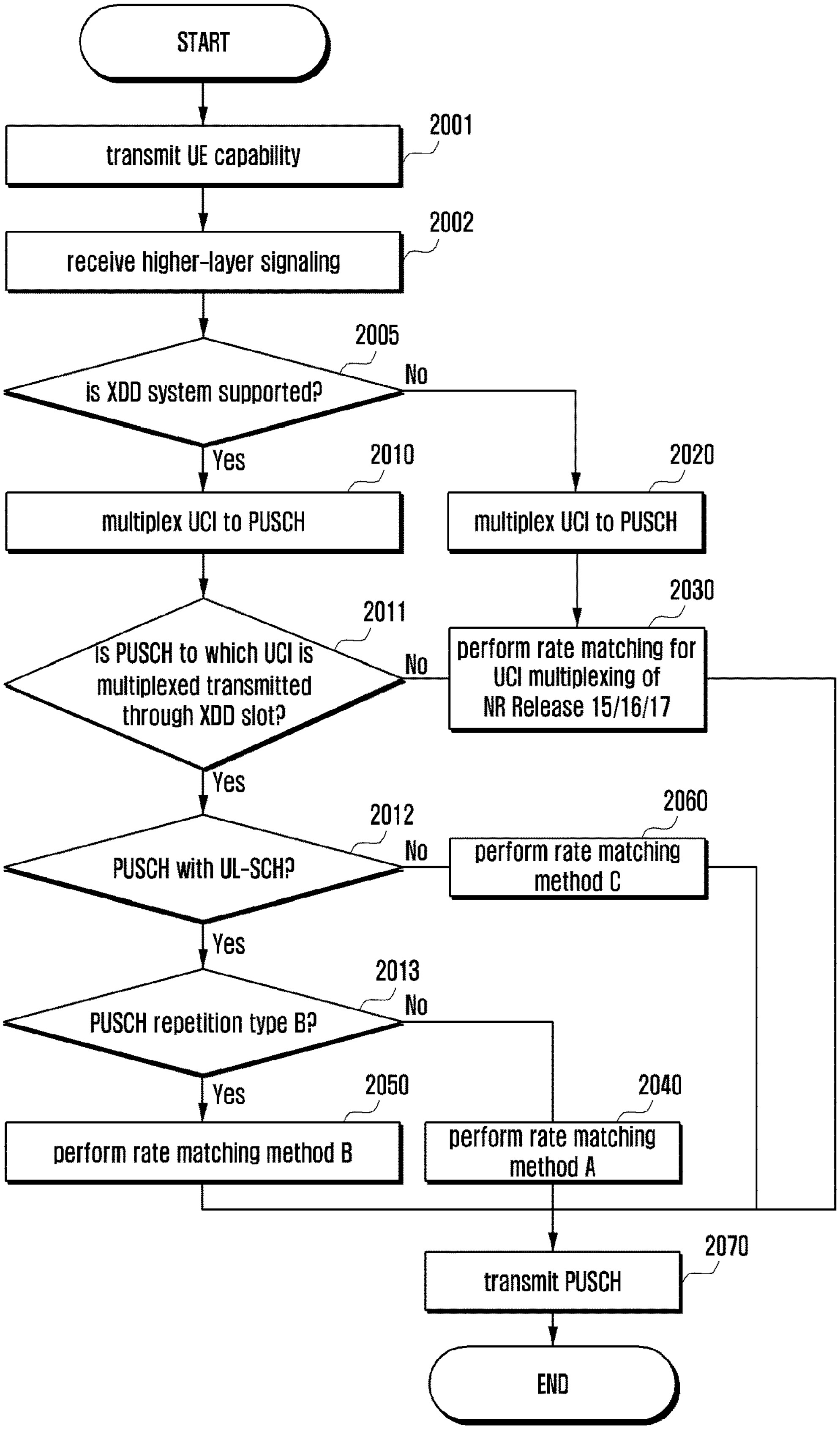
FIG. 20 is a flowchart illustrating an example of an operation for performing rate matching to multiplex UCI to the PUSCH according to an embodiment of the disclosure.

FIG. 20 is a flowchart illustrating an example of an operation for performing rate matching to multiplex UCI to the PUSCH according to an embodiment of the disclosure.

The UE may report the UE capability to the BS in operation 2001. Thereafter, the UE may receive higher-layer signaling from the BS in operation 2002. The UE identifies whether the XDD system is supported based on the higher-layer signaling configured by the BS in operation 2005. When the XDD system is not supported by the higher-layer configuration in operation 2020, the UE performs rate matching for UCI multiplexing which is the same as NR Release 15/16/17 to multiplex UCI to the PUSCH in operation 2030. When the XDD system is supported by the higher-layer configuration and the UE multiplexes UCI to the PUSCH in operation 2010, the UE identifies whether some frequency resources to which UCI is multiplexed are transmitted through a slot (XDD slot in the disclosure) which is a DL resource in operation 2011. When the PUSCH to which the UCI is multiplexed through uplink slots, all slots of which are UL resources, rate matching for UCI multiplexing which is the same as NR Release 15/16/17 is performed in operation 2030. When the PUSCH to which the UCI is multiplexed is transmitted through the XDD slot, the UE identifies whether the PUSCH includes a UL-SCH in operation 2012. When the corresponding PUSCH does not include the UL-SCH (for example, 1 bit of a UL-SCH indicator area within DCI is indicated as '0' when the PUSCH is scheduled by DCI), the UE performs a rate matching method C in operation 2060. When the PUSCH which does not include the UL-SCH corresponding to embodiment 4-3 of the disclosure is supported, the rate matching method C is an uplink control information rate matching method, and the UE performs rate matching according to a UCI type multiplexed to the PUSCH as described above in embodiment 4-3. When the PUSCH to which UCI is multiplexed includes the UL-SCH, the UE identifies whether a repetitive transmission type of the corresponding PUSCH is B in operation 2013. When the corresponding PUSCH is transmitted according to the PUSCH repetitive transmission type B, the UE performs a rate matching method B in operation 2050. When the PUSCH repetitive transmission type B including the UL-SCH corresponding to embodiment 4-2 of the disclosure is supported, the rate matching method B is an uplink control information rate matching method, and the UE performs a rate matching according to a UCI type multiplexed to the PUSCH as described above in embodiment 4-2 and a method defined by the BS and the UE among [Method 4-2-1] to [Method 4-2-4]. At this time, the BS and the UE may determine one of [Method 4-2-1] to [Method 4-2-4] or a combination of the methods according to the UCI type through an implicit method or an explicit method based on a higher-layer configuration configured by the BS. When the corresponding PUSCH follows a PUSCH transmission scheme (for example, PUSCH repetitive transmission type A or single PUSCH transmission) other than the PUSCH repetitive transmission type B, the UE performs a rate matching method A in operation 2040. When the PUSCH transmission other than the PUSCH repetitive transmission type B including the UL-SCH corresponding to embodiment 4-1 of the disclosure is supported, the rate matching method A is an uplink control information rate matching method, and the UE performs a rate matching according to a UCI type multiplexed to the PUSCH as described above in embodiment 4-1 and a method defined by the BS and the UE among [Method 4-1-1] to [Method 4-1-2]. At this time, the BS and the UE may determine one of [Method 4-1-1] to [Method 4-1-2] or a combination of the methods according to the UCI type through an implicit method or an explicit method based on a higher-layer configuration configured by the BS. Thereafter, finishing preparation of PUSCH transmission, the UE transmits the PUSCH to which UCI is multiplexed to the BS in operation 2070.

Figure 21:
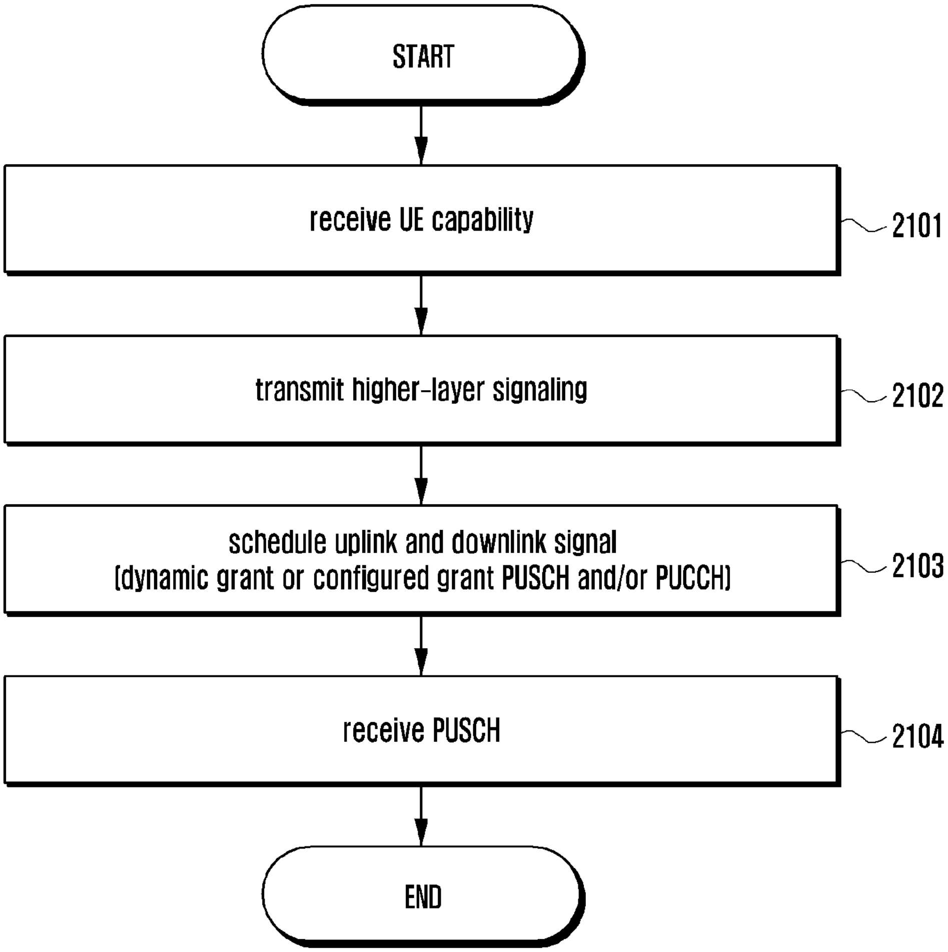
FIG. 21 is a flowchart illustrating an example of an operation for performing rate matching to multiplex UCI to the PUSCH according to an embodiment of the disclosure.

FIG. 21 is a flowchart illustrating an example of an operation for performing rate matching to multiplex UCI to the PUSCH according to an embodiment of the disclosure.

The BS receives a UE capability report from the UE in operation 2101. The BS transmits higher-layer signaling to the UE, based on the UE capability information received from the UE in operation 2102. Thereafter, the BS schedules an uplink signal to the UE by performing a series of procedures for scheduling the uplink signal (for example, dynamic grant-based or configured grant-based PUSCH and/or PUCCH) (for example, dynamic grant-based PUSCH scheduling after reception of a scheduling request (SR) from the UE) in operation 2103. The BS receives the PUSCH from the UE in operation 2104. At this time, the received PUSCH may include UCI multiplexed according to scheduling information, a CSI report configuration (for example, a CSI report using the PUSCH based on a higher-layer parameter CSI-ReportConfig).

In the fourth embodiment, it is assumed that, when DL resources and UL resources exist in different frequency resources within the slot, the UE supports half-duplex of performing only one of uplink transmission or downlink reception for convenience of description. However, a rate matching method considering a bandwidth in which actual PUSCH transmission is possible compared to the scheduled bandwidth described in detail in the disclosure may be equally applied to a UE supporting full-duplex of performing uplink transmission and downlink reception at the same time as well as the half-duplex. Even though signals are simultaneously transmitted and received for the uplink, when resources used for transmission should be transmitted in a bandwidth narrower than the scheduled bandwidth in a specific slot due to downlink reception, UCI may be multiplexed to the PUSCH according to the detailed rate matching method described in the fourth embodiment and the UE capability report between the UE and the BS and the configured higher-layer parameter described in the fifth embodiment.

Figure 22:
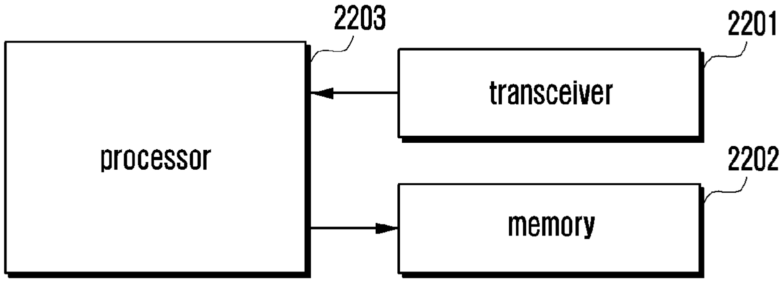
FIG. 22 is a block diagram illustrating the structure of the UE according to an embodiment of the disclosure.

FIG. 22 is a block diagram illustrating the structure of the UE according to an embodiment of the disclosure.

Referring to FIG. 22, the UE may include a transceiver 2201, a memory 2202, and a processor 2203. However, the elements of the UE are not limited to the above example. For example, the UE may include more elements or fewer elements than the above-described elements. Further, at least some or all of the transceiver 2201, the memory 2202, and the processor 2203 may be implemented in the form of a single chip.

In an embodiment, the transceiver 2201 may transmit and receive a signal to and from the BS. The signal may include control information and data. To this end, the transceiver 2201 may include an RF transmitter for up-converting and amplifying a frequency of a transmitted signal and an RF receiver for low-noise amplifying a received signal and down-converting the frequency. The transceiver 2201 may receive a signal through a wireless channel, output the signal to the processor 2203, and transmit the signal output from the processor 2203 through a wireless channel.

In an embodiment, the memory 2202 may store a program and data required for the operation of the UE. Further, the memory 2202 may store control information or data included in a signal transmitted and received by the UE. The memory 2202 may be configured by storage media such as ROM, RAM, hard disc, CD-ROM, and DVD, or a combination of the storage media. Further, the memory 2202 may include a plurality of memories. According to an embodiment, the memory 2202 may store a program for performing an operation of power saving of the UE.

In an embodiment, the processor 2203 may control a series of processes to allow the UE to operate according to the embodiments of the disclosure. In an embodiment, the processor 2203 may execute the program stored in the memory 2203, so as to receive information on a configuration for CA, a bandwidth part configuration, an SRS configuration, and a PDCCH configuration from the BS, and control a dormant cell operation process, based on configuration information.

Figure 23:
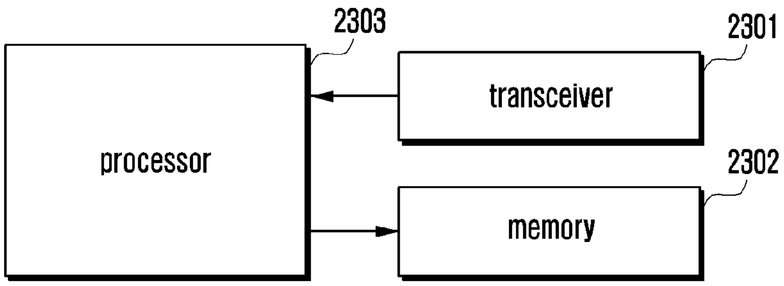
FIG. 23 is a block diagram illustrating the structure of the BS according to an embodiment of the disclosure.

FIG. 23 is a block diagram illustrating the structure of the BS according to an embodiment of the disclosure.

Referring to FIG. 23, the BS may include a transceiver 2301, a memory 2302, and a processor 2303. However, the elements of the BS are not limited to the above example. For example, the UE may include more elements or fewer elements than the above-described elements. Further, the transceiver 2301, the memory 2302, and the processor 2303 may be implemented in the form of a single chip.

In an embodiment, the transceiver 2301 may transmit and receive a signal to and from the UE. The signal may include control information and data. To this end, the transceiver 2301 may include an RF transmitter for up-converting and amplifying a frequency of a transmitted signal and an RF receiver for low-noise amplifying a received signal and down-converting the frequency. The transceiver 2301 may receive a signal through a wireless channel, output the signal to the processor 2303, and transmit the signal output from the processor 2303 through a wireless channel.

In an embodiment, the memory 2302 may store a program and data required for the operation of the UE. Further, the memory 2302 may store control information or data included in a signal transmitted and received by the UE. The memory 2302 may be configured by storage media such as ROM, RAM, hard disc, CD-ROM, and DVD, or a combination of the storage media. Further, the memory 2302 may include a plurality of memories. According to an embodiment, the memory 2302 may store a program for performing an operation of power saving of the UE.

In an embodiment, the processor 2303 may control a series of processes to allow the BS to operate according to the embodiments of the disclosure. In an embodiment, the processor 2303 may execute the program stored in the memory 2302, so as to transmit information on a configuration for CA, a bandwidth part configuration, an SRS configuration, and a PDCCH configuration to the UE, and control a dormant cell operation of the UE, based on configuration information.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

These programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. Moreover, The embodiments of the disclosure may be applied to other communication systems, and other variants based on the technical idea of the embodiments may also be implemented. For example, the embodiments may be applied to LTE, 5G, or NR systems.

The invention claimed is:

1. A method performed by a user equipment (UE) in a communication system, the method comprising:

receiving first configuration information associated with bandwidth parts (BWPs), second configuration information associated with an uplink frequency resource and a downlink frequency resource and third configuration information associated with frequency domain resource allocation type being resource allocation type 0;

identifying an active uplink BWP among the BWPs;

identifying a resource block group (RBG) size associated with the resource allocation type 0 for the active uplink BWP;

identifying a total number of RBGs ($N_{RBG}$) for the active uplink BWP based on the RBG size and size of the active uplink BWP;

receiving, on a physical downlink control channel (PDCCH), downlink control information (DCI) scheduling a physical uplink shared channel (PUSCH), wherein the DCI includes a bitmap including $N_{RBG}$ bits and each of the $N_{RBG}$ bits corresponds to each of the total number of RBGs;

identifying first resource blocks (RBs) allocated by the bitmap for the PUSCH:

identifying second RBs among the first RBs, wherein the second RBs are within the uplink frequency resource and the active uplink BWP;

identifying a number of subcarriers of scheduled bandwidth of the PUSCH for a number of coded modulation symbols of uplink control information (UCI) per layer, wherein:

the PUSCH is scheduled in a slot including at least one symbol corresponding to both the uplink frequency resource and the downlink frequency resource; and the scheduled bandwidth corresponds to the second RBs;

identifying, based on the number of subcarriers, the number of coded modulation symbols;

performing rate matching for the UCI based on the number of coded modulation symbols; and after performing the rate matching, transmitting, based on the second RBs, the PUSCH to which the UCI is multiplexed.

2. A method performed by a base station (BS) in a communication system, the method comprising:

transmitting first configuration information associated with bandwidth parts (BWPs), second configuration information associated with an uplink frequency resource and a downlink frequency resource and third configuration information associated with frequency domain resource allocation type being resource allocation type 0;

identifying an active uplink BWP among the BWPs;

identifying a resource block group (RBG) size associated with the resource allocation type 0 for the active uplink BWP;

identifying a total number of RBGs ($N_{RBG}$) for the active uplink BWP based on the RBG size and size of the active uplink BWP;

transmitting, on a physical downlink control channel (PDCCH), downlink control information (DCI) scheduling a physical uplink shared channel (PUSCH), wherein the DCI includes a bitmap including $N_{RBG}$ bits and each of the $N_{RBG}$ bits corresponds to each of the total number of RBGs and first resource blocks (RBs) allocated by the bitmap for the PUSCH;

receiving the PUSCH based on second RBs among the first RBs, wherein the second RBs are within the uplink frequency resource and the active uplink BWP; and identifying uplink control information (UCI) that is multiplexed to the PUSCH, wherein:

rate matching for the UCI is associated with a number of coded modulation symbols of the UCI per layer, the number of coded modulation symbols is associated with a number of subcarriers of scheduled bandwidth of the PUSCH, where:

the PUSCH is scheduled in a slot including at least one symbol corresponding to both the uplink frequency resource and the downlink frequency resource, and the scheduled bandwidth corresponds to the second RBs.

3. A user equipment (UE) in a communication system, the UE comprising:

a transceiver; and a processor coupled with the transceiver, wherein the processor is configured to:

receive first configuration information associated with bandwidth parts (BWPs), second configuration information associated with an uplink frequency resource and a downlink frequency resource and third configuration information associated with frequency domain resource allocation type being resource allocation type 0;

identify an active uplink BWP among the BWPs;

identify a resource block group (RBG) size associated with the resource allocation type 0 for the active uplink BWP;

identify a total number of RBGs ($N_{RBG}$) for the active uplink BWP based on the RBG size and size of the active uplink BWP;

receive, on a physical downlink control channel (PDCCH), downlink control information (DCI) scheduling a physical uplink shared channel (PUSCH), wherein the DCI includes a bitmap including $N_{RBG}$ bits and each of the $N_{RBG}$ bits corresponds to each of the total number of RBGs;

identify first resource blocks (RBs) allocated by the bitmap for the PUSCH;

identify second RBs among the first RBs, wherein the second RBs are within the uplink frequency resource and the active uplink BWP;

identify a number of subcarriers of scheduled bandwidth of the PUSCH for a number of coded modulation symbols of uplink control information (UCI) per layer, wherein:

the PUSCH is scheduled in a slot including at least one symbol corresponding to both the uplink frequency resource and the downlink frequency resource; and the scheduled bandwidth corresponds to the second RBs;

identify, based on the number of subcarriers, the number of coded modulation symbols;

perform rate matching for the UCI based on the number of coded modulation symbols; and after performing the rate matching, transmit, based on the second RBs, the PUSCH to which the UCI is multiplexed.

4. A base station (BS) in a communication system, the BS comprising:

a transceiver; and a processor coupled with the transceiver, wherein the processor is configured to:

transmit first configuration information associated with bandwidth parts (BWPs), second configuration information associated with an uplink frequency resource and a downlink frequency resource and third configuration information associated with frequency domain resource allocation type being resource allocation type 0;

identify an active uplink BWP among the BWPs;

identify a resource block group (RBG) size associated with the resource allocation type 0 for the active uplink BWP;

identify a total number of RBGs ($N_{RBG}$) for the active uplink BWP based on the RBG size and size of the active uplink BWP;

transmit, on a physical downlink control channel (PDCCH), downlink control information (DCI) scheduling a physical uplink shared channel (PUSCH), wherein the DCI includes a bitmap including $N_{RBG}$ bits and each of the $N_{RBG}$ bits corresponds to each of the total number of RBGs and first resource blocks (RBs) allocated by the bitmap for the PUSCH;

receive the PUSCH based on second RBs among the first RBs, wherein the second RBs are within the uplink frequency resource and the active uplink BWP; and identify uplink control information (UCI) that is multiplexed to the PUSCH, wherein:

rate matching for the UCI is associated with a number of coded modulation symbols of the UCI per layer, the number of coded modulation symbols is associated with a number of subcarriers of scheduled bandwidth of the PUSCH, where:

the PUSCH is scheduled in a slot including at least one symbol corresponding to both the uplink frequency resource and the downlink frequency resource; and the scheduled bandwidth corresponds to the second RBs.

5. The method of claim 1, further comprising:

receiving third configuration information associated with PUSCH repetition type; and identifying, based on the third configuration information, whether PUSCH repetition type B is configured for transmission of the PUSCH, wherein the number of coded modulation symbols is identified based on the number of subcarriers in case that the PUSCH repetition type B is not configured for the transmission of the PUSCH.

6. The method of claim 1, wherein the UCI corresponds to one of (i) hybrid automatic repeat request acknowledgement (HARQ-ACK), (ii) channel state information (CSI) part 1, (iii) CSI part 2, (iv) configured grant UCI (CG-UCI) or (v) the HARQ-ACK and the CG-UCI, and wherein the PUSCH is transmitted in the at least one symbol.

7. The method of claim 1, wherein remaining RBs among the first RBs except for the second RBs are at least partially included in outside of the uplink frequency resource.

8. The method of claim 5, further comprising transmitting third configuration information associated with PUSCH repetition type, wherein the number of coded modulation symbols is associated with the number of subcarriers in case that PUSCH repetition type B is not configured for transmission of the PUSCH based on the third configuration information.

9. The method of claim 5, wherein the UCI corresponds to one of (i) hybrid automatic repeat request acknowledgement (HARQ-ACK), (ii) channel state information (CSI) part 1, (iii) CSI part 2, (iv) configured grant UCI (CG-UCI) or (v) the HARQ-ACK and the CG-UCI, and wherein the PUSCH is received in the at least one symbol.

10. The method of claim 2, wherein remaining RBs among the first RBs except for the second RBs are at least partially included in outside of the uplink frequency resource.

11. The UE of claim 3, wherein the processor is configured to:

receive third configuration information associated with PUSCH repetition type; and identify, based on the third configuration information, whether PUSCH repetition type B is configured for transmission of the PUSCH, wherein the number of coded modulation symbols is identified based on the number of subcarriers in case that the PUSCH repetition type B is not configured for the transmission of the PUSCH.

12. The UE of claim 3, wherein the UCI corresponds to one of (i) hybrid automatic repeat request acknowledgement (HARQ-ACK), (ii) channel state information (CSI) part 1, (iii) CSI part 2, (iv) configured grant UCI (CG-UCI) or (v) the HARQ-ACK and the CG-UCI, and wherein the PUSCH is transmitted in the at least one symbol.

13. The UE of claim 3, wherein remaining RBs among the first RBs except for the second RBs are at least partially included in outside of the uplink frequency resource.

14. The BS of claim 4, wherein the processor is configured to transmit third configuration information associated with PUSCH repetition type, wherein the number of coded modulation symbols is associated with the number of subcarriers in case that PUSCH repetition type B is not configured for transmission of the PUSCH based on the third configuration information.

15. The BS of claim 4, wherein the UCI corresponds to one of (i) hybrid automatic repeat request acknowledgement (HARQ-ACK), (ii) channel state information (CSI) part 1, (iii) CSI part 2, (iv) configured grant UCI (CG-UCI) or (v) the HARQ-ACK and the CG-UCI, and wherein the PUSCH is received in the at least one symbol.

16. The BS of claim 4, wherein remaining RBs among the first RBs except for the second RBs are at least partially included in outside of the uplink frequency resource.

* * * * *